United States Patent [19]
Chu et al.

[11] Patent Number: 5,367,473
[45] Date of Patent: Nov. 22, 1994

[54] EXPERT SYSTEM FOR COMPUTER SYSTEM RESOURCE MANAGEMENT

[75] Inventors: Lynn H. Chu, Piscataway; Anthony H. Dragoni, Jr., Warren; Fredric R. Eichelman, II, Princeton; Thomas O. Huleatt, Neshanic Station; Adam E. Irgon, East Brunswick; Martha S. Langion, Middlesex, all of N.J.

[73] Assignee: Bell Communications Research, Inc., Livingston, N.J.

[21] Appl. No.: 798,496

[22] Filed: Nov. 26, 1991

Related U.S. Application Data

[63] Continuation-in-part of Ser. No. 539,730, Jun. 18, 1990, abandoned.

[51] Int. Cl.$^5$ ..................... G06F 15/16; G06F 15/18
[52] U.S. Cl. ................................ 364/551.01; 375/916
[58] Field of Search ........................ 364/550, 551.05; 395/908, 909, 916, 917, 575, 700

[56] References Cited

U.S. PATENT DOCUMENTS

| | | | |
|---|---|---|---|
| 4,727,487 | 2/1988 | Masui et al. | 364/300 |
| 4,890,227 | 12/1989 | Watanabe et al. | 364/300 |
| 5,062,055 | 10/1991 | Chinnaswamy et al. | 364/513 |
| 5,067,099 | 11/1991 | McCown et al. | 364/550 |
| 5,111,384 | 5/1992 | Aslanian et al. | 395/575 |
| 5,131,087 | 7/1992 | Warr | 395/425 |

OTHER PUBLICATIONS

Ennis et al., "A continuous real-time expert system for computer operations," IBM J. Res. Develop. vol. 30(1), Jan. 1986, 14–27.

Samadi et al., "TUNEX: A Knowledge–Based System for Performance Tuning of the UNIX operating System," IEEE Trans. on Software Engineering, vol. 15 (7), Jul. 1989, 861–874.

Asogawa et al., "A Computer System Performance Analysis Expert System (Experform)," 9th Annual Intl. Phoenix Conf. on Comp. and Comm., Mar. 1990, 758–765.

*Primary Examiner*—Robert W. Downs
*Attorney, Agent, or Firm*—Leonard Charles Suchyta; Joseph Giordano

[57] ABSTRACT

An expert system methodology for operating a computer system is disclosed to facilitate tuning, that is, resource balancing of the various resources comprising a large-scale software system. The computer system is adapted to store a knowledge base derived from experts who manually tune the large-scale system. The system also stores site-specific information and specifications on components configuring the large-scale system. Performance measurements collected from the large-scale system on a time consistent basis are merged, utilizing the knowledge base, with reference data derived from the site-specific information and the specifications. As a result of the merger, the status of the large-scale system is classified as to its operability. If the status is in a predefined class requiring tuning, the computer system is arranged to generate programming code which will effectuate the required changes in the resources to thereby reconfigure the large-scale system.

14 Claims, 7 Drawing Sheets

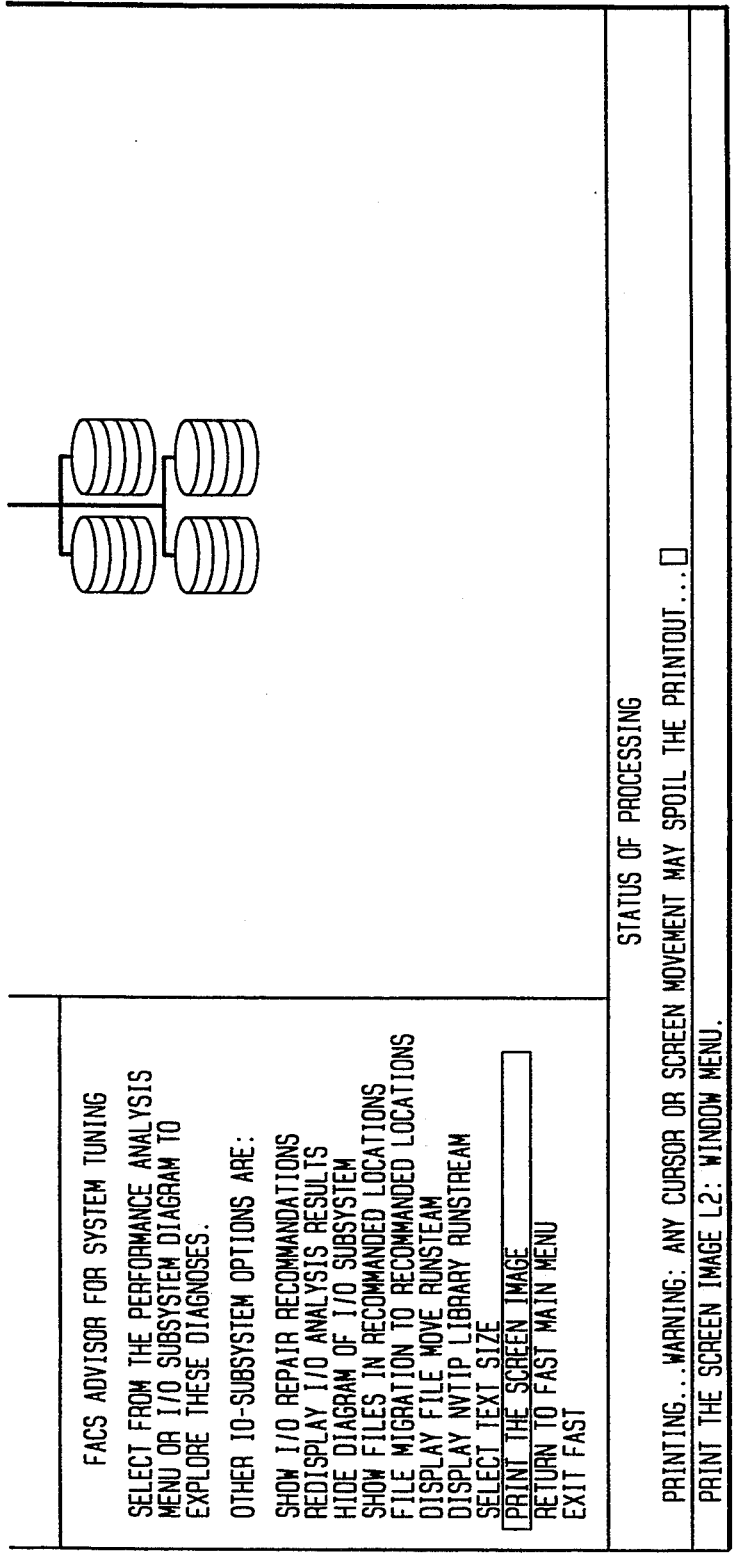
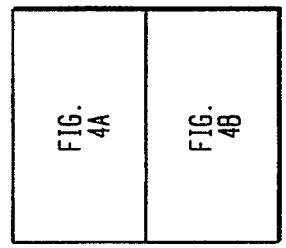
FIG. 4B
FIG. 4
FIG. 4A | FIG. 4B

FIG. 5

```
I/O SUBSYSTEM REPAIR RECOMMENDATIONS FOR COMPANY: XYZ  MACHINE: ABC  DATE: 053090

MSAR MOVE RUNSTREAM FOR TIP FILES IS SAVED IN FILE MOVE-TIP1
EXPAND THE TRANSACTION D-BANKS FOR 64K WORDS TO ALLOW BETTER DISK PERFORMANCE
CREATE A DUPLEX COPY OF FILE AC3-FMR
CREATE A DUPLEX COPY OF FILE AC3-GLO
THE SETUP FILE PROHIBITS SOAC-DB FILE MOVES; THEREFORE, FAST DIDN'T MOVE MO-GLO FROM DISK DX25
THE SETUP FILE PROHIBITS SOAC-DB FILE MOVES; THEREFORE, FAST DIDN'T MOVE MO-GLO FROM DISK DX23
THE SETUP FILE PROHIBITS SOAC-DB FILE MOVES; THEREFORE, FAST DIDN'T MOVE MO-FRM FROM DISK DX25
THE SETUP FILE PROHIBITS SOAC-DB FILE MOVES; THEREFORE, FAST DIDN'T MOVE MO-FRM FROM DISK DX23
FAST TRIED TO MOVE FILE QUICK-LOOK1 (FROM DISK EB21), BUT COULD FIND NO SUITABLE NEW (NON-9494) LOCATION FOR IT
FAST TRIED TO MOVE FILE QUICK-LOOK2 (FROM DISK EB21), BUT COULD FIND NO SUITABLE NEW (NON-9494) LOCATION FOR IT
FILE FCFDCT SHOULD BE MOVED FROM DISK EB21 TO DISK EB24 [DRA START = 4608].
                                                                                                504
```

```
FACS ADVISOR FOR SYSTEM TUNING                      | REQUESTED I/O SUBSYSTEM INFORMATION

SELECT FROM THE PERFORMANCE ANALYSIS
MENU TO GET MORE INFORMATION ABOUT
IO-SUBSYSTEM DIAGNOSIS.

OTHER IO-SUBSYSTEM OPTIONS ARE:

SHOW I/O REPAIR RECOMMENDATIONS
REDISPLAY I/O ANALYSIS RESULTS
SHOW DIAGRAM OF I/O SUBSYSTEM
DISPLAY FILE MOVE RUNSTREAM
DISPLAY NVTIP LIBRARY RUNSTREAMS
SELECT TEXT SIZE
PRINT THE SCREEN IMAGE
RETURN TO FAST MAIN MENU
EXIT FAST
```

```
                                                    STATUS OF PROCESSING

WAITING FOR USER INPUT (LEFT CLICK ON ITEM)...0

SHOW I/O REPAIR RECOMMENDATIONS 12: WINDOW USER
```

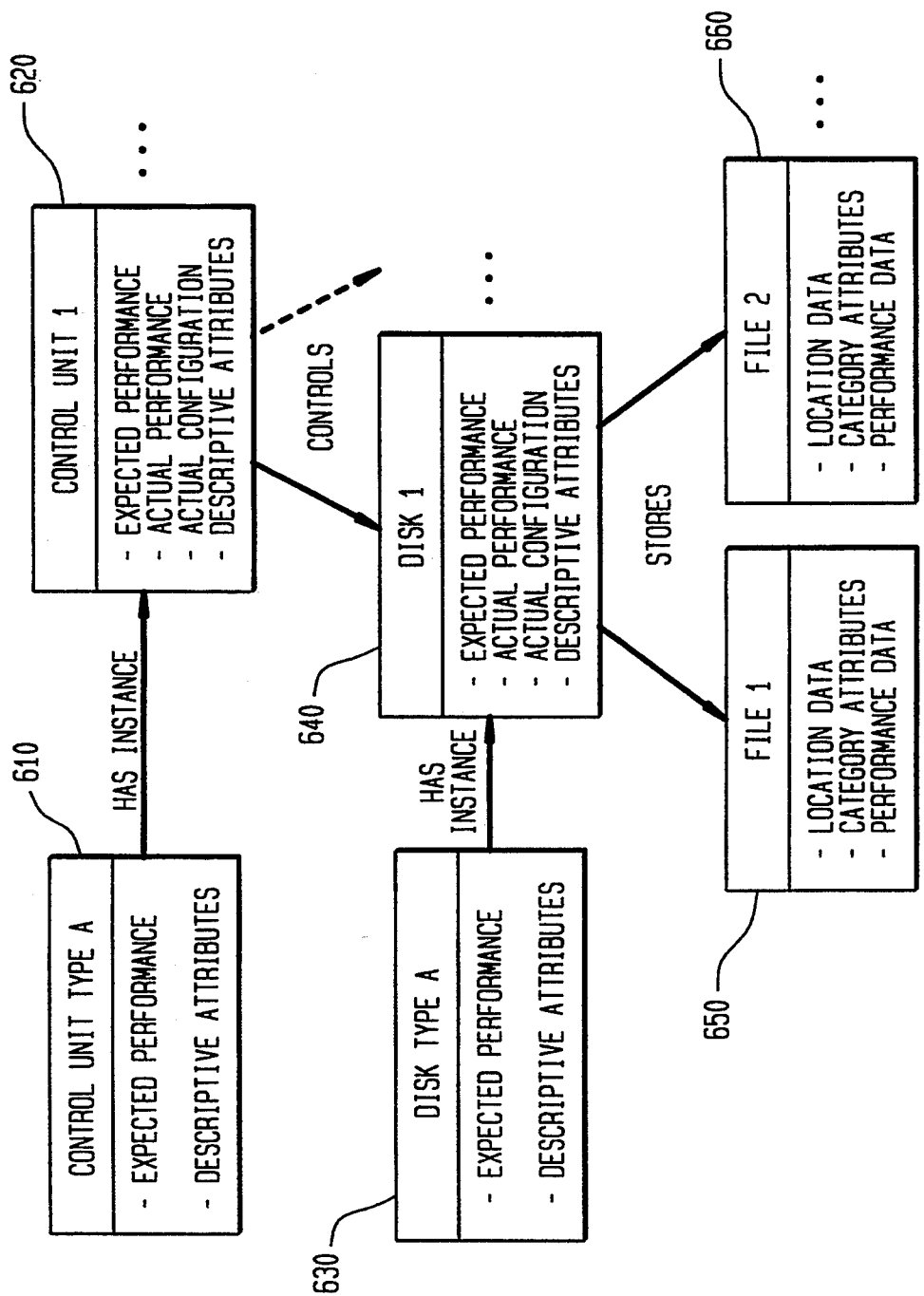

EXPERT SYSTEM FOR COMPUTER SYSTEM RESOURCE MANAGEMENT

CROSS-REFERENCE TO A RELATED APPLICATION

This is a continuation-in-part of application Ser. No. 07/539,730 filed Jun. 18, 1990, now abandoned.

COPYRIGHT NOTICE

A portion of the disclosure of this patent document contains material which is subject to copyright protection. The owner has no objection to the facsimile reproduction by anyone of the patent document or the patent disclosure, as it appears in the Patent and Trademark Office patent file or records, but otherwise reserves all copyright rights whatsoever.

TECHNICAL FIELD OF THE INVENTION

This invention relates generally to the process of controlling a large-scale software system and, more particularly, to a methodology for tuning a large-scale system to effectively utilize system resources such as a central processing unit and its associated database files and database servers.

BACKGROUND OF THE INVENTION

Effectuating efficient processing in the day-to-day operation of a large-scale software system has conventionally required staff personnel with expertise to interpret manifestations of system performance, and has consumed a significant amount of staff time and financial resources to identify actual and potential problem areas.

System performance is generally gauged by two very different measures, known respectively as system *response time* and system *throughput*. The former measure relates to the speed of responding to a single system command, whereas the latter means the efficiency of processing large amounts of data. Balancing these measures is the domain of the system expert, and overall efficiency depends on carefully arranging both the hardware and software that does the processing as well as the information that is stored in the system's databases. The procedure of allocating resources so that system processing is shared by the resources on a balanced basis is called "tuning."

Tuning of this type, namely, allocation of resources by a human system expert, is still carried out despite the advent of computerized, autonomous resource managers designed to optimize performance. These computerized managers are typically part of the operating system software and are designed to service general work loads, that as a rule are not backlogged. Representative of such computerized managers of the non-backlogged type is the subject matter of the disclosure of Watanabe et al. U.S. Pat. No. 4,890,227. For the non-back-logged case, it is possible to optimize both response time and throughput. For the backlogged case, improvements in response time come at the expense of throughput, with the converse also being true. However, these managers operate under the handicap that the current allocation of files to disks is outside the scope of their optimization. Also, of necessity, these managers lack application-specific knowledge. This limitation precludes them from including in their optimizations other, non-performance related concerns. A prime example of one such concern is allocating files to disks to minimize the impact on the system as a whole in the event that a particular disk fails. This concern is referred to here as developing a damage limitation policy and its implementation has a direct bearing on system availability. Finally, these managers do not attempt to regulate the flow rate of transactions into the system. Consequently, their optimization is a local, not a global optimization.

To place the response time and system throughput measures and their ramifications in a practical setting, reference is made to an illustrative example of a large-scale software system, designated the FACS system, which finds widespread use in the telecommunications environment. The FACS system assigns and inventories telephone outside plant equipment (e.g. cable pairs) and central office facilities (e.g. cable appearances on a main distribution frame). Currently, the FACS system is embodied in approximately 1 million lines of source code. It runs on a mainframe or host computer composed of a CPU complex with 2-4 processors, an I/O system containing 6-8 dual disk controllers, and 60-80 600 million byte disks. Because of the complexity and size of the FACS system as well as its sophisticated execution environment, operating the FACS system with acceptable response time while maintaining high system throughput is an on-going challenge which requires tuning skills of an expert to achieve a high level of system performance.

Formulating a thorough diagnosis and just one possible remedy for performance problems in such a large system typically takes expert analysts several days. Starting with performance symptoms, analysts manually tuning a FACS system first deduce which of several kinds of data they need to analyze the problems. Then they apply formulas and guidelines based on their own experience to arrive at a basic understanding of the problem areas—for instance, occasionally transactions stack up in queues leading to inefficient use of central-processing resources. Next, the analysts cull the data, searching for specific explanations for the degradation of performance. The final step, identifying solutions, again calls for using so much knowledge and data that short cuts based on past experience are a practical necessity. Of course, once changes are made, another cycle of analysis must be undertaken to verify that problems are corrected. Because the analysis is so time consuming and difficult, performance issues are often addressed only after system performance has degraded.

When systems of this size go awry, there are typically many symptoms to analyze. It is difficult to isolate those that are truly performance affecting from those that merely appear to affect performance. To cull the important symptoms, and then synthesize assessments of the current state of the system requires an understanding of how a symptom (such as a large number of concurrently active processes) affects the users' perception of the responsiveness of the system as a whole. Developing this view requires deep analysis, facilitated by the mathematics of queueing theory. The analysis techniques themselves are difficult to understand and to properly interpret the results obtained from them requires insight into the dynamics of the underlying system.

SUMMARY OF THE INVENTION

These deficiencies as well as other limitations and shortcoming of these and other techniques are obviated, in accordance with the present invention, by an expert system implemented by computer software that utilizes measured data and deploys a search technique which references a knowledge base, including a set of rules derived from domain experts, to tune the large-scale system.

In the preferred embodiment of the present invention, the host system that is to be monitored for tuning is linked to a workstation which implements expert system software. The host system is sized to insure concurrent transaction backlog during peak hour, and includes disks, disk control units, and files on the disks controlled by the disk control units; the host also has measurable central processing unit (CPU) and input/output (I/O) service times. A set of operational principles relating to the operation of the host system is defined by capturing operational and descriptive information supplied by a host system expert who acts as a mentor for the expert system. The operational principles are transformed into an executable knowledge base and then stored in a memory of the workstation. The CPU and I/O service times are measured on the host, as controlled by the expert system. The I/O service times are stored in the memory, and the CPU service times are processed by the expert system before storage in the memory. The stored CPU and I/O service times are then processed to generate system state data. In one aspect of the present invention, sequencing through the set of operational principles with the system state data is effected to obtain CPU-response time information with is used to modify the concurrency of the host system as determined from the CPU-response time information. In another aspect of the present invention, the expert system is loaded with the current I/O configuration arrangement of the host system, and sequencing through the set of operational principles with both the I/O service times and the I/O configuration information is effected. The result is I/O modification information which is used to reallocate the current allocation of files to disks. When tuning is recommended, program code in a form executable by the host is automatically generated by workstation software. The code may be uploaded to the host for execution to thereby implement the recommended changes.

Accordingly, the subject matter of the present invention is composed of a methodology that enhances the performance and availability of a dedicated, application specific host or main frame computer, sized to insure a transaction back-log during peak hour, where the number of concurrent transactions, the allocation of files to disks and across disk control units, are the parameters to be optimized. The subject matter of this invention not only explicitly addresses the response time-throughput trade off, but also explicitly considers a file allocation policy during system optimization, tempered by damage limitation considerations.

The ART system (ART is a trademark of the Inference Corporation) and the Lisp language are the implementation vehicles for the heuristic aspects of the file allocation optimization in this invention. A key component of this functionality involves the use of an Assumption-based Truth Maintenance System to determine file relocation solutions to I/O subsystem tuning problems. The process involved is a heuristic search through plausible file relocation solutions, considering application and system level factors. The ART system and Lisp give no guidance or structure for performing or controlling this search. The structure and control of the search are part of this invention. The role of the ART system is to provide generic truth maintenance utilities to ease the implementation task.

In performing such a search using the ART system, it is not simply the case that the ART system is missing the knowledge (data) itself which is then supplied. With the present invention, the search algorithm is devised independently of the ART system or the knowledge for which the ART system is designed to work.

The organization and operation of this invention will be understood from a consideration of the detailed description of the illustrative embodiment, which follows, when taken in conjunction with the accompanying drawing.

BRIEF DESCRIPTION OF THE DRAWING

FIGS. 4A and 4B depict the I/O System Diagram output display from the expert system.

FIG. 5 presents the repair recommendation for the particular FACS system under evaluation; and FIG. 6 illustrates frames with I/O subsystem data.

DETAILED DESCRIPTION

To place in perspective the detailed description of the present invention, it is instructive to gain a basic understanding of the manual technique for tuning a large-scale software system. Accordingly, the first part of this detailed description discusses the conventional methodology as it is applied to the FACS system. This approach also has the additional advantage of introducing notation and terminology which will aid in elucidating the various aspects of the present invention.

The next part of the description then focuses on a discussion of the functionality of the expert system (ES) as well as the processing effected by the software modules comprising ES. After this, the actual code for ES is presented.

Conventional Tuning

Figure 1:
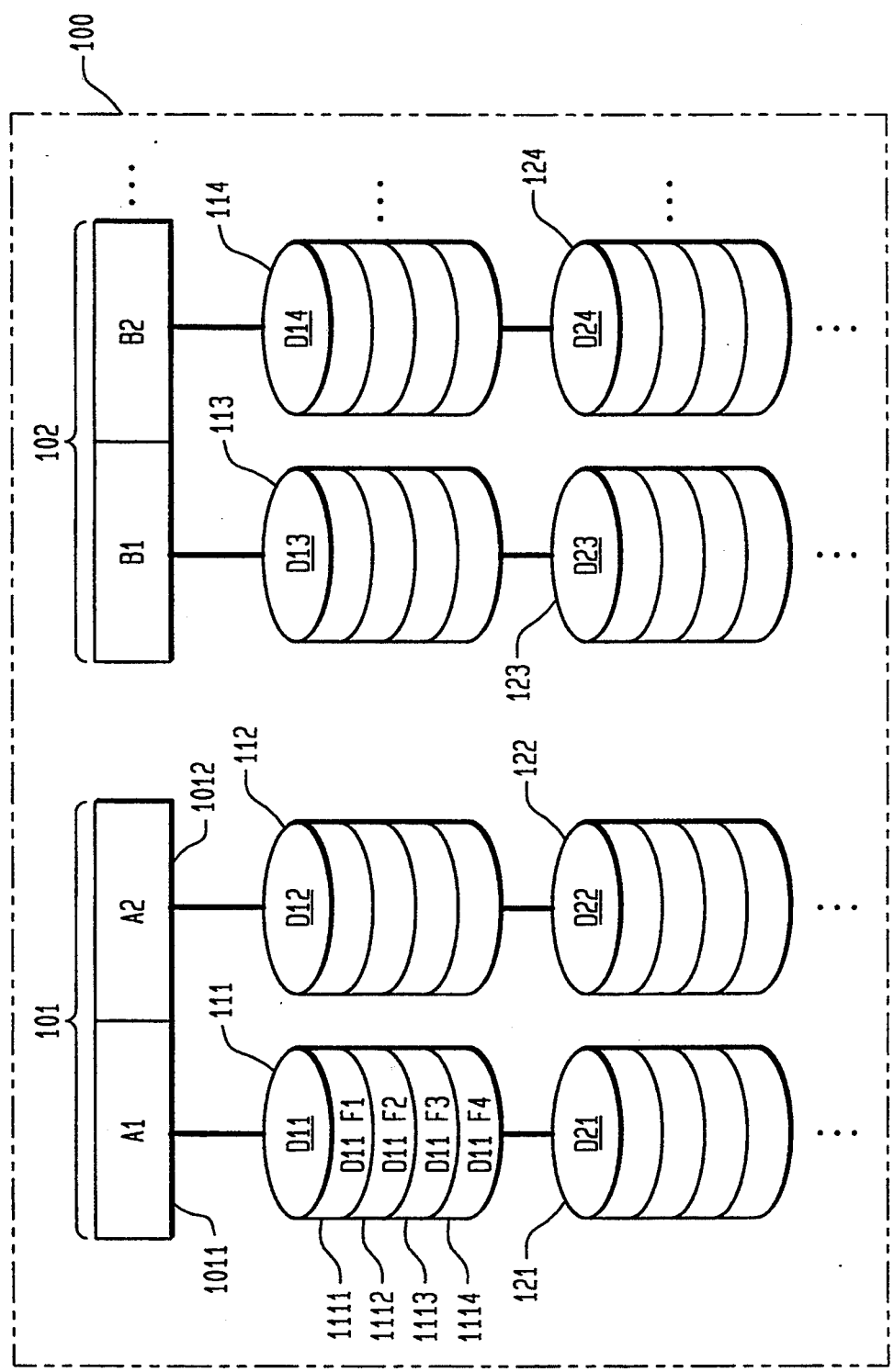
FIG. 1 depicts a logical view of a portion of the I/O system of the large-scale system to be tuned.

A human analyst begins by first identifying which area of the tuning spectrum should receive intensive analysis. The analyst does this by determining the magnitude and source of the queueing delays present in the response time of the average FACS transaction. The source of delay may be, for example, the CPU complex or the I/O system. Once quantified, the analyst them judges where to concentrate. For illustrative purposes to introduce the notions of tuning, it is supposed that the I/O system was selected. With reference to FIG. 1, a "logical" view (in contrast to a block diagram or schematic view) of one subsystem of the FACS system, namely, FACS I/O system 100, is depicted. Elements 101,102, ... are dual disk controllers (typically there are 6–8 disk controllers), with controller 101 being composed of single controllers 1011 (A1) and 1012 (A2), respectively, and so forth. Elements 111–114 (D11,D12,D13,D14), 121–124 (D21,D22,D23,D24), ... are disk packs (typically there are 60–80 600 million byte packs); disk 111 is shown as being comprised of files 1111–1114 (D11F1,D11F2,D11F3,D11F4), respectively. Files typically are of specific types such as a library or database. Disks 111,121, ... are controlled by controller 1011, disks 112,122 . . . are controlled by controller 1012, and so forth.

The types of problems that can occur in system 100 include: Disk D11 is "hot," that is, is heavily used because of the types of files stored by the disk pack; file D11F1, which is a database, and file D11F4, which is a library, are on the same disk pack which has the potential for causing an access time problem; or the average "utilization" of controller 101 exceeds a prescribed threshold.

To identify "hot" control units or disks, experienced performance analysts check a high-level report, referred to as the Controller and Disk Activity Report, by comparing the measured control unit utilization and disk utilization with their respective threshold values. To further pinpoint the possible causes of equipment being hot, expert analysts consult a report called the I/O Trace Summary Report which details I/O statistics at file level by device. Performance analysts manually calculate the utilization of each file on the hot equipment using the statistics reported on the I/O Trace Summary Report and single out the ones that have the highest utilization because their removal will most significantly relieve the workload on the hot equipment. In addition, performance analysts must also verify if file placement guidelines are carefully followed across the I/O system. The characteristics of the FACS system and the capability of computing hardware prohibit multiple, heavily used files to be placed on the same pack to avoid contention, and require certain system and application files to be duplexed, that is, the creation of an identical version of a given file, for the purpose of recovery. In the given I/O system, performance analysts examine the I/O Trace Summary Report looking for offending files located on a hot disk, say D11. This pack contains D11F1, D11F2, D11F3, D11F4, and other files. Assisted by their familiarity with their system's file numbering schemes (e.g., which number stands for which file) and their knowledge of the file naming convention, and a detailed File Placement Report, performance analysts identify that a data base file (D11F1) and a library file (D11F4) coexist on the same disk. Since both are heavily used files and placing them together on the same pack may cause the disk to be overly utilized, performance analysts compare the file utilization of both files and relocate the most heavily used one, e.g. the library file, to a less busy pack. Other than moving files around, performance analysts may take different action (e.g. duplex the offending file to reduce traffic) depending on the nature of the problem and the type (e.g., database or library file) of offending file.

Manually finding a best offload location for a file move is a complex task. Ideally, analysts must first identify all available offload equipment having the same physical characteristics but which are not as busy as the current equipment by going through the File Placement Report and the Controller and Disk Activity Report. They then need to manually adjust the performance statistics on the currently located pack and each possible offload pack to reflect the shifted load, based on the statistics reported on the Controller and Disk Activity Report and the I/O Trace Summary Report. To verify that no new performance problems are introduced, they must apply the file placement guidelines used originally to detect problems to the reorganized I/O system. Finally, performance analysts select the one with the lowest utilization and fewest potential problems. Because of the complexity of the task, performance analysts do not always follow the procedure described above. There is a tendency to stop the searching process when they find the first location that fits the problem file. To verify if existing problems are resolved and no new problems are created, performance analysts must collect and analyze another data sample.

Overview of the Present Invention

Figure 2:
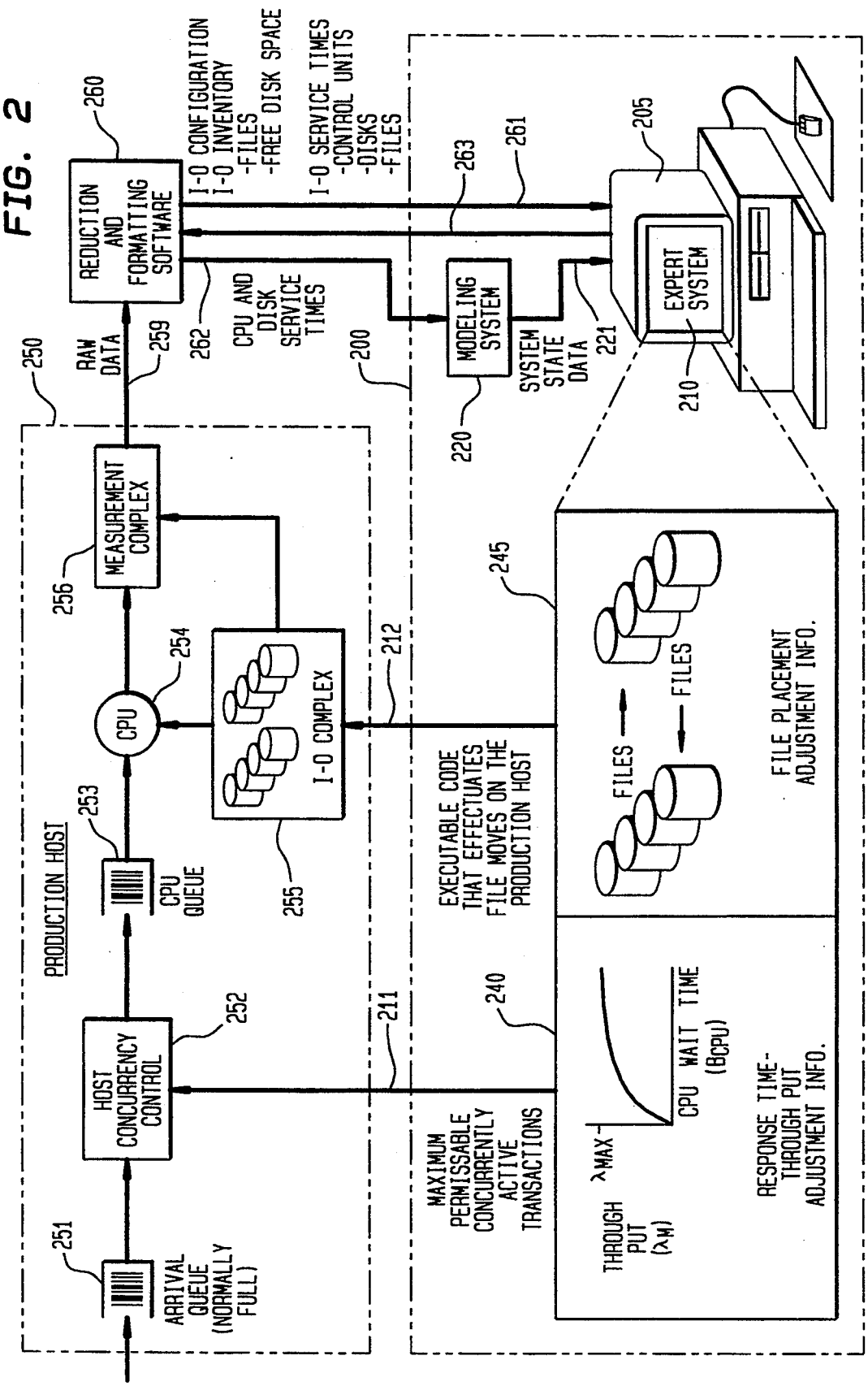
FIG. 2 depicts the large-scale system to be tuned in block diagram form as well as the workstation which implements the expert system (ES) analysis.

With reference to FIG. 2, pictorial diagram 200 depicts an arrangement of the computerized expert system in accordance with the present invention, namely, ES 210 operating in conjunction with modeling system 220, shown as analyzing and providing corrective performance adjustment information, via feedback paths 211 and 212, to improve the responsiveness of FACS production host 250. Typically host 250 is configured, for purposes of discussing an illustrative embodiment of the present invention, to include: arrival queue 251; host concurrency control 252; CPU queue 253; CPU 254; I/O complex 255; and measurement complex 256. ES 210 is implemented by computer software resident within workstation 205. Typically, modeling system 220 is also implemented with software resident within workstation 205. The adjustment information is of the type that provides: (a) parameter information for setting the maximum permissible concurrently active transactions (lead 211); and (b) executable code that effectuates file moves on production host 250 (lead 212). The adjustment information may also be observed by a responsible user of system 250, via display panels 240 and 245; this user is responsible for insuring that production host 250 provides acceptable service to its community of end users. The responsible user oversees the interaction between ES 210 and production host 250 and can monitor changes to production host 250 as guided by the adjustment information. As alluded to, the adjustment information is specific to two areas. The first is the response time-throughput trade off, and the second is file placement. In each case, the implementation of the adjustment information results in changes to production host 250. The effect of implementing the response time-throughput adjustment information is to modify the number of transactions permitted to process concurrently. The effect of implementing the file placement adjustment information is to move or modify the configuration of files to eliminate over utilized disks and control units or minimize the impact on production host 250 in the event that a disk or control unit fails. When a file is moved or modified for this reason, it enhances the availability of production host 250. File moves or configuration changes triggered by this reason are referred to as damage limitation modifications.

Response Time-Throughput Adjustment Information (Reference is made to the Glossary for the complete definitions of terms and symbols contained in the remainder of this specification). To gain additional insight into the nature of the response time-throughput adjustment information identified in panel 240 of FIG. 2, an understanding of the nature of the response time-throughput time trade off, the subject of the adjustment information, must be elucidated. There exists a direct relationship between the number of transactions, $T_{hreads}$, concurrently active in host 250 the rate at which they are served, $\lambda$. Although this relationship can be developed for any system, it is particularly important for systems designed to operate at high processor utilization, a condition present in back-logged systems, i.e. system where transactions are waiting to begin processing, as indicated by the state of arrival queue 251 on production host 250.

For any finite system, as the number of transactions concurrently admitted to service increases, the service rate asymptotically approaches an upper bound, $\lambda_{max}$. This bound is governed by the physical characteristics of the host system, i.e., the number and speed of the system's physical devices, CPUs, disks and control units, and the host system resource cost, the CPU and disk service time, necessary to satisfy each transaction's demand for service. When a host system operates in the neighborhood of the bound $\lambda_{max}$, admitting additional transactions only increases the wait-time experienced by each transaction. This effect manifests itself as an elongated transaction existence time, T. Balancing the admission of additional transactions which results in higher contention, induced wait-time against the increase in throughput obtained from the higher concurrency is known as the response time-throughput trade off. In alternate terms, the trade off consists of striking a balance between quick response for an individual transaction and the rate at which large numbers of transactions are processed by production host 250.

There are many ways to depict this trade off. The method chosen for illustrative purposes of the present invention is to display the rate of service, i.e., the transaction throughput, $\lambda_M$, as a function of the amount of CPU queueing, $B_{CPU}$, while explicitly stating the number of transactions concurrently active in the system. This relationship is portrayed by the curve in display panel 240 of FIG. 2. Note the asymptotic behavior—as additional transactions are admitted the throughput approaches $\lambda_{max}$.

Once this relationship is developed, the final step in producing adjustment information is to quantify as well as to make known to the responsible user the implications of choosing one realization of the response time-throughput time trade off over another, as well as supplying for the contemplated realization, the (1) maximum allowable concurrency that should be set in host 250 to effect the realization, $Threads_M$
(2) the expected processing rate, $\lambda_M$
(3) expected CPU queuing time, $B_{CPU}$
(4) the expected existence time, $T_M$, and
(5) the expected CPU utilization, $\rho CPU_M$.

Elucidating these implications is accomplished by a set of operational principles, which also provide the operating point information stated above. The elucidation is in the form of statements that quantify changes from the current CPU queuing time and system throughput. The elucidation plus the vector ($Threads$, $\lambda_M$, $B_{CPU}$, $T_M$, $\rho CPU_M$) at the contemplated realization makes up the "Response Time-Throughput Adjustment Information", namely, panel 240 in FIG. 2. The complete set of principles that generate this adjustment information is stated in Appendix A.

Figure 3:
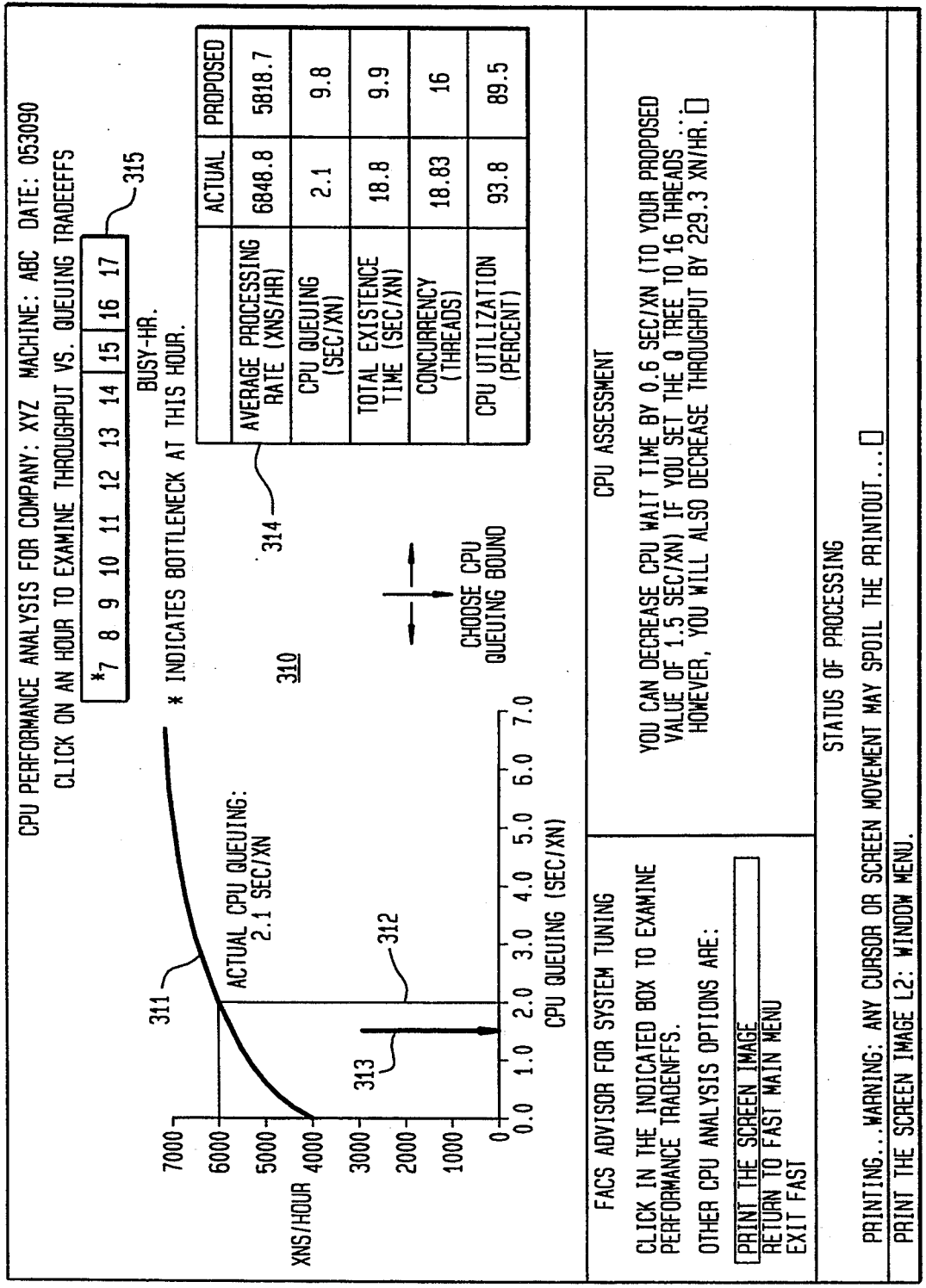
FIG. 3 is illustrative of the CPU Performance Analysis Presentation output display from the expert system.

Since the observer of the adjustment information is the responsible user, the form of the adjustment information, as distinguished from its content, is also important. The illustrative embodiment of ES 210 offers this adjustment information using both a graphical and textual presentation, as exemplified in FIG. 3. The default display 310 of FIG. 3 is the pictorial interpretation of the busy hour model, as traced by curve 311. The X-axis shows the amount of time each transaction waits for service by the CPU complex while the Y axis shows the throughput, given that the user is willing to tolerate the selected wait time which is an input parameter. The current wait time in the FACS system is shown by vertical straight line 312. A responsible user may investigate the tradeoff between the wait time and system throughput by moving arrow 313 toward the origin (reducing the wait time) or away from the origin (increasing the wait time.) Table 314 reports the actual measurements (average processing rate, CPU queueing, total existence time, concurrency, and CPU utilization) and the forecasted results based on the proposed wait time specified by the user. This computation module of ES 210 also allows the user to explore other hours available on menu 315. Display 310 is redrawn each time the responsible user chooses a different hour and table 314 reflects the statistics of the selected hour.

File Placement Adjustment Information

It is recalled that the objective of producing the file placement adjustment information is to move or modify the configuration of files to eliminate over-utilized disks and control units, or minimize the impact on production host 250 in the event that a disk or control unit fails.

The rationale for the decision to move or modify the configuration of files is that high device utilizations cause unnecessarily long I/O existence times, resulting in unacceptable performance. The central issue here is "What constitutes unacceptable performance"? ES 210 bases decisions on non-transitory, abnormally high device utilizations. Non-transitory is important. In practice, just as a human analyst does not react to floating hot spots, busy components caused by high, but short lived traffic to a particular file, neither does ES 210. Transitory I/O traffic can be induced by variations in the transaction workload. To avoid recommending moves one day only to discover that the move was unnecessary later, ES 210 will not generate code to move files for a-priori designated files whose traffic is known to be transitory. The responsible user identifies this type of file to ES 210.

To quantify high device utilizations, analyses determined the correlation between a hardware component's utilization and the queueing delays experienced by an average transaction. These analyses, specific for the FACS application, culminated in utilization thresholds, that if consistently exceeded, lead to the conclusion that a disk or control unit has unacceptable performance. These thresholds are supplied as defaults in ES 210, and can be modified by the responsible user.

Similarly, system availability improvements can be achieved if steps are taken to minimize the impact on production processing, if a hardware component fails, i.e. if a damage limitation policy is implemented. In the illustrative embodiment, ES 210 implements a FACS-specific damage limitation policy by consolidating files containing key application data bases on the same disk, or when appropriate, duplexing files. Duplexing files means that two live copies of a file can exist, with either copy capable of servicing an application. In the event that a disk containing one of the two copies fails, processing continues without interruption. If a file is duplexed both copies should not be placed on the same disk, or if one is conservative, on the same string.

ES 210 produces file placement adjustment information by implementing the following reasoning process. First, ES 210 detects high utilization control units and disks by comparing measured utilizations with the thresholds identified above. Next, ES 210 determines which files are causing the problem by identifying high traffic files. ES 210 will also examine how the files are allocated across packs and disk strings looking for files that violate the damage limitation policy. The hardware performance of individual disks is checked against the manufacturer's performance specification. Finally, file placements, known to have caused problems in the past, perhaps on other FACS systems, are identified. This phase of the analysis process culminates in a list of problem files.

Given the problem list, ES 210 then develops the file placement adjustment information, including file moves, duplexing, or main memory caching recommendations. This adjustment information is composed of not only moving high traffic files to less heavily utilized disks, but also preferentially taking advantage of operating system file duplexing and main memory caching capabilities to reduce the traffic to files identified as problems.

This is the most demanding portion of the process. In the case of file moves, there are potentially many candidate locations. Using a search technique, ES 210 finds the "best" new location for each offending file, as measured by minimum post-move disk and controller utilization, and smallest spare slot, large enough to accommodate the offending file, usually on the same disk. Most importantly, ES 210 does this without creating new problems. The search culminates in a list of new locations for the problem files. The current and new locations are used by ES 210 to generate code, which when executed on production host 250, effectuates the file moves.

In the illustrative embodiment of the invention shown in FIG. 2, the "File Placement Adjustment Information" of panel 245 includes the following types of recommendations, which may or may not all be present depending upon the condition of the I/O subsystem.
(1) file moves, expressed in the form of executable code, plus a pictorial representation of the effect of implementing the moves,
(2) file duplexing recommendations,
(3) main memory file caching recommendations.
Appendix B lists the operational principles that produce the file placement adjustment information.

Figure 4A:
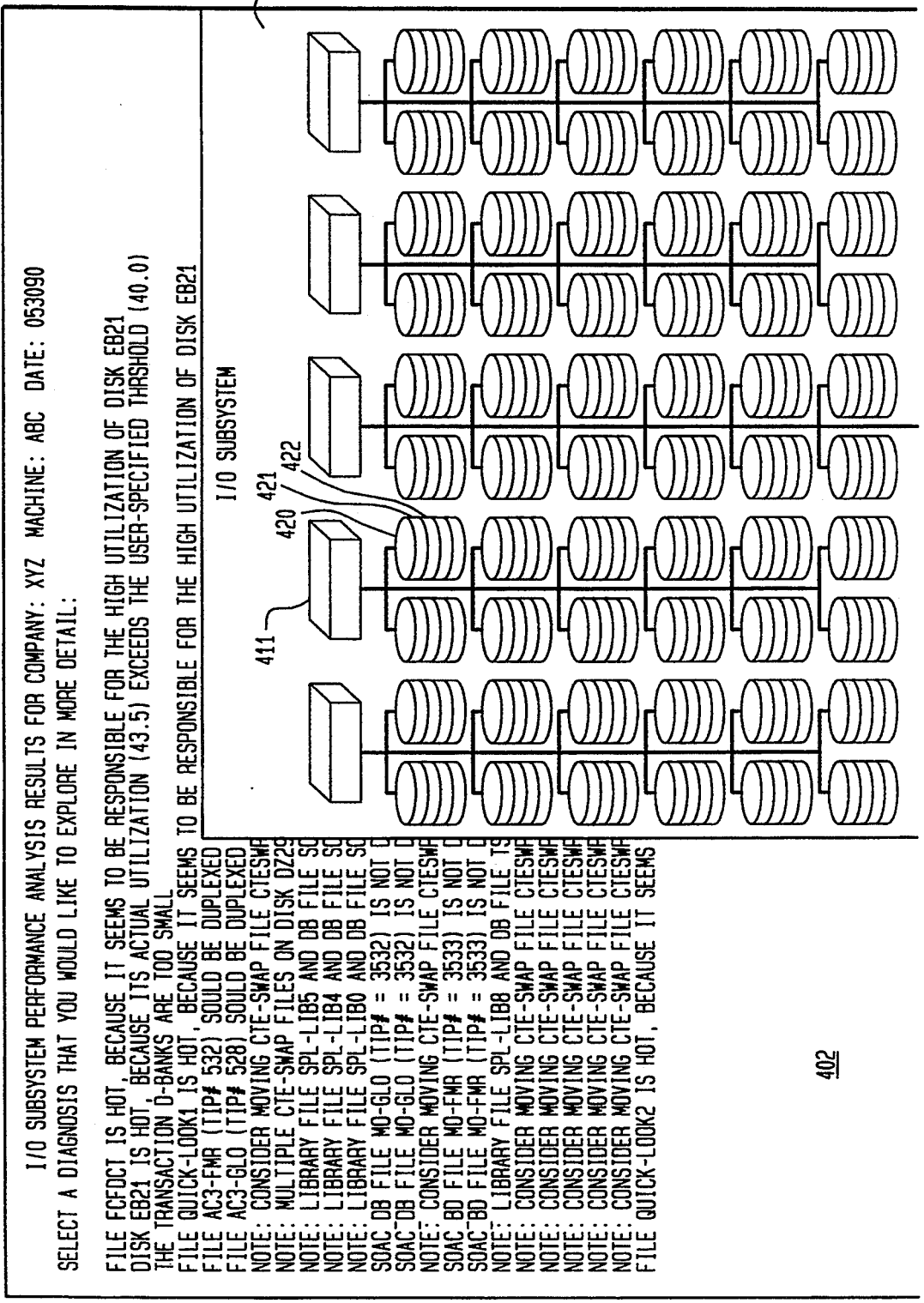

As was the case for the response time-throughput adjustment information, in order to keep the responsible user fully informed of the curative measures ES 210 deems necessary, the illustrative embodiment presents its adjustment information in an easily understood format. The human-readable interface presents a compact, coherent, graphical representation of the I/O complex, depicting the connectivity of its control units, and disks, and the location of problem files, and animates the file moves, showing their migration from the current, problematic locations to the new locations specified in the file placement adjustment information. Other curative measures contained in the placement adjustment information, i.e. duplexing and caching recommendations, are presented in textual form. FIG. 4 is an example of this I/O display, and panel 504 of FIG. 5 is an example of the high level code which effectuates file moves when executed. Appendix C shows actual source code deployed to generate FACS-compatible code. In particular, regarding FIG. 4, so as to visualize I/O system performance problems, a compact graphical display of the I/O system may be called into view on workstation 205; the result of this activity is shown as overlay panel 401 in FIG. 4. Background panel 402 is used to summarize detailed diagnoses in textual format. Overlay panel 401 shows in graphical form the large complex comprising the disk control units (e.g., unit 411), the disks controlled (e.g., disk 420), and the files (e.g., files 421,422) stored by the disks; a partial view of overlay panel 401 was depicted in FIG. 1.

Defining a Set of Operational Principles

An operational principle is a succinct statement of a possible contingency, which, if it occurs, triggers a conclusion that obviates the contingency. A knowledge base is a set of related operational principles, whose contingencies and conclusions encompass the outcomes expected from some process under observation. Here the process being observed is the operation of a main frame computer, the contingencies are the various symptoms indicative of problematic performance or availability that might occur, where the symptoms are embedded in measurement data. The conclusions are specific actions designed to obviate problematic performance or improve system availability. Thus, a knowledge base, in its totality, is a representation of how a human expert reasons about a problem domain.

In constructing the operational principles that make up a knowledge base, it is first necessary to understand the problem domain. In this embodiment, the problem domain consists of both the response time-throughput trade off, and the factors that affect the performance and availability of an I/O complex supporting the host application. Understanding the problem domain includes knowing how the I/O components should be connected, the expected performance of each type of disk and control unit, and how files should be allocated across the I/O complex. Given this understanding, a human expert augments it with first conceptualizing contingencies that, should they occur, are performance or availability affecting, then postulates and confirms conclusions that when implemented, obviate the contingencies. Note that this conceptualization is the essence of defining the operational principles that make up a knowledge base and is independent of the computer language, or expert system knowledge encoding facility used to eventually represent the knowledge.

Part of the conceptualization process is recognizing which contingencies can be detected when observing a system and which cannot. This is a measurement issue. The robustness of the measurement instrumentation on production host 250 shown in FIG. 2 constrains the operational principle set to those principles whose contingencies will be triggered by particular values in the data. For if an event is not measurable, it is by definition not observable, and hence cannot be included in the knowledge base. In the illustrative embodiment, the complete set of data used by ES 210 is provided in Appendix D.

Transforming the Operational Principles into an Executable Knowledge Base

The transformation of operational principles into an executable knowledge base occurs through the creation of two primary types of structures in the knowledge base: frames and forward chaining rules implemented in the ART system language. These structures are broadly defined as follows:

frame—A collection of information about a stereotypical object, act, or event, and the relationship of the object to other objects. For example, with reference to FIG. 6, stereotypical disk pack 630 in FACS has expected performance information as well as descriptive attributes, and actual FACS disk pack object 640, which is connected through the instance-of(HAS INSTANCE) relationship, has actual performance information plus information inherited from stereotypical disk 630. Actual disk pack object 640 controls files 650 and 660. Similarly, stereotypical control unit object 610 has expected performance information which is inherited by actual FACS control unit object 620.

forward chaining rule—A segment of computer code which designates that

IF a particular situation is described by the program's data

THEN the program should take a particular action Forward chaining rules are executed by a general interpreter, which for the illustrative embodiment is provided by the ART system language, that matches rules with data, and executes rules whenever their IF conditions are satisfied. This data-driven type of computer program is contrasted with traditional procedural computer programs, where ordering of the program instructions determine how the program is executed. Appendix G gives specific examples, in ART code, of forward chaining rules.

Frames give an internal representation of the external view of the FACS system. For the I/O subsystem, frames represent physical objects (disk controllers, disks) and computer software objects (files). Handcrafted, stereotypical, frames contain expected performance (I/O existence time) of specific models of disk controllers and disks, as shown in FIG. 6. This information is inherited by instances of those objects which represent actual instances in the FACS computer configuration, defined by the data obtained via the Reduction and Formatting software 260 identified in FIG. 2. These instances of disk controllers, disks, and files now have actual I/O existence time data, which can be compared to expected data values. Similarly, the system state space, which provides data on tradeoffs between response time and throughput as the number of customers vary, is represented as frames.

Heuristics (rules of thumb), implemented as forward chaining rules, constitute the second type of structure in the executable knowledge base. For I/O subsystem processing, these heuristics compare expected to actual service times along with relative comparisons of actual service times to pinpoint bottlenecks in the I/O subsystem. For CPU processing, rules interpret the state space relative to the amount of queueing (wait time) a user is willing to tolerate.

Lisp language computer programs provide a support structure which makes possible specialized processing, such as that needed to obtain I/O modification information as described in the Section to follow.

Obtaining the Expert System Inputs

FIG. 2 shows information labeled "RAW DATA" on lead 259, flowing between Measurement Complex 256 and Reduction, Formatting and Modeling Software 260. This data is made up of detailed information contained in the System Log File, the I/O Trace file, the SIP File and the Master File Directory, and is produced by host supplied software. The purpose of Reduction, Formatting and Modeling Software 260 is to condense and transform this detail into a form readily used by ES 210 to support the operational principles that generate the response time-throughput and file placement adjustment information.

In FIG. 2, two flows are shown emanating from Reduction and Formatting Software 260, namely information of leads 261 and 262, with both terminating in ES 210 and under control of control information provided over lead 263 from ES 210. The right hand flow over lead 261 is direct and provides the information necessary to drive the File Placement operational principles. This flow consists of the Control Unit, Disk, and File I/O service times, an inventory of the files that support the FACS application, with an accounting of the disk space these files require, the available free disk space, and an accounting of the free locations, and the connectivity of control units and disk drives, also known as I/O configuration information.

The left hand flow over lead 262 initially consists of CPU and disk service times. It first traverses Modeling System 220, where it is transformed into System State Data appearing on lead 221 before arriving at ES 210. The System State Data supports the response time-throughput operational principles, and a portion of this data eventually becomes part of the response time-throughput adjustment information.

For the complete specification of each of the individual data items that make up the generic information categories emanating from Reduction, Formatting, and Modeling Software 260, reference is made to Appendix D. Also, see this same Appendix for a list of the individual software components that make up Reduction, Formatting and Modeling Software 260.

Producing the System State Space

The state space is a compact representation of key parameters of the system derived under different conditions of transaction concurrencies. More formally, the system state space consists of an array whose rows consist of the five elements, ($T_{hreadsM}$, $\lambda_M$, $B_{CPU}$, $T_M$, $\rho CPU_M$). Each row corresponds to a particular number of transactions concurrently active in the system, i.e. The first row corresponds to one transaction, the second row, to two transactions, etc.

Note that a major portion of the response time-throughput adjustment information described earlier is a row of the system state space array, developed under the guidance supplied by the response time-throughput operational principles.

The state space array may be generated by any one of several techniques, a discrete event simulation, or modeling the system as a product form network then solving the model using a convolution or mean value analysis algorithm. All of these techniques require the service times as their inputs, and use an algorithm of choice to transform service times into the system state data.

In the current embodiment, the model is solved using Buzen's (see, for example, Allen, A. O., "Probability, Statistics, and Queueing Theory", Academic Press, 1978) recursive solution, a convolution algorithm, for a single work load class, non-priority, central server model that includes the CPU complex and all active disk devices. The model is self-calibrating in that iterative solutions attempt to match the measured transaction existence time at the measured transaction volume, and transaction concurrency, by adjusting the service time of internal software locks whose occurrences are measurable, but whose durations are not. After achieving a satisfactory match, the final model is solved to produce the system state array for all feasible transaction concurrencies. Appendix E is a listing of the code which implements the model solution above.

Obtaining I/O Modification Information

Diagnosing I/O Subsystem Problems

Forward chaining rules reason over the data described above to identify problem-causing files in the I/O subsystem. There are two categories of problem-causing files:
(1) Hot (highly utilized) files which impact the utilization of a control unit or disk, and therefore are labeled primary move candidates.
(2) Poorly placed files, which because of their placement relative to the locations of certain other files have the potential for causing performance or recovery problems. This type of file has secondary move priority.

The structure of the domain modeled above, such as control of disks by a certain control unit, or storage of file fragments by a certain disk, is used by the diagnosis heuristics to identify hot files. An example of this type of heuristic is:

IF the transfer rate of a hot file explains a hot control unit
THEN designate this hot file as a primary move candidate The analysis heuristics make use of performance evaluation formulas, such as this formula for the heuristic above:

$$\Delta \rho_{hot\,file} \equiv \frac{(\lambda * XFER)_{hot\,file}}{2}$$

That is, the contribution of a hot file to the utilization of a dual control unit is equal to the transfer rate of that hot file times the I/O rate in requests per second, divided by two.

A heuristic which may identify other problem files (secondary move candidates) is:

IF a database spans multiple disks, and the database fits on one disk
THEN consolidate the database on one disk Various heuristics also identify, for example, sub-par performance of I/O subsystem hardware. Heuristics and formulas thus identify files which should be moved to help balance the load across the I/O subsystem, and other heuristics identify and advise the end-user of isolated problems.

Repairing Problems in the I/O Subsystem

After finishing its I/O problem diagnosis stage, ES 210 attempts to repair the I/O subsystem problems identified. ES 210 arrives at its recommendations by simulating sequences of file moves, and choosing the sequence that solves the most problems (without creating any major new ones). These sequences of simulated moves are represented internally in ES 210 as paths in a search tree, where the root of the tree represents the initial (actual) system state, and each node represents a hypothetical system state resulting from an experimental file relocation. An Assumptive Truth Maintenance System (ATMS), provided by the ART system Viewpoint mechanism, handles the details of maintaining the distinction between ES 210's real and hypothetical system states. The search strategy devised as part of the inventive aspects of the present invention, described in the following paragraph, makes use of this Viewpoint mechanism to simplify the implementation of the search for I/O problem repairs.

For each file that it tries to relocate, ES 210 ascertains the set of disks that have enough spare space and utilization (including controller utilization) to accommodate that file. Heuristics set forth in Appendix B aid in the selection of potential new locations for a problem file. These heuristics, which represent system attributes and various FACS application characteristics that can affect performance, include the following examples:

IF reference files are being relocated
THEN place no more than two reference files on a disk and IF a disk has more than one space large enough for the file
THEN use a best-fit algorithm to choose one.

Now that it has a set of candidate new locations, ES 210 expands its search tree by creating a new node for each of the hypothetical new locations found for the file under consideration. ES 210 can then temporarily believe as fact the hypothetical assumptions (i.e. The file movements) that formed the new node, and reason independently about the system state embodied in each of these nodes. With the relocated file occupying the previously free space, and the disk and control unit utilizations adjusted to reflect the shifted load, ES 210 calls upon the same rules that it used for problem diagnosis in the original system state. This time, however, ES 210 does not report the diagnoses to the end user; rather, it uses them to judge the merit of the file move being considered. If any new problems are severe enough, the search tree node representing the experimental file placement is removed. This immediate pruning helps to control the size of the search tree.

Some of the problems that may be detected at a file's new location are not absolute constraints against moving the file there. ES 210 again uses heuristics to gauge the severity of the new problems and the original reasons for moving the file.

After it has considered new locations for all of the problem files, ES 210 examines the search tree and chooses the path that relieved hot spots most successfully while satisfying the greatest number of file placement heuristics. ES 210 extracts the set of file moves that compose this path and passes these recommended moves to host concurrency control 252 of FIG. 2; also, the responsible human is notified of these moves via display panel 240.

Many search techniques could be considered for this task, but those not used would fail. Alternatives to ATMS for belief revision in this repair task would not support the required reasoning to find the best solution. Brute force generate and test of consistent assignments would quickly lead to a combinatorial explosion of nodes in the search tree. Chronological backtracking would explore futile branches which were previously discovered to involve contradictory file assignments, and would re-expand various nodes of the search tree, again leading to efficiency problems. Dependency-directed backtracking (see, for example, Stallman, R., and Sussman, G., "Forward Reasoning and Dependency-Directed Backtracking in a System for Computer-Aided Circuit Analysis," Artificial Intelligence 9, pp. 135–196, 1977) as used in truth maintenance systems (see, for example, Doyle, J., "A Truth Maintenance System," Artificial Intelligence, Vol. 12, 1979) could find a solution to the file assignment problem, but would not easily find the best solution to this problem because search would stop at nodes where contradictions occur, and comparison of alternative file assignments would be almost impossible since only one alternative would be available in the database at any given time (see, for example, Williams, C., "Managing Search in a Knowledge-based System," Inference Corporation Technical Report). Therefore, the system is likely not to find the most desirable file assignments. Thus, ATMS, which allows the exploration and comparison of hypothetical file assignments, is used to handle belief revision and the search strategy entailed in the file assignment problem in ES 210.

Appendix F lists the source code to obtain the response time-throughput adjustment information for the CPU system.

Appendix G lists the source code for the rules to find the optimum placement for the files in the I/O subsystem according to what is known about those files and the disks and controllers they reside on.

Appendix H lists the source code for the frame definitions and rules the knowledge base uses to analyze the I/O subsystem, and the rules by which this analysis is accomplished. After these rules fire, ES 210 knows what problems exist in the I/O subsystem.

It is to be understood that the above-described embodiment is simply illustrative of the application of the principles in accordance with the present invention. Other embodiments may be readily devised by those skilled in the art which may embody the principles in spirit and scope. Thus, it is to be further understood that the methodology described herein is not limited to the specific forms shown by way of illustration, but may assume other embodiments limited only by the scope of the appended claims.

APPENDIX A
Response Time-Throughput
Operational Principles

THE RESPONSE TIME THROUGHPUT OPERATIONAL PRINCIPLES

This Appendix presents the operational principles that generate the response time throughput trade off adjustment information shown in FIG. 2.

Copyright (C) 1991 Bell Communications Research, Inc.
All rights reserved.

IF ( $\rho_{CPU_M}(T_{hreads_M} = 31) < \rho_d$, IN ANY HOUR )
THEN

- CONCLUDE THAT A SEVERE BOTTLENECK EXISTS.

- REPORT IN ASSESSMENT WINDOW, "A SEVERE BOTTLENECK IN {ID HOUR} PRECLUDES ACHIEVING THE DESIRED CPU UTILIZATION, $\rho_d$. MAXIMUM ACHIEVABLE UTILIZATION IS $\rho_{CPU_M}(T_{hreads_M} = 31)$ WITH THROUGHPUT OF $\lambda_M(T_{hreads_M} = 31)$ XNS PER HOUR."

IF $\left(\rho_{CPU_M}(T_{hreads_M} = 31) \geq \rho_d\right)$ $\left(\rho_{CPU} < \rho_d - C_{hoke}\right)$ ($\lambda T$ IS NOT A WHOLE NUMBER, TO 4 DECIMAL PLACES)
THEN

- CONCLUDE THAT THE OFFERED LOAD IS LOW.

IF (THE OFFERED LOAD IS LOW)
( $\rho_{CPU} < \rho_{CPU_M}(B^*_{CPU})$ )
THEN

- REPORT IN ASSESSMENT WINDOW, "THE CURRENT OFFERED LOAD IS TOO SMALL TO ACHIEVE THE TABLE'S PROPOSED VALUES. THIS PROPOSED SELECTION IS OF MINIMAL INTEREST."

IF ($W_{CPU}$ is within $(1 \pm C_{lose})B^*_{CPU}$)
(OFFERED LOAD IS NOT LOW)
(A SEVERE BOTTLENECK DOES NOT EXIST)

THEN

- REPORT IN ASSESSMENT WINDOW, "CURRENTLY THE Q TREE HVTIP CONCURRENCY IS SET TO ADMIT AT LEAST $[T \lambda]$ TRANSACTIONS"

IF ($W_{CPU} > (1 + C_{lose}) B^*_{CPU}$)
   (OFFERED LOAD IS NOT LOW)
   (A SEVERE BOTTLENECK DOES NOT EXIST)
THEN

- REPORT IN ASSESSMENT WINDOW, "CAN DECREASE WAIT TIME BY $(W_{CPU} - B^*_{CPU})$ WITH NO OTHER TUNING CHANGES IF Q TREE IS SET TO $(Threads_M(B^*_{CPU}))$ THREADS, BUT WILL DECREASE THROUGHPUT BY $(\lambda - \lambda_M(B^*_{CPU}))$."

IF ($W_{CPU} < (1 - C_{lose}) B^*_{CPU}$)
   (OFFERED LOAD IS NOT LOW)
   (A SEVERE BOTTLENECK DOES NOT EXIST)
THEN

- REPORT IN ASSESSMENT WINDOW, "CAN INCREASE THROUGHPUT BY $(\lambda_M(B^*_{CPU}) - \lambda)$ SEC./XN BUT, WILL INCREASE WAIT TIME BY $(B^*_{CPU} - W_{CPU})$ IF Q TREE IS SET TO $(Threads_M(B^*_{CPU}))$."

IF ($\rho_M(B^*_{CPU})$ is outside of $[\rho_d \pm C_{hoke}]$)
   (OFFERED LOAD IS NOT LOW)
   (A SEVERE BOTTLENECK DOES NOT EXIST)
THEN

- REPORT IN ASSESSMENT WINDOW, "HOWEVER, THIS SELECTION WILL CAUSE THE ACTUAL CPU UTILIZATION TO DIFFER FROM YOUR STATED POLICY OF ( $\rho_d$ ) BY ( $\rho_M(B^*_{CPU}) - \rho_d$ ). PLEASE SELECT ANOTHER VALUE."

APPENDIX B
File Placement
Operational Principles

The File Placement Operational Principles

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

Copyright (C) 1991 Bell Communications Research, Inc.
All rights reserved.
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

This Appendix presents presents the operational principles that generate the file placement adjustment information shown in FIG. 2.

DETECTING HOT CONTROL UNITS, PROBLEM DISKS, AND FILES

IF ( ANY [$\rho_{cu} + \rho_{cu'}$] > $2[\rho_{cu_{max}}]$ )
THEN

- DESIGNATE CONTROL UNIT PAIR AS HOT.

IF ( HOT CONTROL UNIT )
THEN
- IDENTIFY FILES THAT CAUSED CONTROL UNIT PAIR TO BE HOT,
- DESIGNATE OFFENDING FILES AS PRIME MOVE CANDIDATES,
- REPORT SYSTEM IS IN THE "TUNING MANDATORY" STATE.

IF ( ANY $\rho_{disk} > \rho_{disk_{max}}$ )
THEN
- DESIGNATE DISK AS HOT.

IF ( HOT DISK )
THEN
- IDENTIFY FILES THAT CAUSED DISK TO BE HOT,
- DESIGNATE OFFENDING FILES AS SECONDARY MOVE CANDIDATES,
- REPORT SYSTEM IS IN THE "TUNING MANDATORY" STATE.

IF ( THE XN D-BANKS < 40K WORDS )
THEN
- THE TRANSACTION D-BANKS ARE SMALL.

IF ( XN D-BANKS ARE SMALL )
THEN
- REPORT "RE-SIZE XN D-BANKS TO 64K TO IMPROVE DISK PERFORMANCE."

IF ( A TFS FILE IS NOT CO-RESIDENT WITH ITS CTE SWAP FILE PARTNER )
THEN
- REPORT SYSTEM IS IN THE "TUNING MANDATORY" STATE,
- REPORT "CTE SWAP FILE AND ITS PARTNER TFS FILE ARE NOT CO_RESIDENT."

IF ( A QUICK LOOK or PERIODIC SAVE FILE )
   ( FILE IS STORED ON AN 8470/8480 DISK )
   ( THE DISK IS NOT CACHED )
   ( THE DISK IS NOT PREPPED AT 112 WORDS )
THEN
- DESIGNATE THE OFFENDING FILE(S) AS THE TOP PRIORITY MOVE CANDIDATE,
- REPORT SYSTEM IS IN THE "TUNING MANDATORY" STATE,
- REPORT "FILE SHOULD BE PLACED ON A 112 PREPPED CONVENTIONAL DISK OR A CACHED DISK."

IF ( ANY FILE VIOLATES DAMAGE LIMITATION PRINCIPLES )
THEN
- DESIGNATE OFFENDING FILES AS TERTIARY MOVE CANDIDATES,
- REPORT SYSTEM IS IN THE "TUNING MANDATORY" STATE.

IF ( DISK'S PERFORMANCE IS SUB-STANDARD )
THEN
- IDENTIFY AND REPORT DISK TO USER,
- REPORT SYSTEM IS IN THE "TUNING ADVISABLE" STATE.

IF ( ANY FILE VIOLATES THE PERFORMANCE PREFERENCE PRINCIPLES )
   OR ( ANY FILE VIOLATES THE NOTIFICATION PRINCIPLES )
THEN

- REPORT THE VIOLATION AND, IF POSSIBLE, THE FILE,
- REPORT SYSTEM IS IN THE "TUNING ADVISABLE" STATE.

IF ( A NO_CACHE_FILE IS ON A CACHE STRING )
  ( [ $x_{file}$ − $XFER_{file}$ ] < [ SEEK + L | cache disk model's Spec. values ] )
THEN

- REPORT "{TIP NO.} IS ON A CACHE STRING, BUT MAY NOT HAVE ITS BYPASS SET."
- REPORT SYSTEM IS IN THE "TUNING ADVISABLE" STATE.

DEALING WITH PROBLEM FILES

IF ( A FILE IS TO BE MOVED )
  ( THE USER HAS INHIBITED MOVES FOR FILES OF THIS TYPE )
THEN

- REPORT "FILE WAS NOT MOVED BECAUSE USER HAS INHIBITED THE MOVE",
- REMOVE THE FILE FROM THE MOVE LIST.

IF ( ONE SOAC or LFACS DB TIP FILE IS ON THE MOVE LIST )
  ( THE USER HAS NOT INHIBITED MOVES FOR FILES OF THIS TYPE )
THEN

- ATTEMPT TO MOVE ALL THE LFACS WIRE CENTER TIP FILES OR, IF SOAC, THE ENTIRE SEGMENT AS A UNIT.

IF ( SMALL XN D-BANKS ARE CONFIGURED )
  ( EACH CTE SWAP FILE IS CO-RESIDENT WITH ITS TFS PARTNER )
  ( A CTE SWAP AND/OR TFS FILE IS ON THE PRIMARY OR SECONDARY MOVE LIST )
THEN

- REPORT "INSTEAD OF MOVING THE CTE SWAP FILE AND/OR TFS FILE, RE-SIZE THE D-BANKS, THEN RE-ANALYZE",
- REMOVE THE CTE SWAP FILE AND/OR ITS TFS PARTNER FROM THE PRIMARY OR SECONDARY MOVE LIST,
- REDUCE THE DISK AND CONTROL UNIT UTILIZATIONS BY THE CTE SWAP FILE UTILIZATION.

IF ( SMALL XN D-BANKS ARE CONFIGURED )
  ( ANY CTE SWAP FILE IS NOT CO-RESIDENT WITH ITS TFS PARTNER )
THEN

- REPORT "RE-SIZE THE D-BANKS, THEN RE-ANALYZE",
- MOVE THE TFS FILE TO ITS CTE SWAP FILE PARTNER'S PACK,
- REMOVE THE CTE SWAP FILE AND/OR ITS TFS PARTNER FROM THE PRIMARY OR SECONDARY MOVE LIST, IF PRESENT,
- REDUCE THE DISK AND CONTROL UNIT UTILIZATIONS BY THE CTE SWAP FILE UTILIZATION.

IF ( LARGE XN D-BANKS ARE CONFIGURED )
  ( EACH CTE SWAP FILE IS CO-RESIDENT WITH ITS TFS PARTNER )
  ( A CTE SWAP AND/OR TFS FILE IS ON THE PRIMARY OR SECONDARY MOVE LIST )
THEN

- FOR FILES ON THE PRIMARY MOVE LIST, MOVE EACH OFFENDING FILE AND ITS PARTNER TO THE SAME, PACK ON A LESS BUSY STRING.

- FOR FILES ON THE SECONDARY MOVE LIST, MOVE EACH OFFENDING FILE AND ITS PARTNER TO THE SAME, BUT LESS BUSY PACK.

IF ( LARGE XN D-BANKS ARE CONFIGURED )
   ( ANY CTE SWAP FILE IS NOT CO-RESIDENT WITH ITS TFS PARTNER )
   ( THE SWAP FILE IS NOT ON THE PRIMARY OR SECONDARY MOVE LIST )
THEN

- MOVE THE TFS FILE TO ITS CTE SWAP FILE PARTNER'S DISK, IF POSSIBLE. IF NOT, CO-LOCATE BOTH ON ANOTHER DISK.

IF ( LARGE XN D-BANKS ARE CONFIGURED )
   ( ANY CTE SWAP FILE IS NOT CO-RESIDENT WITH ITS TFS PARTNER )
   ( THE TFS FILE IS NOT ON THE PRIMARY OR SECONDARY MOVE LIST )
   ( THE SWAP FILE IS ON THE PRIMARY OR SECONDARY MOVE LIST )
THEN

- MOVE THE CTE SWAP FILE FILE TO ITS TFS PARTNER'S DISK, IF POSSIBLE. IF NOT, CO-LOCATE BOTH ON ANOTHER DISK.

IF ( LARGE XN D-BANKS ARE CONFIGURED )
   ( ANY CTE SWAP FILE IS NOT CO-RESIDENT WITH ITS TFS PARTNER )
   ( THE TFS FILE IS ON THE PRIMARY OR SECONDARY MOVE LIST )
   ( THE SWAP FILE IS ON THE PRIMARY OR SECONDARY MOVE LIST )
THEN

- CO-LOCATE BOTH ON ANOTHER DISK.

IF ( A LIBRARY IS ON THE PRIMARY OR SECONDARY MOVE LIST )
   ( THERE EXISTS ONE HVTIP I-BANK per HVTIP D-BANK )
THEN

- REPORT "INSTEAD OF MOVING THE LIBRARY, CONFIGURE MULTIPLE I-BANKS per D-BANK, THEN RE-ANALYZE",

- REMOVE THE LIBRARY FROM THE PRIMARY OR SECONDARY MOVE LIST,

- ADJUST THE DISK AND CONTROL UNIT UTILIZATIONS.

IF ( A LIBRARY IS ON THE PRIMARY OR SECONDARY MOVE LIST )
   ( THERE EXISTS MULTIPLE HVTIP I-BANKS per HVTIP D-BANK )
   ( USER'S POLICY IS TO DUPLEX LIBRARIES )
   ( OFFENDING LIBRARY HAS NOT BEEN DUPLEXED )
THEN

- REPORT "INSTEAD OF MOVING THE LIBRARY, DUPLEX IT, THEN RE-ANALYZE",

- REMOVE THE LIBRARY FROM THE PRIMARY OR SECONDARY MOVE LIST,

- ADJUST THE DISK AND CONTROL UNIT UTILIZATIONS.

DETECTING SUB-STANDARD HARDWARE PERFORMANCE

IF ( DISK'S AVG. SEEK+LATENCY+CU-DELAY > [1.1] * SPEC. )
   ( DISK TYPE IS NOT 9494 )
   ( DISK IS NOT CACHED )
   ( $[\rho_{cu} + \rho_{cu'}] > 2[\rho_{cu_{max}}]$ )
THEN

- REPORT "INVESTIGATE CYLINDER PLACEMENT FOR HIGH ACCESS FILES. IF PLACEMENT IS NOT THE PROBLEM, THEN DISK IS SUB-STANDARD."

IF ( CONVENTIONAL DISK )
   ( DISK TYPE IS NOT 9494 )
   ( CALCULATED DISK TRANSFER TIME, $XFER_{disk_{CALC}} > 1.5\ XFER_{disk_{SPEC}}$, THE

SPEC'S )
THEN

- REPORT "SUB-STANDARD XFER RATE ON DISK."

SUPPORTING EQUATIONS

$$XFER_{disk_{CALC}} = XFER_{disk} - RPS - \left[ \frac{2L \sum_{k \in F} \lambda_k RBW_k \left(1 - R_k\right) + F_b \sum_{k \in F} \lambda_k \left(1 - R_k\right)}{\sum_{k \in F} \lambda_k} \right] \quad (4a)$$

$$XFER_{disk_{SPEC}} = \frac{1}{\sum_{k \in F} \lambda_k} \left[ \frac{\sum_{k \in F} \lambda_k \left(I\text{-}O\ SIZE_k\right)}{\Lambda_{xfer_{SPEC}}} \right] \quad (4b)$$

$$F = \left\{ ALL\ TIP\ FILES\ ON\ A\ PARTICULAR\ DISK \right\} \quad (4c)$$

DAMAGE LIMITATION PRINCIPLES

IF ( AN LFACS DB SPANS MULTIPLE PACKS )
  ( THE DB FITS ON ONE PACK )
THEN

- CONSOLIDATE IT.

IF ( MULTIPLE SOAC SEGMENTS EXIST )
THEN

- PLACE EACH SEGMENT'S OCS TASAR AND WC FILES ON THEIR OWN PACK.

IF ( USER SPECIFIED THAT A FILE SHOULD BE DUPLEXED )
  ( ONLY ONE LEG EXISTS )
THEN

- REPORT "FILE IS NOT DUPLEXED."

IF ( USER SPECIFIED THAT A FILE SHOULD BE DUPLEXED )
  ( BOTH LEGS EXIST )
  ( BOTH LEGS ARE LOCATED ON THE SAME STRING )
  ( USER DOES NOT PERMIT DUPLEXING ON THE SAME STRING )
THEN

- REPORT "FILE IS DUPLEXED INCORRECTLY."

IF ( USER SPECIFIED THAT A FILE SHOULD BE DUPLEXED )
  ( BOTH LEGS EXIST )
  ( BOTH LEGS ARE LOCATED ON THE SAME DISK )
  ( USER PERMITS DUPLEXING ON THE SAME STRING )
THEN

- REPORT "FILE IS DUPLEXED INCORRECTLY."

FINDING NEW LOCATIONS

IF ( ADJUSTED NUMBER OF PROBLEM FILES > MAX-MOVES )
THEN

- GIVE PREFERENCE TO
    — THE TOP PRIORITY
    — THE PRIMARY,
    — THEN SECONDARY,
    — THEN TERTIARY MOVE CANDIDATES,
- APPLY "FINDING NEW LOCATIONS" PRINCIPLES TO THE MOVE SET THAT RESULTS.

IF ( USER HAS NOT INHIBITED MOVES TO THE SPARE SLOT'S PACK )
( SIZE OF PROBLEM FILE ≤ SPARE SLOT SIZE)
( PROBLEM FILE'S PACK PREP TYPE IS OK )
( SLOT'S PACK PREP TYPE = THE PROBLEM FILE'S PACK PREP TYPE )
( USING THIS SLOT SATISFIES THE PREP SIZE PRINCIPLES )
( USING THIS SPARE SLOT SATISFIES DAMAGE LIMITATION PRINCIPLES)
( USING THIS SPARE SLOT SATISFIES CTE SWAP/TFS CO-RESIDENCY PRINCIPLE)
THEN

- CLASSIFY SLOT AS A HIGH POTENTIAL SLOT.

IF ( SLOT QUALIFIED AS HIGH POTENTIAL )
( PROBLEM FILE IS A NO_CACHE_FILE )
( POTENTIAL SLOT IS ON A NON-9494 CACHE STRING )
( PROBLEM FILE IS ON A CONVENTIONAL STRING )
THEN

- $\Delta \rho_{cu} = .001 * \lambda_{file} * XFER_{file}$, of the problem file.
- $\Delta \rho_{disk} = \rho_{file}$, of the problem file.

IF ( SLOT QUALIFIED AS HIGH POTENTIAL )
( PROBLEM FILE IS A NO_CACHE_FILE )
( POTENTIAL SLOT IS ON A NON-9494 CACHE STRING )
( PROBLEM FILE IS ON A CACHE STRING )
THEN

- $\Delta \rho_{cu} = \left[ \dfrac{I-O\ SIZE}{1000 * \Lambda_{xferSPEC} \mid \text{destination disk model, prep, 0\% HIT}} \right] * \lambda_{file}$

- $\Delta \rho_{disk} = \Delta \rho_{cu} + .001 * (SEEK + L \mid \text{destination disk model's Spec. values})$ IF ( SLOT QUALIFIED AS HIGH POTENTIAL )
$\left\{ \begin{array}{c} (\text{PROBLEM FILE IS NOT A NO\_CACHE\_FILE}) \\ OR \\ (\text{POTENTIAL SLOT IS ON A NON}-9494\ \text{CONVENTIONAL STRING}) \end{array} \right\}$
THEN

- $\Delta \rho_{cu} = .001 * \lambda_{file} * XFER_{file}$, of the problem file

- $\Delta \rho_{disk} = .001 * \left[ (x_{disk} - XFER_{disk})_{high\ potential} + XFER_{file} \right] * \lambda_{file}$ IF ( $\Delta \rho_{disk}$ + POTENTIAL SLOT'S $\rho_{disk} \leq \rho_{disk_{max}}$ )
( $\Delta \rho_{cu}$ + POTENTIAL SLOT'S $[\rho_{cu} + \rho_{cu'}] \leq 2[\rho_{cu_{max}}]$ )
( PROBLEM FILE IS ON A NON-9494 STRING)
THEN

- CLASSIFY POTENTIAL SLOT AS A NON-9494 CANDIDATE SLOT.

IF ( MULTIPLE NON-9494 CANDIDATE SLOTS EXIST )
( PROBLEM FILE IS ON A NON-9494 STRING)
THEN

- APPLY $(.5 * ( \rho_{cu_{potential}} + \Delta\rho_{cu}) + .3 * ( \rho_{disk_{potential}} + \Delta\rho_{disk}) + .2 * prob_{potential} )$ TO ALL NON-9494 CANDIDATE SLOTS

- CHOOSE THE SMALLEST SLOT ON THE NON-9494 CANDIDATE DISK WITH THE LOWEST VALUE AND POST MOVE PACK.

IF ( SLOT QUALIFIED AS HIGH POTENTIAL )

( PROBLEM FILE IS ON A 9494 STRING)

( $\Delta\rho_{disk}$ + POTENTIAL SLOT'S $\rho_{disk} \leq \rho_{disk_{max}}$ )

THEN

- CLASSIFY POTENTIAL SLOT AS A 9494 CANDIDATE SLOT.

IF ( MULTIPLE 9494 CANDIDATE SLOTS EXIST )
( PROBLEM FILES IS ON A 9494 STRING )
THEN

- APPLY $(.8 * ( \rho_{disk_{potential}} + \rho_{file} ) + .2 * prob_{potential} )$ TO ALL 9494 CANDIDATE SLOTS

- CHOOSE THE SMALLEST SLOT ON THE CANDIDATE DISK WITH THE LOWEST VALUE AND POST MOVE PACK.

IF ( PROBLEM FILE IS ON THE PRIMARY OR SECONDARY MOVE LIST )
( NO CANDIDATE SLOTS EXIST )
THEN

- REPORT THAT NO SUITABLE LOCATION COULD BE FOUND,

- EXCLUDE THE PROBLEM FILE, AND RE-BUILD THE PRIMARY OR SECONDARY MOVE LIST, DESIGNATING NEW FILE MOVE CANDIDATES, IF NECESSARY,

- RE-APPLY THE "FINDING NEW LOCATIONS" PRINCIPLES.

IF ( PROBLEM FILE IS ON THE TERTIARY MOVE LIST )

( NO CANDIDATE SLOTS EXIST )
THEN

- REPORT THAT NO SUITABLE LOCATION COULD BE FOUND.

IF ( SPARE SLOT EXISTS )
THEN

- GENERATE MOVE RUNSTREAM,

- UPDATE DISK AND CONTROLLER UTILIZATIONS,

- MARK SELECTED SLOT AS FULL.

IF ( ADJUSTED NUMBER OF PROBLEM FILES $\leq$ MAX-MOVES )
( HOT DISK OR CU COULD NOT BE FIXED BY MOVES, OR MOVE ALTERNATIVES )
THEN

- FOR UNREMEDIED HOT DISKS, REPORT
"TOO FEW DISKS....I-O SUBSYSTEM IS UNDER-PROVISIONED."

- FOR UNREMEDIED HOT CONTROL UNITS, REPORT
"TOO FEW STRINGS....I-O SUBSYSTEM IS UNDER-PROVISIONED."

PREP SIZE PRINCIPLES

IF ( PROBLEM FILE IS ON AN 8470/8480 DISK )
  ( SPARE SLOT IS ON AN 8470/8480 CONVENTIONAL DISK )
  ( PROBLEM FILE IS A QUICK LOOK OR PERIODIC SAVE )
  ( PROBLEM FILE IS CURRENTLY ON A PACK PREPPED AT 112 )
THEN
- NEW DESTINATION MUST BE A PACK PREPPED AT 112 OR A CACHED DISK.

IF ( PROBLEM FILE IS ON AN 8470/8480 DISK )
  ( PROBLEM FILE IS ON A DISK PREPPED AT 448 )
  ( SPARE SLOT IS ON AN 8470/8480 CONVENTIONAL DISK )
THEN
- NEW DESTINATION MUST BE A PACK PREPPED AT 448 OR CACHED, PROVIDED RBW ARE NOT OCCURRING. IF RBW ARE OCCURING, NEW DESTINATION MUST BE A PACK PREPPED AT 112 OR CACHED.

PERFORMANCE PREFERENCE PRINCIPLES

IF ( FILE IS A LIBRARY )
  ( CURRENTLY ON A DB PACK )
THEN
- REPORT "CONSIDER MOVING LIBRARY TO A NON-DATA BASE PACK."

IF ( CTE SWAP FILE IS NOT ON A NON-LFACS DB PACK )
  ( CTE SWAP FILE IS NOT ON A EMPTY PACK )
  ( CTE SWAP FILE IS NOT ON A PACK CONTAINING ONLY THE PAIRED TFS FILE)
THEN
- REPORT "CONSIDER MOVING THE SWAP FILE TO ANOTHER PACK."

IF ( MULTIPLE CTE SWAP FILES CO-EXIST ON THE SAME PACK )
THEN
- REPORT "MULTIPLE CTE SWAP FILES CO-EXIST ON THE SAME PACK."

IF ( FILE IS A DPS FILE)
  ( CURRENTLY ON A QUICK-LOOK PACK)
  ( CURRENTLY ON A CONVENTIONAL PACK)
THEN
- REPORT "CONSIDER MOVING DPS FILES TO ANOTHER PACK."

NOTIFICATION PRINCIPLES

IF ( ANY $\rho_{disk} \geq \rho_{disk_{max}}$ )
  ( NO TIP FILE ACTIVITY ON THE DISK, i.e each $\rho_{file} < .5\%$ )
THEN
- REPORT "HOT DISK IS CAUSED BY NON-FACS PRODUCTION SYSTEM USAGE."

IF ( USER HAS INHIBITED MOVES TO A PACK )
  ( PACK EXHIBITS TIP FILE ACTIVITY )
THEN
- REPORT "TIP FILE ACTIVITY DETECTED ON A 'FORBIDDEN PACK'."

IF ( A MOVED FILE WAS A NO_CACHE_FILE )
  ( FILE WAS MOVED TO A CACHE STRING )
THEN
- REPORT "INSURE TIP FILE {TIP NO.} BYPASSES ANY CACHE."

APPENDIX C

```
;;; -*- mode:ART; package:ART-USER; base: 10 -*-
(setq *Version-and-copyright-header*
    "@(#) runstream.art   version 2.4  9/25/89
     @(#) Copyright (c) 1989 Bell Communications Research, Inc.
     @(#)        All Rights Reserved.
    ")

;;;;;File move runstreams
; This rule set finds all the fragment moves recommended as the best moves,
; picks up all the necessary information about those fragments and asserts
; facts for moving the hvtip libraries and tip files. If a file is duplexed,
; a dup-runline is asserted for special handling (defrelation runline (?filename ?category ?start ?end ?disk ?loc))
(defrelation duplex-runline (?filename ?category ?start ?end ?disk ?loc))

(defrule find-moves
    (declare (salience (+ ?*runstream-salience* 10 )))
    (schema system-info (post-move-vp ?best-move-vp))
    (viewpoint ?best-move-vp
        (schema ?frag
            (new-location (?newdisk ?diskloc ? ?))
            (fra (?start ?end))))

=>

(if  (get-schema-value ?frag 'spec)
     then (assert (duplex-runline =(get-schema-value ?frag 'file-name)
                                  =(get-schema-value ?frag 'file-category)
                                  ?start ?end ?newdisk ?diskloc))
     else (assert (runline =(get-schema-value ?frag 'file-name)
                           =(get-schema-value ?frag 'file-category)
                           ?start ?end ?newdisk ?diskloc)))
)

; This rule checks for presence of runline facts for tip files( that is
; all files except hvtip libraries which have file-category 'SP') and
; if no output file is opened already, it opens the tip file move runstream
; file, writes the header messages, and also puts the header messages into
; the runstream menu for display later.

(defrule tip-runstream-header
    (declare (salience ?*runstream-salience*))
    (runline|duplex-runline ? -SP ? ? ? ? )

(not (schema system-info (tip-runstream ?)))
    ?menu <- (menu runstream ?header (?current-text) ?choices )
    =>
    (retract ?menu)
    (bind ?tiprunstream (art-string-append "" (gentemp "move-tip")))
    #L (with-open-file (file ?tiprunstream
            :direction :output  :if-exists :new-version :if-does-not-exist
            :create)
    (printout file t "@MSG TIP SCHEDULING MUST BE OFF." t
                     "@MSG,W IF IT IS ON, ABORT THIS JOB" t
                     "@PRIV ON" t
                     "@MSAR,IU" ))
    (assert (menu runstream
                =(art-string-append "MSAR RUNSTREAM GENERATED BY FAST IN FILE "
                                    ?tiprunstream)
                (" "
                 "@MSG TIP SCHEDULING MUST BE OFF."
                 "@MSG,W IF IT IS ON, ABORT THIS JOB"
                 "@PRIV ON"
                 "@MSAR,IU")
                ?choices))
    (assert (schema system-info (tip-runstream ?tiprunstream)))
)

; Note the use of function first-part in writing out the file names...
; filenames must be parsed and only the first part up to the "^^" written out.

(defrule tip-runstream-movelines
    "IF the tip file move runstream has been opened and there are moves
       to be made (runline relations with category not SP),
     THEN write a move line to the file for that move
       and put the move line in the runstream menu"
    (declare (salience ?*runstream-salience*))
    (schema system-info (tip-runstream ?tiprunstream))
    ?x <- (runline ?file-name -SP ?start ?end ?newdisk ?diskloc)
    ?menu <- (menu runstream ?header ($?current-text) ?choices )
```

```
 =>
    (retract ?x ?menu)
    (bind ?move-string (art-string-append "MOVE " (first-part ?file-name "^^^")
                                          " TO " ?newdisk "," ?diskloc))
    #L(with-open-file (file ?tiprunstream :direction :output :if-exists :append)
         (printout file t ?move-string))
    (assert (menu runstream ?header ($?current-text ?move-string) ?choices))
  )

; Note, if you can determine which leg of the duplexed file is being moved here,
; indicate it in the moveline, otherwise just use the stripped file name.
; Add a warning message just to be on the safe side.

(defrule tip-runstream-duplex-movelines
  "IF the tip file move runstream has been opened and there are duplex moves
      to be made ,
   THEN write a warning message and move line to the file for that move
      and put the lines in the runstream menu"
  (declare (salience ?*runstream-salience*))
  (schema system-info (tip-runstream ?tiprunstream))
  ?x <- (duplex-runline ?file-name -SP ?start ?end ?newdisk ?diskloc)
  ?menu <- (menu runstream ?header ($?current-text) ?choices )

=>
    (retract ?x ?menu)
    (if (has-substring ?file-name "LEG-01" "LEG-1")
     then (bind ?print-line (art-string-append "MOVE " (first-part ?file-name "^^^") ",1 "
                                               " TO " ?newdisk "," ?diskloc))
     else (if (has-substring ?file-name "LEG-02" "LEG-2")
           then (bind ?print-line (art-string-append "MOVE " (first-part ?file-name "^^^") ",2 "
                                                     " TO " ?newdisk "," ?diskloc))
           else (bind ?print-line (art-string-append "MOVE " (first-part ?file-name "^^^") " "
                                                     " TO " ?newdisk "," ?diskloc))))
    (bind ?warning "@MSG,W CHECK THAT NEXT LINE INDICATES CORRECT FILENAME (TIP-FILENAME,LEG)" )

#L(with-open-file (file ?tiprunstream :direction :output :if-exists :append)
         (printout file t ?warning t ?print-line))
    (assert (menu runstream ?header
                  ($?current-text ?warning ?print-line)
                  ?choices))
  )

(defrule tip-runstream-closer
  "IF there are no more runlines for tip files
   THEN write the closing lines and remove the tip-runstream fact from
      system info. Put the closing lines into the runstream menu and
      give message to user about where the move file is"
  (declare (salience ?*runstream-salience*))
  (not (runline|duplex-runline ? -SP ? ? ? ?))
  ?x <- (schema system-info (tip-runstream ?tiprunstream))
  ?menu <- (menu runstream ?header ($?current-text) ?choices )
 =>
    (retract ?x ?menu)
    #L(with-open-file (file ?tiprunstream :direction :output :if-exists :append)
         (printout file t "EXIT" t
                        "@BRKPT LOGFIL" t
                        "@SYM,U LOGFIL." t
                        "@MSG    A RECAP OF THE FILE MOVE PROCESS" t
                        "@MSG    HAS BEEN PRINTED ON THE SYSTEM'S" t
                        "@MSG    DEFAULT PRINTER" t
                        "@MSG    IF MOVES WERE SUCCESSFUL, TURN" t
                        "@MSG    ON TIP SCHEDULING, BEFORE RESUMING" t
                        "@MSG,W PRODUCTION PROCESSING" t))
    (assert (menu runstream ?header
                  ($?current-text
                   "EXIT"
                   "@BRKPT LOGFIL"
                   "@SYM,U LOGFIL."
                   "@MSG    A RECAP OF THE FILE MOVE PROCESS"
                   "@MSG    HAS BEEN PRINTED ON THE SYSTEM'S"
                   "@MSG    DEFAULT PRINTER"
                   "@MSG    IF MOVES WERE SUCCESSFUL, TURN"
                   "@MSG    ON TIP SCHEDULING, BEFORE RESUMING"
                   "@MSG,W PRODUCTION PROCESSING")
                  ?choices))

(repair (art-string-append "MSAR move runstream for TIP files is saved in file " ?tiprunstream))
  )

; This rule checks for presence of runline facts for hvtip libraries (that is
; all files which have file-category 'SP') and opens a file, writes header
; messages, the move line, closing messages and a message to the user about
; where the runstream is located.
```

```
(defrule lib-runstream-create
"IF there are runlines for SP libraries
 THEN open a file, write the lines and retract the runline fact"

(declare (salience ?*runstream-salience*))
    ?x <- (runline ?filename SP ?start ?end ?newdisk ?diskloc )
    ?menu <- (menu lib-runstream ?header ($?current-text) ?choices )
    =>
    (bind ?runstream-name (format nil "~a" (gentemp "move-lib")))
    (retract ?x ?menu)
    #L (with-open-file (file ?runstream-name
                        :direction :output  :if-exists :new-version
                        :if-does-not-exist :create)
       (printout file t "@MSG   TIP SCHEDULING MUST BE OFF." t
                        "@MSG,W IF IT IS ON, ABORT THIS JOB!!" t
                        "@MSG   THIS RUNSTREAM MOVES AN HVTIP LIBRARY" t
                        "@MSG   THE LIBRARY MUST FIRST BE OFLINED VIA TPUR" t
                        "@MSG,W IF THIS HAS NOT BEEN DONE ABORT THIS JOB!!" t
                        "@@PRIV ON" t
                        "@@MSAR,IU" t
                        "MOVE " ?filename " TO " ?newdisk "," ?diskloc t
                        "@BRKPT LOGFIL" t
                        "@SYM,U LOGFIL." t
                        "@MSG   A RECAP OF THE LIBRARY MOVE HAS" t
                        "@MSG   BEEN PRINTED ON THE SYSTEM'S" t
                        "@MSG,W DEFAULT PRINTER. REVIEW THE RESULTS" t
                        "@MSG   TO RESUME PRODUCTION PROCESSING" t
                        "@MSG   1. USE TPUR TO BRING LIBRARY ONLINE" t
                        "@MSG   2. USE VALINT TO WRITE VALTAB TO MASS STORAGE" t
                        "@MSG   3. TURN ON TIP SCHEDULING" t
                        "@MSG   FAILURE TO EXECUTE THE ABOVE STEPS" t
                        "@MSG,W WILL RESULT IN TIP SCHEDULING ERRORS" t))
    (assert (menu runstream "The following HVTIP Library Runstreams were generated:"
                  ($?current-text
                   " "
                   "HVTIP LIBRARY RUNSTREAM FOR " ?filename " IN " ?runstream-name
                   "@MSG   TIP SCHEDULING MUST BE OFF."
                   "@MSG,W IF IT IS ON, ABORT THIS JOB!!"
                   "@MSG   THIS RUNSTREAM MOVES AN HVTIP LIBRARY"
                   "@MSG   THE LIBRARY MUST FIRST BE OFLINED VIA TPUR"
                   "@MSG,W IF THIS HAS NOT BEEN DONE ABORT THIS JOB!!"
                   "@@PRIV ON"
                   "@@MSAR,IU"
                   "MOVE " ?filename " TO " ?newdisk "," ?diskloc
                   "@BRKPT LOGFIL"
                   "@SYM,U LOGFIL."
                   "@MSG   A RECAP OF THE LIBRARY MOVE HAS"
                   "@MSG   BEEN PRINTED ON THE SYSTEM'S"
                   "@MSG,W DEFAULT PRINTER. REVIEW THE RESULTS"
                   "@MSG   TO RESUME PRODUCTION PROCESSING"
                   "@MSG   1. USE TPUR TO BRING LIBRARY ONLINE"
                   "@MSG   2. USE VALINT TO WRITE VALTAB TO MASS STORAGE"
                   "@MSG   3. TURN ON TIP SCHEDULING"
                   "@MSG   FAILURE TO EXECUTE THE ABOVE STEPS"
                   "@MSG,W WILL RESULT IN TIP SCHEDULING ERRORS")
                  ?choices))
```

APPENDIX D
Interface Data
Definition

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

Copyright (C) 1991 Bell Communications Research, Inc.
All rights reserved.
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

Overview

This Appendix defines the data elements that make up the information categories asssociated with the flows that emanate from the Reduction, Formating and Modeling Software shown in FIG. 2. These definitions are contained in the first row of each of the seven tables to follow.

The first six tables identify the data elements that make up the information necessary to support the file placement operational principles, while the seventh identifies the data elements that support the response time-throughput operational principles. Terminology and symbols are defined in the Glossary.

The tables also identify the software components that make up the "REDUCTION, FORMATING", and MODELING SOFTWARE" so designated in FIG. 2. These same labels, i.e., "REDUCTION, FORMATING", and MODELING" are used as row identifiers in each of the seven tables.

Each table also presents how many of each type of file are required to support an expert system analysis session, the number of lines in the file, and when, during the Production Host's operational day, the raw data was collected.

Table 1. CONTROL UNIT/DISK CONNECTIVITY INFORMATION

| DATA ITEMS | LOGICAL CHANNEL NO. | CU NAME | CU TYPE | DISK $NAME_1$ | DISK $NAME_2$ | DISK $NAME_i$ |
|---|---|---|---|---|---|---|
| NO. OF FILES | 1 per expert system analysis session. | | | | | |
| LINES IN FILE | 2(Number of disk strings); lines are paired; each of the pair corresponds to one of two disk control units; same disks are shown for each control unit. | | | | | |
| COLLECTED | All day. | | | | | |
| RAW DATA | SOFTWARE INSTRUMENTATION PACKAGE (SIP) | | | | | |
| REDUCTION | SIP - Configuration Report | | | | | |
| FORMATING | config | | | | | |

Table 2. FILE INVENTORY WITH DISK LOCATIONS

| DATA ITEMS | LOG. GRP NM | FILE NM | TIP NO. | DISK $NM_1$ | STRT $FRA_1$ | END $FRA_1$ | DISK $NM_i$ | STRT $FRA_i$ | END $FRA_i$ |
|---|---|---|---|---|---|---|---|---|---|
| NO. OF FILES | 1 per expert system analysis session. | | | | | | | | |
| LINES IN FILE | One per TIP file on system. | | | | | | | | |
| COLLECTED | Once, at end of busy period. | | | | | | | | |
| RAW DATA | Master File Directory | | | | | | | | |
| REDUCTION | MSAR - TIP Report | | | | | | | | |
| FORMATING | file-loc | | | | | | | | |

Table 3. FREE DISK SPACE INVENTORY WITH LOCATIONS

| DATA ITEMS | DISK NAME | START DRA | END DRA | SIZE (tracks) |
|---|---|---|---|---|
| NO. OF FILES | 1 per expert system analysis session. | | | |
| LINES IN FILE | One per spare slot on system. | | | |
| COLLECTED | Once, at end of busy period. | | | |
| RAW DATA | Master File Directory | | | |
| REDUCTION | MSAR - EMPTY Report | | | |
| FORMATING | free-space | | | |

Table 4. CONTROL UNIT PERFORMANCE DATA

| DATA ITEMS | LOGICAL CHANNEL NUMBER | CU NAME | $\rho_{cu}$ (%) | $\lambda_{cu}$ (req/sec) | $XFER_{cu}$ (ms) |
|---|---|---|---|---|---|
| NO. OF FILES | 1 per expert system analysis session. | | | | |
| LINES IN FILE | 2(number of disk strings) | | | | |
| COLLECTED | During the busy period. | | | | |
| RAW DATA | SOFTWARE INSTRUMENTATION PACKAGE (SIP) | | | | |
| REDUCTION | SIP - ISI Report | | | | |
| FORMATING | perf-cu | | | | |

Table 5. DISK PERFORMANCE DATA

| DATA ITEMS | DISK NAME | $\rho_{disk}$ (%) | $\lambda_{disk}$ (req/sec) | DEV-CHNL Q (ms) | SEEK+ LAT+ CU DLY (ms) | $XFER_{disk}$ (ms) | RET-FLD (ms) | $x_{disk}$ | DISK MODEL | PREP FACT. | PREP TYPE FIX or REM | ON-LN STATUS |
|---|---|---|---|---|---|---|---|---|---|---|---|---|
| NO. OF FILES | 1 per expert system analysis session. | | | | | | | | | | | |
| LINES IN FILE | Number of disks. | | | | | | | | | | | |
| COLLECTED | During the busy period. | | | | | | | | | | | |
| RAW DATA | SIP and the Master File Directory | | | | | | | | | | | |
| REDUCTION | SIP - ISI Report, SIP - Configuration Report, and MSAR - Preps report | | | | | | | | | | | |
| FORMATING | disk-info | | | | | | | | | | | |

Table 6. FILE PERFORMANCE DATA

| DATA ITEMS | TIP NO. | DISK NAME | $\rho_{file}$ (%) | $\lambda_{file}$ (req/sec) | I-O SIZE (words) | $R_k$ | READ BEFORE WRITE FLAG | FLD (ms) | DEV-CHNL Q (ms) | SEEK+ LAT.+ CU DLY (ms) | $XFER_{file}$ (ms) | $RET_{file}$ (ms) | $x_{file}$ |
|---|---|---|---|---|---|---|---|---|---|---|---|---|---|
| NO. OF FILES | 1 per expert system analysis session. | | | | | | | | | | | | |
| LINES IN FILE | Number of files. | | | | | | | | | | | | |
| COLLECTED | During the busy period. | | | | | | | | | | | | |
| RAW DATA | I-O Trace | | | | | | | | | | | | |
| REDUCTION | IOSUM Report | | | | | | | | | | | | |
| FORMATING | perf-file | | | | | | | | | | | | |

Table 7. SYSTEM STATE DATA

| DATA ITEMS | $T_{threds,M}$ | $\lambda_M$ | $\rho_{CPU,M}$ | $B_{CPU}$ | $T_M$ |
|---|---|---|---|---|---|
| NO. OF FILES | One per hour during the production day; 0700-1800 hours, inclusive. | | | | |
| LINES IN FILE | 32, total. The first 31 give model values, one for each possible thread level. The last line contains actual values, measured, or in the case of $W_{CPU}$ inferred, during the hour. The values correspond to: $T_{threds}, \lambda, \rho_{CPU}, W_{CPU}, T$ | | | | |
| DATA COLLECTED | All day. | | | | |
| RAW DATA | SIP and System Log | | | | |
| REDUCTION | TORCH | | | | |
| FORMATING | torchdisk, merge | | | | |
| MODELING | cpuq (reproduced in Appendix C) | | | | |

APPENDIX E
System State Array
Generation Via a
Central Server Model

```
/*******************************************************************
Copyright (C) 1991 Bell Communications Research, Inc.
All rights reserved.
********************************************************************

The following source code is identified as "MODELING SOFTWARE" in FIG. 2.

/* Implementation of the solution to a central server model,
 * whose output, the system state array, is used by an expert system.
 *
 * These equations are to be run on a reduction host, and the
 * system state array are passed to the workstation containing the ES.
 */ include <stdio.h>
include <math.h> define M_MAX 78      /* CPU + 75 disks + phantom; start array at 1   */
define K_MAX 32      /* Maximum concurrency is 31; start array at 1  */
#define CTS_MIN 0.0   /* Minimum value for cts$ service time          */
#define CTS_MAX 0.080 /* Maximum value for cts$ service time          */
#define CONVERGE .0001 /* If model is within +,- of CONVERGE => calibrat.*/
#define CALIBRATE 0   /* Util. and xn exist. time for last concur. only */
#define OUTPUT 1      /* Util. and xn exist. time for all concurrencies */
define MAX_ITER 50   /* Maximum passes through the calibration loop  */ int M;          /* servers (incl CPU) for a run, max is M_MAX    */
int K;          /* highest concurrency for a run max is K_MAX    */
double c;       /* Number of CPUs in processor complex           */
double d;       /* No. of live disks                             */
double n[M_MAX]; /* No. of I-Os/xn for each drive i = 2..M-1     */
double X[M_MAX]; /* Svc times; X[1] CPU, sec/xn; X[2..M-1], sec/I-O*/
                /* X[M] memory lock, sec/cts$ ...from calibration */
```

```c
double rho[K_MAX][M_MAX];    /* CPU, disk and memory lock util.    */
double N[K_MAX][M_MAX];/* Queue lngths as a function of concurrency    */
double lam[K_MAX];   /* System throughput as a function of concurrency */
double T[M_MAX];     /* Transaction existence time sec./xn    */
double rho_t[M_MAX];
main(argc,argv)
int argc;
char *argv[];       /* argv[1] is the input data's path/filename    */
{
  double range[2];   /* cts$ service time current search range    */
  double epsilon;    /* see the eval() comment.                   */
  double epsilon_b4;
  short j, state;
  double lam_t;
  double T_t;
  double MPL;
  double W_io_t;
  double X_io_t;
  void merge(), buzen(), response();
  void for_FAST();
  double eval();

/* Fetch the live system's measurements previously extrated
   * from TORCH or equivalent.
   */
  merge(argv[1], &c,&d,rho_t,&lam_t,&T_t,&MPL,&W_io_t,&X_io_t);

/* Initialize for size of system and CTS$ search range. */
  M = 2 + (int) d;     /* 1 for cpu; 1 for phantom. */
  K = (int) (MPL + .5);
  range[0] = CTS_MIN;
  range[1] = CTS_MAX;
  epsilon = 0.0;
  j = 0;

/* Calibrate Model to the real system. Search over the range of
   * CTS service times bounded, initally, by CTS_MIN and CTS_MAX.
   */
  do
  {
    X[M] = .5*(range[0]+range[1]);
    buzen(K,M);
    fprintf(stderr,"0TERATION NUMBER %d0,++j);
    response(CALIBRATE,K);
    epsilon_b4 = epsilon;
    if( (epsilon = eval(rho_t[1],rho[K][1],-T_t,-T[0])) > 0.0 )
       range[0] = X[M]; /* Model was too high. Increase lower search bound. */
    else
       range[1] = X[M]; /* Model was too low. Decrease upper search bound. */
  }
  while( (fabs(epsilon - epsilon_b4) > CONVERGE) && (j < MAX_ITER) );

/* Check for convergence, and write the FAST interface file.
   * If the model converged, as defined by CONVERGE, write model's
   *
```

```
*     concurrency  xn-throughput  CPU-util.  CPU-wait   xn-exist.
*     (threads)     (xn/sec.)     (decimal)  (sec./xn)  (sec./xn)
*
* to stdout. Then append the sytem's measured values from TORCH.
* N.B. This last line, contains the model's value of CPU-wait. Measured
* values for CPU-wait are not obtainable.
*     If the model did not converge write ONLY the above last line to
* stdout, with "?????" for CPU-wait.
*/
if(j == MAX_ITER)
  {
    fprintf(stderr,"COULD NOT CALIBRATE MODEL FROM DATA");
    fprintf(stderr," IN %s AFTER %d ITERATIONS0,argv[1],MAX_ITER);
    fprintf(stdout,"COULD NOT CALIBRATE MODEL FROM DATA");
    fprintf(stdout," IN %s AFTER %d ITERATIONS0,argv[1],MAX_ITER);
    fprintf(stdout,"%.3f %.3f %.3f ",MPL,lam_t,rho_t[1]);
    fprintf(stdout,"????? %.3f0,T_t);
    exit(0);
  }
else
  {
    fprintf(stderr,"***** MODEL CONVERGED IN %d ITERATIONS. *****0,j);
    for_FAST(MPL,lam_t,T_t);
  }
}

/* eval returns a weighted percent difference between reality and
 * the model, but ignores the quantization error that results from
 * integer K.
 *           epsilon > 0 means the model is high
 */
double eval(tru1, mod1, tru2, mod2)
double mod1, tru1, mod2, tru2;
{
double epsilon,sign;

epsilon = ((mod1-tru1)/tru1)*((mod1-tru1)/tru1);
epsilon += ((mod2-tru2)/tru2)*((mod2-tru2)/tru2);
epsilon = sqrt(epsilon);
sign = (mod1-tru1)/fabs(tru1) + (mod2-tru2)/fabs(tru2);
sign /= fabs((mod1-tru1)/fabs(tru1) + (mod2-tru2)/fabs(tru2));
epsilon *= sign;
return(epsilon);
}

/* This is Buzen's recursive solution for a one workload class,
 * non-priority, central server model. Load dependent servers are not
 * modeled, i.e. cpu service rate will always be c/X[1], regardless of
 * number of customers in the system. Also, the number of CTS$/xn is not
 * adjusted as a function of concurrency, as would actually happen.
 *
 * For an introduction to the theory, see ACM Computing Surveys,
 * Vol. 10, No. 3, Sept. 1978, and Allen, A. O., "Probability,
 * Statistics, and Queueing Theory", Academic Press, 1978.
 */
void buzen(K,M)
int M;              /* servers (incl CPU) for a run, max is M_MAX   */
```

```c
int K;          /* highest concurrency for a run max is K_MAX   */
{
 short i;       /* i in [1,M]                                   */
 short k;       /* k in [0,K]                                   */
 double g[K_MAX][M_MAX];    /* Buzen's recursion variables */
 double x[M_MAX];           /* Buzen's recursion variables      */
 double path[M_MAX];  /* Path lngth (sec. of CPU svc time) between I-Os */
                      /* path[0] is the CPU burst lngth, CPU svc sec. */
 double p[M_MAX];     /* transition probabilities; p[1] prob.a xn ends */
 double mu[M_MAX];    /* Service rates; mu[1] is the CPU, bursts/sec.  */

/* Path Length and transition Probability eq.   */
 for(i = 1; i <= M; i++)
    path[i] = X[1]/n[i];
 for(i = 1, path[0] = 0.0; i <= M; i++)
    path[0] += 1./path[i];
 path[0] = 1./path[0];

for(i = 1; i <= M; i++)
    p[i] = path[0]/path[i];

/* Service Rate equations              */
 mu[1] = c/path[0];
 for(i = 2; i <= M; i++)
    mu[i] = 1.0/X[i];

/* Buzen's Algorithm                   */

/* Initialization */
 x[1] = 1.0;
 for(i = 2; i <= M; i++)
    x[i] = mu[1]*p[i]/mu[i];

for(i = 1; i <= M; i++)
    g[0][i] = 1.0;                      /* Row */
 for(k = 0; k <= K; k++)
    g[k][1] = 1.0;                      /* Column */

/* Recursion: Across rows, down columns. */
 for(k = 1; k <= K; k++)
    for(i = 2; i <= M; i++)
       g[k][i] = g[k][i-1] + x[i]*g[k-1][i];

/* Server util., queue lengths (xns), and sys. throughput (xn/sec.) */
    rho[K][1] = g[K-1][M]/g[K][M];
    for( i = 2; i <= M; i++)
       rho[K][i] = mu[1]*rho[K][1]*p[i]/mu[i];

for(i = 1; i <= M; i++)
    for(k = 1, N[K][i] = 0.0; k <= K; k++)
       N[K][i] += pow(x[i],(double) k) * g[K-k][M] / g[K][M];

lam[K] = mu[1]*p[1]*rho[K][1];
}
void for_FAST(MPL,lam_t,T_t)
 double lam_t;
 double T_t;
 double MPL;
{
```

```c
int k,j;
double T_mod;
double W_mod, W_mod_at_MPL;

j = (int) (MPL +.5);
for(k = 1; k < K_MAX; k++)
  {
  buzen(k,M);
  response(OUTPUT,k);
  if( (W_mod = T[1] - X[1]) <= 0.0 ) W_mod = 0.0;
  if(k == j) W_mod_at_MPL = W_mod;
  fprintf(stdout,"%d %.1f %.1f %.3f ",k,lam[k]*3600.,rho[k][1]*100.,W_mod);
  fprintf(stdout,"%.3f0,T[0]);
  }
fprintf(stdout,"%.2f %.1f %.1f ",MPL,lam_t*3600.,rho_t[1]*100.);
fprintf(stdout,"%.3f %.3f0,W_mod_at_MPL,T_t);
} void response(state,K)
short state;
int K;
{
  double T_io;       /* Portion of xn's existence time spent in io sys */
  double N_io;       /* Concurrency in io sub-system              */
  double W_io;       /* Port. of xn's exist. time spent waiting for io */
  double W[M_MAX];   /* Wait time for each server at concurrency K     */
  short i;

/* Wait and response times per xn */
  T[0] = (double) K/lam[K];
  for(i = 1; i <= M; i++)
     {
     T[i] = N[K][i]/lam[K];
     if( (W[i] = T[i] - n[i]*X[i]) < 0.0 )  W[i] = 0.0;
     }

/* Skip the software lock */
  for(i = 2, W_io = 0.0, N_io = 0.0, T_io = 0.0; i < M; i++)
     {
     W_io += W[i];
     N_io += N[K][i];
     T_io += T[i];
     } ifdef BUG
fprintf(stderr," At a concurency of %d0,K);
for(i = 1; i <= M; i++)
   {
   fprintf(stderr,"rho[%d] = %.1f N[%d] = %.3f",i,rho[K][i]*100.,i,N[K][i]);
   fprintf(stderr," T[%d] = %.3f W[%d] = %.3f",i,T[i],i,W[i]);
   fprintf(stderr," X[%d] = %.3f0,i,T[i]-W[i]);
   }
endif if(state == CALIBRATE)
  {
  fprintf(stderr,"0);
```

```
fprintf(stderr,"CPU COMPLEX UTILIZATION  %.1f percent0,rho[K][1]*100.);
fprintf(stderr,"NO. THREADS ACTIVE ..... %d 0,K);
fprintf(stderr,"SYSTEM THROUGHPUT ...... %.1f xn/hr.0,lam[K]*3600.);
fprintf(stderr,"XN EXISTENCE TIME ...... %.3f sec./xn0,T[0]);
fprintf(stderr,"XN SERVICE TIME ........ %.3f sec./xn0,X[1]+T_io-W_io);
fprintf(stderr,"XN WAIT TIME ........... %.3f sec./xn0,T[0]-X[1]-T_io+W_io);
fprintf(stderr,"CPU EXISTENCE TIME ..... %.3f sec./xn0,X[1]+W[1]);
fprintf(stderr,"CPU SERVICE TIME ....... %.3f sec./xn0,X[1]);
fprintf(stderr,"CPU WAIT TIME .......... %.3f sec./xn0,W[1]);
fprintf(stderr,"I-O EXISTENCE TIME ..... %.3f sec./xn0,T_io);
fprintf(stderr,"I-O SERVICE TIME ....... %.3f sec./xn0,T_io-W_io);
fprintf(stderr,"I-O WAIT TIME .......... %.3f sec./xn0,W_io);
fprintf(stderr,"SOFTWARE LOCK EXIST TIME %.3f sec./xn0,T[M]);
}
else
  return;
}
```

APPENDIX F
Source Code
CPU Subsystem

**********************************************************************
Copyright (C) 1991 Bell Communications Research, Inc.
All rights reserved.
**********************************************************************

This group of files contains the functionality to provide the response time-throughput adjustment information for the CPU subsystem.

cpu-schemas.art - skeleton knowledge base containing templates for the
    instantiation of objects containing the data related to
    cpu performance, as well as objects used in the graphical display
    of this data.

cpu-text.art
graph.art -   code used in graphical display of cpu advice cpu-rules.art - rules to compute cpu advice, determine if certain
    conditions of interest exist, display this information, and
    redraw graphics based on the user's selection of new settings
    for certain parameters.

;;; -*- mode:art; package:au; base:10. -*- ;SCCS ID string: @(#) cpu-schemas.art
version 1.4

;; define slots for the cpu schema ;; There is a cpu schema for each hour of collection data (defschema est-threads
  ;; there will be a list of five values for each slot like this, the values
  ;; correspond to Number of threads, traffic, utility, wait, and thruput
  ;; Also there will be 31 slots like this, one for each of the possible levels
  ;; of threads, 0 to 30
  (instance-of slot)
  (slot-how-many multiple-values)
  (slot-output (?schema has estimated values for number of threads- traffic- utility- wait- and thruput
of ?value)))

```
(defschema threads
  (instance-of slot)
  (slot-how-many single-value)
  (slot-output (?schema had ?value actual threads)))

(defschema traffic
  (instance-of slot)
  (slot-how-many single-value)
  (slot-output (?schema had actual traffic of ?value)))

(defschema cpu-util
  (instance-of slot)
  (slot-how-many single-value)
  (slot-output (?schema had actual cpu-utilization of ?value)))

(defschema cpu-wait
  (instance-of slot)
  (slot-how-many single-value)
  (slot-output (?schema had actual cpu wait time of ?value)))

(defschema all-traffic
  (instance-of slot)
  (slot-how-many single-value)
  (slot-output (?schema had traffic values of ?value)))

(defschema all-cpu-wait
  (instance-of slot)
  (slot-how-many single-value)
  (slot-output (?schema had cpu wait times of ?value)))

(defschema current-row
  (instance-of slot)
  (slot-how-many single-value)
  (slot-output (The values in ?schema corresponding to B_cpu are ?value)))
```

;;; The CPU schema had instances for each hour of data collection, with the ;;; start hour of collection appended to "cpu" as the instantiation name, ;;; (for example, "cpu08") It has multiple est-thread slots and one of each ;;; of the other slots defined especially for the cpu schema and a start hour ;;; and exist-time slot (as defined for the synopsis schema)

```
(defschema cpu
  (start-hour)
  (est-threads)
  (threads)
  (traffic)
  (cpu-util)
  (cpu-wait)
  (exist-time)
  (all-traffic)
  (all-cpu-wait)
  (current-row)
)

(defschema user-wait-bound
  (instance-of slot)
  (slot-how-many single-value)
  (slot-output (the user wait bound of ?schema is ?value)))

(defschema busy-hour
  (instance-of slot)
  (slot-how-many single-value)
  (slot-output (?schema records the busy hour as ?value)))
```

```
(defschema min-hour
  (instance-of slot)
  (slot-how-many single-value)
  (slot-output (?schema records the first hr of CPU data as ?value)))

(defschema max-hour
  (instance-of slot)
  (slot-how-many single-value)
  (slot-output (?schema records the last hr of CPU data as ?value)))

(defschema graph-hour
  (instance-of slot)
  (slot-how-many single-value)
  (slot-output (?schema records the currently-graphed hour as ?value)))

(defschema graph-data
   (instance-of slot)
   (slot-how-many single-value)
   (slot-output (The busy hour known to ?schema is ?value)))

(defschema arrow-x-offset
   (instance-of slot)
   (slot-how-many single-value)
   (slot-output (?schema records the CPU Graph arrow X-offset as ?value pixels))
)

(defschema arrow-y-offset
   (instance-of slot)
   (slot-how-many single-value)
   (slot-output (?schema records the CPU Graph arrow Y-offset as ?value pixels))
)

(defschema cpu-info
   (user-wait-bound)
   (busy-hour)
   (min-hour)
   (graph-hour)
   (graph-data)
   (arrow-x-offset)
   (arrow-y-offset)
)

(defschema cpu-graph
   (instance-of graph)
   (draw      no) ;don't draw until we acquire more info
   (x-y-zero   (100 600))
   (x-length   600)
   (y-height   500)
   (x-axis-label "CPU Queueing (sec/xn)" )
   (y-axis-label "Xns / hour" )
   (min-x-intervals 24)
   (max-x-intervals 36)
   (min-y-intervals 16)
   (max-y-intervals 32)
   (x-data-max 20)     ;dummy value until modified in rules
   (y-data-max 10000)  ;dummy ...
   (x-tick-num-size 3) ;dummy ...
   (y-tick-num-size 4) ;dummy ...
   )

;;CPU-plot holds coordinates for the line plotted onto cpu-graph
```

```
(DEFSCHEMA CPU-PLOT
   (X-POINTS (0))
   (Y-POINTS (0))
   )

;; CPU-HOUR-GRAPHICS holds info pertaining to the hour-selection user interface (defschema cpu-hour-graphics
   (x-offset 500)    ;X-coord of left side of scale
   (y-offset 30)     ;Y-coord of top side of scale
   (current-x 0)     ;X-coord of left side of currently-highlighted hour
   (pixels-wide 50)  ;width of (partially-hidden) box surrounding each hour
   (pixels-high 20)  ;height of box surrounding each hour
   )

;;; -*- mode:art; package:au; base:10. -*- ;SCCS ID string: @(#) cpu-text.art   version 1.3

(DEFSCHEMA cpu-window-icon
    (INSTANCE-OF INSTANTIATED-WINDOW-ICON)
    (CONTAINS-ICONS (CPU-CHART cpu-bound-setting-icon))
    (WINDOW cpu-window)
    (DISPLAY-PARAMETERS (325 385 487 589))
    )

(DEFSCHEMA CPU-CHART
    (INSTANCE-OF INSTANTIATED-COMPOSITE-ICON)
    (CONTAINS-ICONS (cpu-table-headers cpu-table-structure    actual-numbers proposed-numbers))
    (CONTAINED-IN-ICON cpu-window-icon)
    (ALU IOR)
    (TRANSLATE (975 200))
    )

(defschema cpu-table-headers
    (INSTANCE-OF INSTANTIATED-COMPOSITE-ICON)
    (CONTAINS-ICONS (lambda-header-1 lambda-header-2 wcpu-header    exist-header-1 exist-header-2 thread-header       util-header-1 util-header-2
    actual-header proposed-header))
    (CONTAINED-IN-ICON CPU-CHART)
    (ALU IOR)
    (TRANSLATE (0 0))
    )

(DEFSCHEMA lambda-header-1
    (INSTANCE-OF TEXT)
    (CONTAINED-IN-ICON CPU-table-headers)
    (ALU IOR)
    (TRANSLATE (20 52))
    (TEXT-STRING "Average Processing")
    (ENDPOINT (0 0))
    (FONT FONT-19)
    )

(DEFSCHEMA lambda-header-2
    (INSTANCE-OF TEXT)
    (CONTAINED-IN-ICON CPU-table-headers)
    (ALU IOR)
```

```
      (TRANSLATE (36 69))
      (TEXT-STRING "Rate (xns/hr)")
      (ENDPOINT (0 0))
      (FONT FONT-19)
      )

(DEFSCHEMA wcpu-header
      (INSTANCE-OF TEXT)
      (CONTAINED-IN-ICON CPU-table-headers)
      (ALU IOR)
      (TRANSLATE (20 103))
      (TEXT-STRING "CPU Queuing (sec/xn)")
      (ENDPOINT (0 0))
      (FONT FONT-19)
      )

(DEFSCHEMA exist-header-1
      (INSTANCE-OF TEXT)
      (CONTAINED-IN-ICON CPU-table-headers)
      (ALU IOR)
      (TRANSLATE (20 137))
      (TEXT-STRING "Total Existence")
      (ENDPOINT (0 0))
      (FONT FONT-19)
      )

(DEFSCHEMA exist-header-2
      (INSTANCE-OF TEXT)
      (CONTAINED-IN-ICON CPU-table-headers)
      (ALU IOR)
      (TRANSLATE (36 154))
      (TEXT-STRING "Time (sec/xn)")
      (ENDPOINT (0 0))
      (FONT FONT-19)
      )

(DEFSCHEMA thread-header
      (INSTANCE-OF TEXT)
      (CONTAINED-IN-ICON CPU-table-headers)
      (ALU IOR)
      (TRANSLATE (20 188))
      (TEXT-STRING "Concurrency (threads)")
      (ENDPOINT (0 0))
      (FONT FONT-19)
      )

(DEFSCHEMA util-header-1
      (INSTANCE-OF TEXT)
      (CONTAINED-IN-ICON CPU-table-headers)
      (ALU IOR)
      (TRANSLATE (20 225))
      (TEXT-STRING "CPU Utilization")
      (ENDPOINT (0 0))
      (FONT FONT-19)
      )

(DEFSCHEMA util-header-2
      (INSTANCE-OF TEXT)
      (CONTAINED-IN-ICON CPU-table-headers)
      (ALU IOR)
```

```
      (TRANSLATE (45 242))
      (TEXT-STRING "(percent)")
      (ENDPOINT (0 0))
      (FONT FONT-19)
      )

(DEFSCHEMA actual-header
      (INSTANCE-OF TEXT)
      (CONTAINED-IN-ICON CPU-table-headers)
      (ALU IOR)
      (TRANSLATE (257 18))
      (TEXT-STRING "ACTUAL")
      (ENDPOINT (0 0))
      (FONT FONT-19)
      )

(DEFSCHEMA proposed-header
      (INSTANCE-OF TEXT)
      (CONTAINED-IN-ICON CPU-table-headers)
      (ALU IOR)
      (TRANSLATE (342 18))
      (TEXT-STRING "PROPOSED")
      (ENDPOINT (0 0))
      (FONT FONT-19)
      )

(defschema cpu-table-structure
      (instance-of instantiated-composite-icon)
      (contains-icons (c-RECTANGLE-0  c-RECTANGLE-1     c-LINE-0  c-LINE-1
                  c-LINE-2 c-LINE-3 c-LINE-4 c-LINE-5 c-LINE-6))
      (contained-in-icon CPU-CHART)
      (ALU IOR)
      (TRANSLATE (0 0))
      )

(DEFSCHEMA c-RECTANGLE-0
      (INSTANCE-OF RECTANGLE)
      (CONTAINED-IN-ICON CPU-table-structure)
      (ALU IOR)
      (TRANSLATE (0 0))
      (ENDPOINT (425 257))
      (FILL CLEAR)
      (THICKNESS 2)
      )

(DEFSCHEMA c-LINE-0
      (INSTANCE-OF LINE)
      (CONTAINED-IN-ICON CPU-table-structure)
      (ALU IOR)
      (TRANSLATE (325 0))
      (ENDPOINT (0 257))
      (THICKNESS 2)
      )

(DEFSCHEMA c-LINE-1
      (INSTANCE-OF LINE)
      (CONTAINED-IN-ICON CPU-table-structure)
      (ALU IOR)
      (TRANSLATE (240 0))
      (ENDPOINT (0 257))
      (THICKNESS 2)
      )
```

```
(DEFSCHEMA c-LINE-2
   (INSTANCE-OF LINE)
   (CONTAINED-IN-ICON CPU-table-structure)
   (ALU IOR)
   (TRANSLATE (0 29))
   (ENDPOINT (425 0))
   (THICKNESS 2)
   )

(DEFSCHEMA c-LINE-3
   (INSTANCE-OF LINE)
   (CONTAINED-IN-ICON CPU-table-structure)
   (ALU IOR)
   (TRANSLATE (0 79))
   (ENDPOINT (425 0))
   (THICKNESS 2)
   )

(DEFSCHEMA c-LINE-4
   (INSTANCE-OF LINE)
   (CONTAINED-IN-ICON CPU-table-structure)
   (ALU IOR)
   (TRANSLATE (0 115))
   (ENDPOINT (425 0))
   (THICKNESS 2)
   )

(DEFSCHEMA c-LINE-5
   (INSTANCE-OF LINE)
   (CONTAINED-IN-ICON CPU-table-structure)
   (ALU IOR)
   (TRANSLATE (0 168))
   (ENDPOINT (425 0))
   (THICKNESS 2)
   )

(DEFSCHEMA c-LINE-6
   (INSTANCE-OF LINE)
   (CONTAINED-IN-ICON CPU-table-structure)
   (ALU IOR)
   (TRANSLATE (0 204))
   (ENDPOINT (425 0))
   (THICKNESS 2)
   )

(DEFSCHEMA c-RECTANGLE-1
   (INSTANCE-OF RECTANGLE)
   (CONTAINED-IN-ICON CPU-table-structure)
   (ALU IOR)
   (TRANSLATE (0 0))
   (ENDPOINT (240 29))
   (FILL SOLID)
   )

(defschema actual-numbers
   (INSTANCE-OF INSTANTIATED-COMPOSITE-ICON)
   (CONTAINS-ICONS (ACTUAL-LAMBDA ACTUAL-WCPU ACTUAL-EXIST ACTUAL-THREADS ACTUAL-UTIL))
   (CONTAINED-IN-ICON CPU-CHART)
   (ALU IOR)
   (TRANSLATE (250 0))
   )
```

```
(DEFSCHEMA ACTUAL-LAMBDA
    (INSTANCE-OF TEXT)
    (CONTAINED-IN-ICON actual-numbers)
    (ALU IOR)
    (TRANSLATE (0 61))
    (TEXT-STRING "#######")
    (ENDPOINT (0 0))
    (FONT FONT-19)
    )

(DEFSCHEMA ACTUAL-WCPU
    (INSTANCE-OF TEXT)
    (CONTAINED-IN-ICON actual-numbers)
    (ALU IOR)
    (TRANSLATE (0 102))
    (TEXT-STRING "#######")
    (ENDPOINT (0 0))
    (FONT FONT-19)
    )

(DEFSCHEMA ACTUAL-EXIST
    (INSTANCE-OF TEXT)
    (CONTAINED-IN-ICON actual-numbers)
    (ALU IOR)
    (TRANSLATE (0 147))
    (TEXT-STRING "#######")
    (ENDPOINT (0 0))
    (FONT FONT-19)
    )

(DEFSCHEMA ACTUAL-THREADS
    (INSTANCE-OF TEXT)
    (CONTAINED-IN-ICON actual-numbers)
    (ALU IOR)
    (TRANSLATE (0 188))
    (TEXT-STRING "#######")
    (ENDPOINT (0 0))
    (FONT FONT-19)
    )

(DEFSCHEMA ACTUAL-UTIL
    (INSTANCE-OF TEXT)
    (CONTAINED-IN-ICON actual-numbers)
    (ALU IOR)
    (TRANSLATE (0 234))
    (TEXT-STRING "#######")
    (ENDPOINT (0 0))
    (FONT FONT-19)
    )

(defschema proposed-numbers
    (INSTANCE-OF INSTANTIATED-COMPOSITE-ICON)
    (CONTAINS-ICONS   (PROPOSED-LAMBDA   PROPOSED-WCPU   PROPOSED-EXIST
PROPOSED-THREADS PROPOSED-UTIL))
    (CONTAINED-IN-ICON CPU-CHART)
    (ALU IOR)
    (TRANSLATE (341 0))
    )

(DEFSCHEMA PROPOSED-LAMBDA
```

```
   (INSTANCE-OF TEXT)
   (CONTAINED-IN-ICON proposed-numbers)
   (ALU IOR)
   (TRANSLATE (0 61))
   (TEXT-STRING "#######")
   (ENDPOINT (0 0))
   (FONT FONT-19)
   )

(DEFSCHEMA PROPOSED-WCPU
   (INSTANCE-OF TEXT)
   (CONTAINED-IN-ICON proposed-numbers)
   (ALU IOR)
   (TRANSLATE (0 103))
   (TEXT-STRING "#######")
   (ENDPOINT (0 0))
   (FONT FONT-19)
   )

(DEFSCHEMA PROPOSED-EXIST
   (INSTANCE-OF TEXT)
   (CONTAINED-IN-ICON proposed-numbers)
   (ALU IOR)
   (TRANSLATE (0 148))
   (TEXT-STRING "#######")
   (ENDPOINT (0 0))
   (FONT FONT-19)
   )

(DEFSCHEMA PROPOSED-THREADS
   (INSTANCE-OF TEXT)
   (CONTAINED-IN-ICON proposed-numbers)
   (ALU IOR)
   (TRANSLATE (0 188))
   (TEXT-STRING "#######")
   (ENDPOINT (0 0))
   (FONT FONT-19)
   )

(DEFSCHEMA PROPOSED-UTIL
   (INSTANCE-OF TEXT)
   (CONTAINED-IN-ICON proposed-numbers)
   (ALU IOR)
   (TRANSLATE (0 234))
   (TEXT-STRING "#######")
   (ENDPOINT (0 0))
   (FONT FONT-19)
   )

;;------------------------------------------------------------------ ;; The following schemas define the
;; graph-sensitizing icon:

(DEFSCHEMA cpu-bound-setting-icon
   (INSTANCE-OF INSTANTIATED-COMPOSITE-ICON)
   (CONTAINS-ICONS (choose-text choose-arrows))
   (CONTAINED-IN-ICON CPU-window-icon)
   (ALU IOR)
   (TRANSLATE (725 500))
   (input ((sensitize-cpu-graph) "Click to choose new CPU Queuing bound"))
   )
```

```
(DEFSCHEMA choose-text
   (INSTANCE-OF TEXT)
   (CONTAINED-IN-ICON cpu-bound-setting-icon)
   (ALU IOR)
   (TRANSLATE (5 100))
   (TEXT-STRING "Choose CPU Queuing Bound")
   (ENDPOINT (20 0))
   (FONT FONT-22)
)

(DEFSCHEMA choose-arrows
   (INSTANCE-OF INSTANTIATED-COMPOSITE-ICON)
   (CONTAINS-ICONS (choose-arrow-head vertical-shaft little-left-arrow little-right-arrow))
   (CONTAINED-IN-ICON cpu-bound-setting-icon)
   (ALU IOR)
   (TRANSLATE (40 5))
)

(DEFSCHEMA choose-arrow-head
   (INSTANCE-OF CLOSED-POLYGON)
   (CONTAINED-IN-ICON choose-arrows)
   (ALU IOR)
   (TRANSLATE (40 60))
   (X-POINTS (0 20 10 0))
   (Y-POINTS (0 0 10 0))
   (FILL SOLID)
)

(DEFSCHEMA vertical-shaft
   (INSTANCE-OF LINE)
   (CONTAINED-IN-ICON choose-arrows)
   (ALU IOR)
   (TRANSLATE (50 0))
   (ENDPOINT (0 60))
   (THICKNESS 1)
)

(DEFSCHEMA little-left-arrow
   (INSTANCE-OF INSTANTIATED-COMPOSITE-ICON)
   (CONTAINS-ICONS (a-3-LINE-11 a-3-LINE-12 a-3-LINE-13))
   (CONTAINED-IN-ICON choose-arrows)
   (ALU IOR)
   (TRANSLATE (5 30))
)

(DEFSCHEMA a-3-LINE-11
   (INSTANCE-OF LINE)
   (CONTAINED-IN-ICON little-left-arrow)
   (ALU IOR)
   (TRANSLATE (0 0))
   (ENDPOINT (30 0))
   (THICKNESS 1)
)

(DEFSCHEMA a-3-LINE-12
   (INSTANCE-OF LINE)
   (CONTAINED-IN-ICON little-left-arrow)
   (ALU IOR)
   (TRANSLATE (0 0))
```

```
    (ENDPOINT (10 -10))
    (THICKNESS 1)
    )

(DEFSCHEMA a-3-LINE-13
    (INSTANCE-OF LINE)
    (CONTAINED-IN-ICON little-left-arrow)
    (ALU IOR)
    (TRANSLATE (0 0))
    (ENDPOINT (10 10))
    (THICKNESS 1)
    )

(DEFSCHEMA little-right-arrow
    (INSTANCE-OF INSTANTIATED-COMPOSITE-ICON)
    (CONTAINS-ICONS (a-2-LINE-5 a-2-LINE-6 a-2-LINE-7))
    (CONTAINED-IN-ICON choose-arrows)
    (ALU IOR)
    (TRANSLATE (95 30))
    )

(DEFSCHEMA a-2-LINE-5
    (INSTANCE-OF LINE)
    (CONTAINED-IN-ICON little-right-arrow)
    (ALU IOR)
    (TRANSLATE (0 0))
    (ENDPOINT (-30 0))
    (THICKNESS 1)
    )

(DEFSCHEMA a-2-LINE-6
    (INSTANCE-OF LINE)
    (CONTAINED-IN-ICON little-right-arrow)
    (ALU IOR)
    (TRANSLATE (0 0))
    (ENDPOINT (-10 -10))
    (THICKNESS 1)
    )

(DEFSCHEMA a-2-LINE-7
    (INSTANCE-OF LINE)
    (CONTAINED-IN-ICON little-right-arrow)
    (ALU IOR)
    (TRANSLATE (0 0))
    (ENDPOINT (-10 10))
    (THICKNESS 1)
    )

;;; -*- Mode: ART; Base: 10.; Package: ART-USER -*-

; "***" denotes required values (DEFSCHEMA graph
    (draw           no)     ; set to YES to display
    (in-window)
    (title)
    (title-font         #+sun font-15 #-sun cptfont)
    (title-position)        ; (x y) sequence, all in pixels
    (x-y-zero)              ; (x y) sequence, all in pixels **
    (x-length)              ; in pixels **
```

```
    (y-height)                          ; in pixels **
    (axis-thickness      2)             ; in pixels
    (tick-thickness      2)             ; in pixels
    (ticks-width         10)            ; in pixels
    (x-tick-num-size     3)             ; number of characters
    (y-tick-num-size     3)             ; number of characters
    (x-axis-label)                      ; string
    (y-axis-label)                      ; string
    (x-label-position)                  ; (x y) sequence, all in pixels (default centered)
    (y-label-position)                  ; (x y) sequence, all in pixels (default centered)
    (x-data-min          0)             ; data values
    (y-data-min          0)             ; data values
    (x-data-max)                        ; data values **
    (y-data-max)                        ; data values **
    (min-x-intervals     10)            ; integer
    (max-x-intervals     30)            ; integer
    (min-y-intervals     10)            ; integer
    (max-y-intervals     30)            ; integer
    (x-num-intervals)                   ; (computed)
    (y-num-intervals)                   ; (computed)
    (x-interval-size)                   ; (computed data units)
    (y-interval-size)                   ; (computed data units)
    (pixels-per-x-unit)                 ; (computed)
    (pixels-per-y-unit)                 ; (computed)
    (x-label-spacing)                   ; (computed)
    (y-label-spacing)                   ; (computed)
    (x-start)                           ; (computed data value)
    (y-start)                           ; (computed data value)
    (graph-font     #+sun font-11 #-sun cptfont) )

;********************************** ;** DefActions & Active Values *
;**********************************

;*************** ;** draw graph ** ;***************

(DEFSCHEMA av-draw
  (IS-A active-value))

(DEFACTION put-after (av-draw)
  (schema slot value)
  (draw-graph schema value))

(DEFACTION modify-after (av-draw)
  (schema slot old-value new-value)
  (draw-graph schema new-value))

;********************** ;** compute x-intervals ** ;************************

(DEFSCHEMA av-x-intervals
  (IS-A active-value))

(DEFACTION put-after (av-x-intervals)
  (schema slot value)
  (set-x-interval-vars schema))

(DEFACTION modify-after (av-x-intervals)
  (schema slot old-value new-value)
  (set-x-interval-vars schema))

;********************** ;** compute y-intervals ** ;************************
```

```
(DEFSCHEMA av-y-intervals
  (IS-A active-value))

(DEFACTION put-after (av-y-intervals)
  (schema slot value)
  (set-y-interval-vars schema))

(DEFACTION modify-after (av-y-intervals)
  (schema slot old-value new-value)
  (set-y-interval-vars schema))

;*************************** ;** compute pixels-per-unit **
;***************************

(DEFSCHEMA av-x-pixels
  (IS-A active-value))

(DEFACTION put-after (av-x-pixels)
  (schema slot value)
  (set-x-pixel-var schema))

(DEFACTION modify-after (av-x-pixels)
  (schema slot old-value new-value)
  (set-x-pixel-var schema))

(DEFSCHEMA av-y-pixels
  (IS-A active-value))

(DEFACTION put-after (av-y-pixels)
  (schema slot value)
  (set-y-pixel-var schema))

(DEFACTION modify-after (av-y-pixels)
  (schema slot old-value new-value)
  (set-y-pixel-var schema))

;***************************************************** ;** compute labelling info, spacing & start values * ;*****************************************************

(DEFSCHEMA av-x-labelling
  (IS-A active-value))

(DEFACTION put-after (av-x-labelling)
  (schema slot value)
  (set-x-labelling schema))

(DEFACTION modify-after (av-x-labelling)
  (schema slot old-value new-value)
  (set-x-labelling schema))

(DEFSCHEMA av-y-labelling
  (IS-A active-value))

(DEFACTION put-after (av-y-labelling)
  (schema slot value)
  (set-y-labelling schema))

(DEFACTION modify-after (av-y-labelling)
  (schema slot old-value new-value)
  (set-y-labelling schema))
```

```
;;; -*- mode:art; package:au; base:10. -*- ;SCCS ID string: @(#) cpu-rules.art   version 1.9

;;; Indexes into the hourly CPU table rows:  (defglobal ?*thread-index* = 1
        ?*lambda-index* = 2         ?*rho-cpu-index* = 3
        ?*cpu-bound-index* = 4      ?*exist-index* = 5          )

(defrule prepare-cpu-data
  "Calculate the busy hour according to CPU wait time, and find earliest and latest data hours."
  (declare (salience ?*initialization-salience*))
  (user-parameter B_STAR_CPU ?initial-bound)
  (exists (cpu-wait ? ?))    ;wait until cpu data is present
  =>
  (show-icon 'cpu-window-icon 'cpu-window)
  (for hour inslotvalues 'cpu 'has-instances
        first (setq largest-cpu-util -1     earliest-time 24       latest-time 0)
        do (bind ?util (get-schema-value hour 'cpu-util))
           (bind ?time (get-schema-value hour 'start-hour))
           (if (> ?util largest-cpu-util)         then (setq largest-cpu-util ?util
busiest-hour   hour))         (if (< ?time earliest-time)            then (setq earliest-time
?time))           (if (> ?time latest-time)         then (setq latest-time ?time))
        finally (assert (schema cpu-info                         (user-wait-bound ?initial-bound)
                                (min-hour  = earliest-time)                       (max-hour
= latest-time)                         (busy-hour  = (get-schema-value busiest-hour 'start-hour))
                ))
  )
)

(defrule detect-low-cpu-load
  "IF actual CPU util is low, but desired util is achievable,
  THEN there was a low offered load during that hour."
  (declare (salience ?*initialization-salience*))
  (user-parameter RHO_D ?desired-rho)
  (user-parameter C_HOKE ?choke)
  (schema ?cpu-data-hour       (cpu-util ?actual-rho)      (traffic ?lambda)       (exist-
time ?T)       (est-threads (31 ? ?max-rho ? ?))          )
  (test (and (>= ?max-rho  (* ?desired-rho 100))         (< ?actual-rho (- (* ?desired-rho
100) ?choke))           (/= 0 (mod (* (/ (* ?lambda ?T) 3600) 10000) 10000))           ;The
preceding line detects integer-valued concurrency (to 4 decimal places)          ))
  =>
  (assert (schema ?cpu-data-hour        (info low-cpu-load)))
)

(defrule detect-bottleneck
  "IF the maximum possible computed CPU util. for an hour is less than the desired util,
  THEN a severe bottleneck exists."
  (declare (salience ?*initialization-salience*))
  (user-parameter RHO_D ?desired-rho)
  (schema ?cpu-data-hour       (est-threads (31 ? ?max-rho&:(?max-rho < (* ?desired-rho
100)) ? ?))        )
  =>
  (assert (schema ?cpu-data-hour        (info bottleneck)))
)

(defrule match-on-nonexisting-hour
  "IF user selected a new hour for which no data exists,
  THEN give a message indicating that in cpu-assessment-window"
  (declare (salience ?*user-input-salience*))
  (schema cpu-info
          (graph-hour ?new-hour))
  (not (schema ?
```

```
    (instance-of cpu)
    (start-hour ?new-hour)))
=>
 (refresh-window 'cpu-assessment-window)
 (printout 'cpu-assessment-window t t
   "No CPU data exists for this hour. Please choose another hour."))

(defrule match-on-new-hour
  "IF the user selected a new hour,
   THEN prepare to analyze that hour of CPU data."
  (declare (salience ?*user-input-salience*))
  (schema cpu-info        (graph-hour ?new-hour))
  (schema ?hour-data         (cpu-wait ?)  ; (make sure that we have a cpu-data schema)
  (start-hour ?new-hour)         )
 =>
 (if (get-schema-value 'cpu-info 'graph-data)
   then (modify-schema-value 'cpu-info 'graph-data ?hour-data)
   else    (assert    (schema   cpu-info                        (graph-data    ?hour-data)
                                         )))
 (bind ?x (nth$ (get-schema-value 'cpu-graph 'x-y-zero) 1))
 (bind ?y (nth$ (get-schema-value 'cpu-graph 'x-y-zero) 2))
 ;
 (filled-rectangle (- ?x 100) (- ?y (get-schema-value 'cpu-graph 'y-height) 10)  ;erase the old graph
               (+ ?x (get-schema-value 'cpu-graph 'x-length) 20) (+ ?y 80)
              'COMPLEMENTED-AND 'cpu-window)  ;this ALU erases the indicated area
 (modify-schema-value 'cpu-graph 'draw 'no)
 )

(defrule pick-up-cpu-data-max
 (declare (salience ?*user-interface-setup-salience*))
 (schema cpu-info
       (graph-data ?hour)
       )
 (schema ?hour         (all-cpu-wait ?x-seq)       (all-traffic ?y-seq)         )
 =>
 (bind ?x-max (max 5 (nth$ ?x-seq 31)))  ;make sure that x-max and y-max are positive
 (bind ?y-max (max 500 (+ (nth$ ?y-seq 31) 500)))
 (modify (schema cpu-graph          ;x-data-min and y-data-min default to zero
 (x-data-max  ?x-max)            (y-data-max ?y-max)               (x-tick-num-size
=(max 3 (+ 3 (truncate (log ?x-max 10)))) ) ;show tenths     (y-tick-num-size =(max
3 (+ 1 (truncate (log ?y-max 10)))) )                ))
 (modify-schema-value 'cpu-graph 'draw 'yes)
 )

(defrule get-estimated-values
  "IF the user-set bound or data-hour changes,
   THEN retrieve the new row of associated values."
  (declare (salience ?*user-interface-setup-salience*))
  (schema cpu-info      (user-wait-bound ?b-star)     (graph-data ?data-hour)         )
 =>
 (for row inslotvalues ?data-hour 'est-threads   ;Find row that matches ?b-star
    first (setq best-row (seq$ (list 0 0 0 0 0)))
    do (if (<= (ABS (- ?b-star (nth$ row    ?*cpu-bound-index*)))         (ABS (- ?b-
star (nth$ best-row ?*cpu-bound-index*))))         then (setq best-row row))
    finally (if (get-schema-value ?data-hour 'current-row)             then (modify (schema
?data-hour (current-row  =best-row)))          else (assert (schema ?data-hour (current-
row =best-row))))
    ) ; (printout t t "New data is: " (get-schema-value ?data-hour 'current-row))
 )
```

```
(defrule calculate-arrow-offset
  "Draw the initial arrow for the hour of CPU data that was chosen."
  (declare (salience (- ?*initialization-salience* 1))) ;Wait until current-row slot is populated
; and actual w-cpu is drawn.
  (schema cpu-info          (graph-data ?data-hour)          )
  =>
  (bind ?y-offset (- (nth$ (get-schema-value 'cpu-graph 'x-y-zero) 2) 200))
  (bind ?x-offset (b-cpu-to-x (nth$ (get-schema-value ?data-hour 'current-row) ?*cpu-bound-
index*)))
  (bitblt 'XOR 14 200 'arrow-blt-src-window 32 46          'cpu-window (- ?x-offset 6)
?y-offset) ; Draw initial arrow
  (if (get-schema-value 'cpu-info 'arrow-x-offset)
      then    (modify    (schema    cpu-info                       (arrow-x-offset    ?x-offset)
                         (arrow-y-offset ?y-offset)                ))
      else    (assert    (schema    cpu-info                       (arrow-x-offset    ?x-offset)
                         (arrow-y-offset ?y-offset)                )))
)

(defrule draw-actual-w-cpu
  "Indicate on the graph where the actual CPU queuing falls,
   and fill in the ACTUAL column in the chart."
  (declare (salience ?*initialization-salience*))
  (graph-data cpu-info ?data-hour)
  =>
  (bind ?w_cpu (get-schema-value ?data-hour 'cpu-wait))
  (bind ?lambda (get-schema-value ?data-hour 'traffic))
  (bind ?graph-origin (get-schema-value 'cpu-graph 'x-y-zero))
  (bind ?x-offset (b-cpu-to-x ?w_cpu))
  (bind ?y-offset (lambda-to-y ?lambda))
  ;
  (line ?x-offset ?y-offset           ?x-offset (nth$ ?graph-origin 2)          1 'IOR 'cpu-window)
;draw vertical line
  (line ?x-offset ?y-offset           (nth$ ?graph-origin 1) ?y-offset          1 'IOR 'cpu-window)
;draw horizontal line
  (text (art-string-append "Actual CPU Queuing: " (decimal-format ?w_cpu 1) " sec/xn")          (+
5 ?x-offset) (+ 30 ?y-offset)          (+ 50 ?x-offset) (+ 30 ?y-offset)          'IOR 'font-22 nil
'cpu-window)
  ;
  (hide-icon 'actual-numbers)
  (modify-schema-value 'actual-lambda    'text-string (decimal-format (get-schema-value ?data-hour
'traffic) 1))
  (modify-schema-value 'actual-wcpu      'text-string (decimal-format ?w_cpu 1))
  (modify-schema-value 'actual-threads   'text-string (write-to-string (get-schema-value ?data-hour
'threads)))
  (modify-schema-value 'actual-exist     'text-string (decimal-format (get-schema-value ?data-hour
'exist-time) 1))
  (modify-schema-value 'actual-util      'text-string (decimal-format (get-schema-value ?data-hour
'cpu-util) 1))
  (show-icon 'actual-numbers 'cpu-window)
)

(defrule drag-on-cpu-graph
  "Let the user drag the arrow icon along the CPU graph's X-axis
   until a mouse-click is detected."
  (declare (salience ?*user-input-salience*))
  (fast-parameter min-b-cpu ?min)
  ?u <- (utterance ? cpu-window (mouse-click ? 1 ? ? (sensitize-cpu-graph)))
  =>
  (retract ?u)
  (printout 'status-window t "Move pointer to desired queueing value, then click left.")
```

```
(bind    ?new-x-offset    (drag-pointer   (get-schema-value    'cpu-info    'arrow-x-offset)
                                          (get-schema-value    'cpu-info    'arrow-y-offset)
                          (b-cpu-to-x ?min)                                 (+ 10 (b-
cpu-to-x (get-schema-value 'cpu-graph 'x-data-max)))                        ))
  (printout 'status-window t "Processing ...")
  (modify-schema-value 'cpu-info 'user-wait-bound (click-to-b-value ?new-x-offset)) ;update b-star-
cpu
  (modify-schema-value 'cpu-info 'arrow-x-offset ?new-x-offset)
)

(defrule display-cpu-plot
  "Display the plot for the new hour that the user selected."
  (declare (salience ?*initialization-salience*))
  (schema cpu-info        (graph-data ?data-hour)        )
  =>
  (bind ?x-seq (get-schema-value ?data-hour 'all-cpu-wait))
  (bind ?y-seq (get-schema-value ?data-hour 'all-traffic))
  (modify (schema cpu-plot            (x-points =(for i from 1 to 31 collect$ (b-cpu-to-x
(nth$ ?x-seq i))) )      (y-points =(for i from 1 to 31 collect$ (lambda-to-y (nth$ ?y-
seq i))) )      ))
  (polyline 31       (get-schema-value 'cpu-plot 'x-points)        (get-schema-value 'cpu-
plot 'y-points)     5 'IOR 'cpu-window)
)

(defrule update-cpu-table
  "IF new data hour or new row selected in data hour table,
   THEN update the 'proposed' column in the cpu table."
  (declare (salience ?*user-input-salience*))
  (schema cpu-info        (graph-data ?data-hour)        )
  (schema ?data-hour      (current-row ?row)         )
  =>
  (hide-icon 'proposed-numbers)
  (modify-schema-value 'proposed-lambda  'text-string (decimal-format (nth$ ?row ?*lambda-
index*) 1))
  (modify-schema-value 'proposed-wcpu    'text-string (decimal-format (nth$ ?row ?*cpu-bound-
index*) 1))
  (modify-schema-value 'proposed-threads 'text-string (write-to-string (nth$ ?row ?*thread-
index*)))
  (modify-schema-value 'proposed-exist   'text-string (decimal-format (nth$ ?row ?*exist-index*)
1))
  (modify-schema-value 'proposed-util    'text-string (decimal-format (nth$ ?row ?*rho-cpu-index*)
1))
  (show-icon 'proposed-numbers 'cpu-window)
)

(defrule low-cpu-load-message
  "IF the data hour selected is lightly loaded,
   THEN notify user that the hour is of minimal interest."
  (declare (salience ?*user-input-salience*))
  (user-parameter RHO_D ?desired-rho)
  (schema cpu-info        (graph-data ?new-hour)        )
  (schema ?new-hour       (info low-cpu-load)        (cpu-util ?actual-rho)
   (current-row (? ? ?proposed-util&:(?proposed-util > ?actual-rho) ? ?))       )
  =>
  (refresh-window 'cpu-assessment-window)
  (printout 'cpu-assessment-window t t          "The offerred load during this hour is too small to
achieve" t          " the table's PROPOSED values ..." t t          "Therefore, the proposed
value is of minimal interest.")
)
```

```
(defrule bottleneck-message
  "IF a bottleneck exists during a data-hour,
   THEN put message in cpu-assessment-window describing it."
  (declare (salience ?*user-input-salience*))
  (user-parameter RHO_D ?desired-rho)
  (schema cpu-info          (graph-data ?new-hour)     )
  (schema ?new-hour         (info bottleneck)          (est-threads (31 ?max-lambda ?max-rho ?
?))           )
  =>
  (refresh-window 'cpu-assessment-window)
  (printout 'cpu-assessment-window t t            "A severe bottleneck in this hour precludes
achieving" t              " the desired CPU utilization (" (* ?desired-rho 100) "%)." t t
"Maximum achievable utilization is " (decimal-format ?max-rho 1)          "%, with throughput
of " (decimal-format ?max-lambda 1) " xn/hr.")
)

(defrule compare-cpu-queueing-to-bound
  "IF new data hour or new row selected in data hour table,
       and offerred load during the hour is not low,
   THEN update assessment-window messages."
  (declare (salience ?*user-input-salience*))
  (user-parameter C_LOSE ?epsilon)
  (user-parameter C_HOKE ?choke)
  (user-parameter RHO_D ?desired-rho)
  (schema cpu-info          (graph-data ?data-hour)        )
  (schema ?data-hour        (cpu-util ?actual-util)        (est-threads (31 ?max-lambda ? ? ?))
        (not (info bottleneck))   (current-row (?thread-m ?lambda-m ?util-m ?q-bound ?))
  )
  (or (not (info ?data-hour low-cpu-load))
      (and (info ?data-hour low-cpu-load)       (test (<= ?util-m ?actual-util))       ))
  =>
  (refresh-window 'cpu-assessment-window)
  (bind ?lambda (get-schema-value ?data-hour 'traffic))
  (bind ?w-cpu  (get-schema-value ?data-hour 'cpu-wait))
  ;
  (cond
   ((and (>= ?w-cpu (* ?q-bound (- 1 ?epsilon)))       (<= ?w-cpu (* ?q-bound (+ 1
?epsilon))))
    (printout 'cpu-assessment-window t t          "During the hour from " (setq curr-hour (get-
schema-value ?data-hour 'start-hour)) ":00 to "        (+ 1 curr-hour) ":00, an average of "
            (round (* ?lambda (get-schema-value ?data-hour 'exist-time)) 3600)         "
transactions were active concurrently."))
   ((> ?w-cpu (* ?q-bound (+ 1 ?epsilon)))
    (printout 'cpu-assessment-window t t            "You can decrease CPU wait time by "
(decimal-format (- ?w-cpu ?q-bound) 1)         " sec/xn (to your proposed" t            "
value of " (decimal-format ?q-bound 1) " sec/xn) if you set the Q tree to " ?thread-m " threads ..." t
            " however, you will also decrease throughput by " (decimal-format (- ?lambda
?lambda-m) 1)          " xn/hr."))
   ((< ?w-cpu (* ?q-bound (- 1 ?epsilon)))
    (printout 'cpu-assessment-window t t            "If you are willing to increase CPU wait time
by " (decimal-format (- ?q-bound ?w-cpu) 1)           " sec/xn (to your" t                "
proposed value of " (decimal-format ?q-bound 1) " sec/xn), then you can increase throughput by "
         (decimal-format (- ?lambda-m ?lambda) 1) " xn/hr." t          " Set the Q tree to "
?thread-m " threads to effect this change."))
   )
  (if (or (< ?util-m (* (- ?desired-rho ?choke) 100))       (> ?util-m (* (+ ?desired-rho
?choke) 100)))
    then (printout 'cpu-assessment-window t t t            "However, your current proposed
value for CPU queueing will cause" t             "the actual CPU utilization to differ from
your stated policy (" (* ?desired-rho 100) "%)" t            "by " (decimal-format (ABS (- (*
?desired-rho 100) ?util-m)) 1) "%. "       "Please choose another value.")
```

)
)

;;------------------------------------------------------------------------- ;; The following rules handle the hour-selection user-interface

```
(defrule init-cpu-hour-graphics
  "Draw the 'scale' that lets the user choose an hour"
  (declare (salience ?*user-interface-setup-salience*))
  (schema cpu-info        (min-hour ?min-hour)        (max-hour ?max-hour)        )
=>
  (bind ?width (get-schema-value 'cpu-hour-graphics 'pixels-wide))
  (bind ?height (get-schema-value 'cpu-hour-graphics 'pixels-high))
  (for h from ?min-hour to ?max-hour
       first (setq x (get-schema-value 'cpu-hour-graphics 'x-offset)           y (get-schema-value 'cpu-hour-graphics 'y-offset))
             (text "Click on an hour to examine Throughput vs. Queuing tradeoffs"     x (- y 10) (+ x 10) (- y 10) 'IOR 'font-11 nil 'cpu-window)
       do (rectangle x y (+ x ?width) (+ y ?height)           1 'XOR 'cpu-window)
          (text (write-to-string h)            (+ x 20) (+ y 15) (+ x 30) (+ y 15) 'XOR 'font-22 nil 'cpu-window)          (create-mousable-area (symbol-append 'hour- h) 'cpu-window
             x y (+ x ?width) (+ y ?height)                              (list
'cpu-hour h)                       ;mouse input                         (art-string-append
"Click to examine CPU trade-offs during hour " h)) ;mouse doc.        (setq x (+ x ?width))
    )
)

(defrule show-busy-hour
  "Label the busy-hour, and highlight it as the default choice."
  (declare (salience (- ?*user-interface-setup-salience* 1))) ;Wait until scale is drawn
  (schema cpu-info        (min-hour ?min-hour)         (busy-hour ?busy-hour)         )
=>
  (bind ?x (+ (get-schema-value 'cpu-hour-graphics 'x-offset)          (* (get-schema-value
'cpu-hour-graphics 'pixels-wide) (- ?busy-hour ?min-hour))))
  (bind ?y (get-schema-value 'cpu-hour-graphics 'y-offset))
  (filled-rectangle ?x ?y             (+ ?x (get-schema-value 'cpu-hour-graphics 'pixels-
wide))          (+ ?y (get-schema-value 'cpu-hour-graphics 'pixels-high))
'XOR 'cpu-window)
  (text "Busy-hr." ?x (+ ?y 40) (+ ?x 10) (+ ?y 40) 'IOR 'font-22 nil 'cpu-window)
  (modify (schema cpu-hour-graphics          (current-x ?x)          ))
  (assert (schema cpu-info          (graph-hour ?busy-hour)))
)

(defrule show-bottleneck-hour
  "Place an asterisk behind the hour number of each hour in which a cpu
  bottleneck has been detected."
  (declare (salience (- ?*user-interface-setup-salience* 1)))
  (schema ?cpu-hour
      (info bottleneck)
      (start-hour ?hour))
  (schema cpu-info (min-hour ?min))
=>
  (bind ?left (get-schema-value 'cpu-hour-graphics 'x-offset))
  (bind ?top (get-schema-value 'cpu-hour-graphics 'y-offset))
  (bind ?step (get-schema-value 'cpu-hour-graphics 'pixels-wide))
  (text "*" (+ (+ (* (- ?hour ?min) ?step) ?left) 25)
        (+ 15 ?top)
        (+ (+ (* (- ?hour ?min) ?step) ?left) 35)
        (+ 15 ?top)
        'XOR 'font-22 nil 'cpu-window)
```

```
(text "* indicates bottleneck at this hour."
    ?left (+ ?top 55) (+ ?left 10) (+ ?top 55)
    'IOR 'font-22 nil 'cpu-window)
)

(defrule select-cpu-hour
  "Respond to the user's selection of a (new) CPU data hour."
  (declare (salience ?*user-input-salience*))
  (schema cpu-info        (min-hour ?min-hour))
  ?u <- (utterance ? cpu-window (mouse-click ? 1 ? ? (cpu-hour ?new-hour)))
  =>
  (bind ?old-x (get-schema-value 'cpu-hour-graphics 'current-x))
  (bind ?width (get-schema-value 'cpu-hour-graphics 'pixels-wide))
  (bind ?top (get-schema-value 'cpu-hour-graphics 'y-offset))
  (bind ?bottom (+ ?top (get-schema-value 'cpu-hour-graphics 'pixels-high)))
  ;
  (filled-rectangle  ?old-x  ?top  (+ ?old-x ?width)  ?bottom     ;un-highlight old hour
             'XOR 'cpu-window)
  (bind ?x (+ (get-schema-value 'cpu-hour-graphics 'x-offset)    (* ?width (- ?new-hour
  (get-schema-value 'cpu-info 'min-hour)))))
  (filled-rectangle ?x ?top (+ ?x ?width) ?bottom          ;highlight new hour
  'XOR 'cpu-window)
   (modify (schema cpu-hour-graphics          (current-x ?x))       (schema cpu-info
           (graph-hour ?new-hour)          ))
   (retract ?u)
)
```

APPENDIX.G
Source Code
I/O Subsystem

```
******************************************************************
Copyright (C) 1991 Bell Communications Research, Inc.
All rights reserved.
******************************************************************
```

This set of files contains I/O Subsystem. The rules in these files find the optimum placements for the files in the system being analyzed according to what is known about those files and the disks and controllers they reside on. The expert system (ES) is referred to as FAST in the source code that follows.

group-move-rules.art - find new spots for groups of files.

meta-move-rules.art
perf-pref-rules.art
slot-rules.art    - move files to new spots and determine the
          consequences of those moves.

runstream.art   - build the code which will, when activated by
          the performance team, perform the recommended
          file moves.

;;; -*- mode:art; package:au; base:10. -*- ;SCCS ID string: @(#) group-move-rules.art version 1.4

(defglobal ?*consolidation-salience* = 7500)

(defschema consolidation-candidate
  (instance-of slot)
  (slot-how-many multiple-values))

```
(defschema group-move-target
   (instance-of slot)
   (slot-how-many multiple-values))

(defschema space-for-member
   (instance-of slot)
   (slot-how-many multiple-values))

(defrelation current-move-candidate (?group)
   "The current file-group move/consolidation candidate is ?group")

(defschema revised-disk-space
   (instance-of slot)
   (slot-how-many multiple-values))

(defrule find-group-to-move
   "IF the file move candidate belongs to a file group,
   THEN initiate attempts to move the whole group."
   (declare (salience ?*consolidation-salience*))
   (schema ?frag
      ?x <- (problem next-move-candidate)        (member-of-group ?file-group)          )
   =>
   (retract ?x)
   (assert (current-move-candidate ?file-group))
   (for disk inslotvalues ?file-group 'group-disks
        do (assert (schema =disk                     (consolidation-candidate  ?file-group)
                     (group-move-target ?file-group)                ))
        (fast-print 'status-window t "Attempting to consolidate the file group " ?file-group
" on disk " disk)          )
)

(defrule try-disk-for-group
   "IF group consolidation is impossible,
   THEN select a disk and try to move all group members there."
   (declare (salience ?*consolidation-salience*))
   (string-has-disks ?string-cu ?disk& DISK)
   (current-move-candidate ?file-group)
   (schema ?file-group          (problem consolidation-impossible)           (not (group-disks ?disk))          )
   (not (problem ?string-cu hot-string-cu))
   (not (problem ?disk hot-disk |                    substandard-performance |
substandard-xfer-rate             ))
   (not (group-move-target ?disk ?file-group))
   (not (consolidation-candidate ? ?file-group)) ; only try one disk at a time
   =>
   (assert (schema ?disk             (consolidation-candidate  ?file-group)
(group-move-target ?file-group)           ))
   (fast-print 'status-window t "Attempting to move the file group " ?file-group                  " to disk
" ?disk)
)

(defrule group-target-has-problem
   "IF a candidate target for a file group move already has a problem,
   THEN remove that candidate from consideration."
   (declare (salience *maximum-salience*))
   ?x <- (consolidation-candidate ?disk ?file-group)
   (or
    (problem ?disk ?problem & hot-disk | substandard-performance | substandard-xfer-rate)
    (schema ?           (string-has-disks ?disk)          (problem ?problem & hot-string-cu)
        )
```

)
=>
(retract ?x)
(fast-print 'status-window t "Discarded the file group " ?file-group "'s candidate destination on "
        ?disk " (problem: " ?problem ")" )
)

(defrule group-target-incompatible
  "IF a candidate target for a file group move has incompatible disk prep type,
  THEN remove that candidate from consideration."
  (declare (salience *maximum-salience*))
  ?x <- (consolidation-candidate ?disk ?file-group)
  (fix-or-rem ?disk ?f-or-r)
  (group-disks ?file-group ?old-host)
  (fix-or-rem ?old-host ?f-or-r)
  =>
  (retract ?x)
  (fast-print 'status-window t "Discarded the file group " ?file-group "'s candidate destination on "
        ?disk " (problem: incompatible disk prep type)" )
)

(defrule find-space-for-group
  "When attempting to move a file group to a disk,
  See if the disk has enough space for all the group members."
  (declare (salience ?*consolidation-salience*))
  ?x <- (consolidation-candidate ?disk ?file-group)
  =>
  ;  First, call "match-files-to-space", which asserts "found-space" and "space-for-member" slots
  ;  for files finding space. If the disk's space was sufficient, the function returns the modified
  ;  list of free-space triplets [start end size] for that disk -- otherwise, it returns NIL.
  ;
  (bind ?new-free-list (match-files-to-space ?file-group ?disk))
  ;
  (if ?new-free-list     ; ... if space was found for all the files:
    then (assert (schema ?file-group                   (revised-disk-space (=(seq$ ?new-free-list) on ?disk))  ))
    else (retract ?x)   ; ... if the disk's space was not sufficient:
        (slotd ?disk 'space-for-member)  ;(This works OK even if the slot doesn't exist)
(fast-print 'status-window t "Not enough space on disk " ?disk          " to store the file group " ?file-group)         )
)

(defrule detect-retracted-space
  "IF a file group member's space on a candidate disk
      was retracted because of potential problems,
  THEN don't try to move the group to that disk."
  (declare (salience (- ?*consolidation-salience* 100)))
  ?x <- (consolidation-candidate ?disk ?file-group)
  ?y <- (revised-disk-space ?file-group (? on ?disk))
  (schema ?frag        (member-of-group ?file-group)       (not (stored-on ?disk))
(not (found-space (? on ?disk))) ;See if this fact has disappeared.         )
  =>
  (retract ?x ?y)
  (slotd ?disk 'space-for-member)
  ; No need to report to status window, because the rule that retracted the found-space
  ; already did that.
)

(defrule consolidation-impossible
  "IF none of the disks storing members of a split file group can store them all,

```
   THEN conclude that consolidation is not possible."
   (declare (salience (- ?*consolidation-salience* 200)))
   (current-move-candidate ?file-group)
   (forall (group-disks ?file-group ?disk)       (not (consolidation-candidate ?disk ?file-group))
         )
   =>
   (assert (schema ?file-group             (problem consolidation-impossible)
))
   (fast-print 'status-window t "Unable to consolidate file group " ?file-group     " onto any
of the disks that currently store it")
   )

(defrule move-file-group
   "IF a disk with sufficient space has been found
    THEN move all the file group members to that disk."
   (declare (salience (- ?*consolidation-salience* 200)))
   (consolidation-candidate ?disk ?file-group)
   (revised-disk-space ?file-group (?revised-space on ?disk))
   =>
   (hypothesize
     (assert (schema ?file-group            (new-group-location ?disk)))
     (for frag-loc-seq inslotvalues ?disk 'space-for-member     do (setq frag (nth$ frag-loc-seq 1))
         (assert (schema =frag              (new-location =(seq$ (append (list ?disk)
(list$ (nth$ frag-loc-seq 3)))))       )) ;assert (schema frag (new-location
(disk start end size)))        (fast-print 'status-window t "Moving " (real-name frag) " (from
group " ?file-group          ") to " ?disk " (new vp: " ?current ")" )          )
   (assert (find-a-move-candidate-in-this-vp))
   (slotd ?file-group 'problem)
   (slotd ?file-group 'group-disks)
   (assert (schema ?file-group (group-disks ?disk)))
   (slotd ?disk 'space-for-member)
   (slotd ?disk 'free-space)
   (for space in$ ?revised-space      do (assert (free-space ?disk =space))       )
   (modify-schema-value   'system-info   'number-of-file-moves          (1+ (get-
schema-value 'system-info 'number-of-file-moves)))
   )
)

(defrule cleanup-group-move
   "After hypothesizing a file group move,
    clean up some facts."
   (declare (salience *maximum-salience*))
   (new-group-location ?file-group ?disk)
   ?x <- (current-move-candidate ?file-group)
   ?y <- (consolidation-candidate ?disk ?file-group)
   =>
   (retract ?x ?y)
)

(defrule unsuccessful-group-move
   "IF any of a file group's members could not be moved to the target disk,
    THEN retract that disk's candidacy as a move target."
   (declare (salience (- ?*consolidation-salience* 500)))
   ?x <- (consolidation-candidate ?disk ?file-group)
   (schema ?frag        (member-of-group ?file-group)       (stored-on ?disk)        (not
(found-space (? on ?disk)))  ; See if this was retracted      )
   =>
   (retract ?x)
   (fast-print 'status-window t "The attempted relocation of file group " ?file-group      " to "
?disk " was not successful")
```

)

```
(defrule could-not-move-group

"IF no single disk is capable of storing the group of files,
   THEN prepare to select the next move candidate."
  (declare (salience (- ?*consolidation-salience* 500)))
  ?x <- (current-move-candidate ?file-group)
  (not (consolidation-candidate ?disk ?file-group))
  =>
  (for frag inslotvalues ?file-group 'group-members
       do  (assert  (schema    =frag                         (problem    no-candidate-slot)
                    )))
  (assert (schema ?file-group                (problem unmovable-group)                      )
          (find-a-move-candidate-in-this-vp)          )
  (retract ?x)
)

(defrule record-group-move
  "IF all members of a file group now reside on the same disk,
   THEN infer that the move was successful."
  (declare (salience ?*consolidation-salience*))
  (new-group-location ?file-group ?disk)
  (forall (group-members ?file-group ?frag)       (stored-on ?frag ?disk)           )
  =>
  (assert (schema ?file-group            (info group-move-successful)              ))
)

(defrule report-successful-group-move
  "IF a group file move was successful,
   THEN note that each member was part of that successful move."
  (declare (salience ?*repair-salience*))
  (schema system-info         (post-move-vp ?winner-vp))
  (viewpoint ?winner-vp          (schema ?file-group                  (info group-move-
successful)             (group-disks ?disk)   ; A group move puts all members on one disk
          )           )
  =>
  (repair (art-string-append "File group " ?file-group " should be moved to disk " ?disk))
  (for member inslotvalues ?file-group 'group-members
       do (if (not (art-equal ?disk (get-schema-value member 'stored-on)))         then (diagnosis
(art-string-append "NOTE: File " (real-name member)                                            "
will be moved with its file group (" ?file-group ")")                    (assert (schema
=member                                        (problem    member-of-moved-group)
                   )))   ))
)

(defrule report-unmoved-groups
  "IF the file relocation process has been terminated,
   THEN find and report any unmoved problem file groups."
  (declare (salience ?*consolidation-salience*))
  (schema system-info         (post-move-vp ?winner-vp)           )
  (viewpoint ?winner-vp          (problem ?file-group unmovable-group)              )
  =>
  (repair (art-string-append "FAST tried to move the file group " ?file-group
" to a common location, but found no suitable disk")          )
)

;;; -*- mode:art; package:au; base:10. -*- ;SCCS ID string: @(#) meta-move-rules.art
version 1.13
```

```
(defrule detect-fatal-new-problems
  "IF relocating a file to a certain disk would cause severe new problems,
   THEN remove that disk from consideration as a move target."
  (declare (salience *constraint-salience*))
  (viewpoint ?vp            (new-location ?frag (?new-disk ? ? ?))         (problem ?object
?problem &                             hot-string-cu |                      hot-disk |
                           duplexed-incorrectly |              member-of-split-group
|                          incompatible-disk-prep)           )
  (viewpoint =(car (upper-viewpoints ?vp)))         ?x <- (found-space ?frag (? on ?new-disk))
        (not (new-location ?frag ?))    ;make sure we matched on the file currently being moved
        (not (problem ?object ?problem))         )
  =>
  (fast-print 'status-window t "Could not move file " (real-name ?frag) " to " ?new-disk
" (reason: " ?problem ")" )
  (at =(car (upper-viewpoints ?vp))
    (retract ?x)
    )
  (at ?vp
    (poison "File move to this disk would have caused serious new problems")
    )
  )

(defrule get-substitute-hot-files
  "IF a hot file couldn't be moved,
   THEN try to identify other files on the disk as hot files."
  (declare (salience (+ ?*repair-salience* 100)))
  (schema ?frag        (problem no-candidate-slot)         (problem hot-file | primary-hot-file)
    )
  =>
  (bind ?disk (get-schema-value ?frag 'stored-on))
  (bind ?string-cu (get-schema-value ?disk 'on-string))
  ;
  (if (setq disk-util (get-schema-value ?disk 'calc-util))    ;if the file's disk is hot, then adjust the
disk's calculated util
    then (fast-print 'status-window t "Re-enabling hot-file identification on disk "
?disk ": " ?current )
      (modify-schema-value ?disk 'calc-util (+ disk-util (get-schema-value ?frag 'avg-util)))
      )
  (if (setq str-cu-util (get-schema-value ?string-cu 'calc-util))   ;if the file's CUs are hot, then adjust
their calculated util
    then (fast-print 'status-window t "Re-enabling hot-file identification on string "
?string-cu ": " ?current )
      (modify-schema-value ?string-cu 'calc-util                                    (+ str-cu-util (* 0.1
(get-schema-value ?frag 'xfer)                                                     (get-schema-value
?frag 'i-o-rate))))     )
  )

(defrule wrap-up-duplex-move
  "IF a file used to be duplexed incorrectly was just moved,
   THEN remove the problem slot from its duplex copy, too."
  (declare (salience (+ ?*repair-salience* 10)))    ;Fire before finding the next move candidate
  (viewpoint ?vp        (schema ?frag             (new-location ?)           ;Find the
newly-moved file,              (tip-number ?tip)                )              (schema
?frag-copy              (tip-number ?tip)        ; then find its duplexed copy.
?x <- (problem duplexed-incorrectly)           )             )
  =>
  (at ?vp
    (retract ?x)   ;Because ?frag was moved subject to the duplex constraints,
    )          ; the ?frag-copy is now duplexed correctly, too.
  )
```

```
(defrule restrict-search-tree
  "IF a file has several candidate new locations,
   THEN choose only two."
  (declare (salience (+ ?*repair-salience* 20)))
    (viewpoint ?vp1           (schema ?frag            (new-location (?disk1 $?)))
  (schema system-info              (vp-demerits ?d1))          )
    (viewpoint ?vp2           (schema ?frag            (new-location (?disk2 $?)))
  (schema ?string-cu2            (string-has-disks ?disk2)            (avg-util ?cu2-rho))     )
    (viewpoint ?vp3           (schema ?frag            (new-location (?disk3 $?)))
  (schema system-info              (vp-demerits ?d3 & :(?d3 >= ?d1)))        (schema
  ?string-cu3           (string-has-disks ?disk3)            (avg-util ?cu3-rho &
  :(?cu3-rho >= ?cu2-rho)))       )
    (viewpoint ?parent-vp         (schema ?frag            (problem next-move-candidate)         ?x <- (found-space (? on ?disk3)))         )
    (test (and (not (or (vp-equal? ?vp1 ?vp2)            (vp-equal? ?vp2 ?vp3)  ;Make sure
  we have 3 different vp's.            (vp-equal? ?vp1 ?vp3)))           (vp-equal? (car
  (upper-viewpoints ?vp1)) ?parent-vp)          (vp-equal? (car (upper-viewpoints ?vp2))
  ?parent-vp)         (vp-equal? (car (upper-viewpoints ?vp3)) ?parent-vp)))
  =>
  (fast-print 'status-window t "Retracted " (real-name ?frag) "'s candidate destination on "
  ?disk3 " (superfluous) : " ?parent-vp)
  (at ?parent-vp
    (retract ?x))
  (at ?vp3
    (poison "This vp did not have better util or fewer problems than other vps"))
)

(defrule report-unmoved-files
  "IF FAST tried to move a file, but found no suitable new locations,
   THEN tell the users what happened."
  (declare (salience ?*repair-salience*))
  (schema system-info         (post-move-vp ?winner-vp))
  (viewpoint ?winner-vp          (schema ?frag            (problem no-candidate-slot)
             ))
  =>
  (repair
    (setq repair-string (art-string-append "FAST tried to move file " (real-name ?frag)
                      ", but could find no suitable new location for it")))
  (if (art-equal 'RFS (get-schema-value ?frag 'file-category))
    then (rfs-repair repair-string))
)

(defrule report-disallowed-file-moves
  "IF a potential file move was disallowed by the setup file,
   THEN tell the users what happened."
  (declare (salience ?*repair-salience*))
  (schema system-info         (post-move-vp ?winner-vp))
  (viewpoint ?winner-vp          (schema ?frag            (determination move-disallowed)           ))
  =>
  (bind ?file-type (get-schema-value ?frag 'file-category))
  (repair
    (setq repair-string (art-string-append "The SETUP file prohibits " ?file-type
                      " file moves; therefore, FAST didn't move "
                      (real-name ?frag) " from disk " (get-schema-value ?frag
  'stored-on)           )))
  (if (art-equal 'RFS ?file-type)
    then (rfs-repair repair-string))
)
```

```
(defrule identify-winning-vp
  "IF no more moves are possible
   THEN identify the viewpoint representing the most successful set of moves."
  ;The current criteria is simply the *number* of successful file moves.
  (declare (salience (- ?*repair-salience* 50)))
  (viewpoint ?root
         (schema system-info
              (not (post-move-vp ?)) ;Make sure that a winner hasn't yet been found
              ))
  (viewpoint ?vp1
         (schema system-info
              (number-of-file-moves ?best) ;Pick a winner.
              ))
  (not (exists              ;Verify that no other vp has more moves.
       (viewpoint ?vp2
             (schema system-info
                  (number-of-file-moves ?even-better&:(?even-better > ?best))
                  ))
       ))
  =>
  (at ?root
     (assert (schema system-info
              (post-move-vp ?vp1)
              ))
     )
)

(defrule report-new-hot-disk-files
  "IF an originally-diagnosed hot file could not be moved,
   THEN select from the hot disk a new hot file and move it instead."
  (declare (salience ?*repair-salience*))
  (post-move-vp system-info ?winner-vp)
  (viewpoint ?intermediate-vp         (problem ?frag hot-file))
  (viewpoint =(root-viewpoint)        (not (problem ?frag hot-file)))
  (test (or (vp-inherits-from? ?winner-vp ?intermediate-vp)        (vp-equal?    ?winner-vp ?intermediate-vp)))
  =>
  (root
   (diagnosis
     (setq   diag-string   (art-string-append   "Because   a   hot   file   on   disk   "
                         (get-schema-value   ?frag        'stored-on)
                     " could not be moved, FAST will try to move file "
                     (real-name ?frag) " instead."))
     (setq assert-out (assert (schema ?frag                           (problem new-hot-file)))))
   (if (art-equal 'RFS (get-schema-value ?frag 'file-category))
      then (rfs-diagnosis diag-string assert-out))
   )
)

(defrule report-new-hot-string-files
  "IF an originally-diagnosed hot file could not be moved,
   THEN select from the hot string a new hot file and move it instead."
  (declare (salience ?*repair-salience*))
  (post-move-vp system-info ?winner-vp)
  (viewpoint ?intermediate-vp         (problem ?frag primary-hot-file))
  (viewpoint =(root-viewpoint)        (not (problem ?frag primary-hot-file)))
  (test (or (vp-inherits-from? ?winner-vp ?intermediate-vp)        (vp-equal?    ?winner-vp ?intermediate-vp)))
  =>
```

```
(root
  (diagnosis
    (setq    diag-string    (art-string-append   "Because   a   hot   file   on   string   "
                              (get-schema-value (get-schema-value (get-schema-value ?frag
'stored-on)                                                                       'on-string)
                                                                                'logical-channel)
                              " could not be moved, FAST will try to move file "
                              (real-name ?frag) " instead."))
    (setq assert-out (assert (schema ?frag                           (problem new-hot-cu-
file)))))
   (if (art-equal 'RFS (get-schema-value ?frag 'file-category))
     then (rfs-diagnosis diag-string assert-out))
 )
)

(defrule give-file-move-recommendation
  "IF FAST has decided to move a file,
  THEN show that recommendation to the user."
  (declare (salience (- ?*repair-salience* 10))) ;Put move recommendations last.
  (schema system-info
        (post-move-vp ?winner-vp)
        )
  (viewpoint ?winner-vp
        (schema ?frag
              (new-location (?new-disk ?start ?end ?))
              ))
  =>
  (root
    (bind    ?move-string    (art-string-append    "File    "    (real-name    ?frag)
                              " should be moved from disk "
                              (get-schema-value             ?frag           'stored-on)
                              " to disk " ?new-disk
" [DRA start = " ?start "]."))
    (repair ?move-string)
    (if (art-equal 'RFS (get-schema-value ?frag 'file-category))
      then (rfs-repair ?move-string))
  )
)

;;;-*- mode:art; package:au; base:10. -*- ;SCCS ID string: @(#) perf-pref-rules.art
version 1.16

(defrule lib-file-on-db-pack ; "Try not to place library files on db packs."
  "IF a library file and a database are on the same disk pack,
  THEN consider moving the library file to another disk."
  (declare (salience ?*diagnosis-salience*))
  (schema ?lib-frag          (file-category SP)               ;Find an SP-LIB file
(stored-on ?disk)       )
  (schema ?db-frag       (file-category LFACS_DB | SOAC_DB)      ;and a database file on the
same disk.          (stored-on ?disk)       )
  (not (problem ?lib-frag lib-on-db-pack))  ;(Even if multiple DB files, only report once.)
  =>
  (diagnosis
    (art-string-append "NOTE: Library file " (real-name ?lib-frag)
            " and DB file " (real-name ?db-frag)
            " are both on disk " ?disk ".")
    (assert (schema ?lib-frag              (problem lib-on-db-pack))))
)
```

```
(defrule check-cte-swap-file-placement
  "IF a CTE-SWAP file is not on an LFACS-DB pack or an (otherwise) empty pack,
   THEN consider moving the CTE file to another disk."
  (declare (salience ?*diagnosis-salience*))
  (schema ?cte-frag           (file-category DBK)           ;Find a CTE SWAP file
          (stored-on ?disk)           )
  (exists (schema ?any-other-frag         (file-category DBK)                   (stored-on
          ?disk)      ; If the pack stores other non-CTE-SWAP files ...         ))
  (not (schema ?db-frag           (file-category LFACS_DB)       ; ... but does not store an
       LFACS database,           (stored-on ?disk)           ))
  =>
  (diagnosis                         ; then report the problem.
    (art-string-append "NOTE: Consider moving CTE-SWAP file "                    (real-name
       ?cte-frag)                 " on disk " ?disk " to an LFACS DB pack or an empty pack." )
    (assert (schema ?cte-frag             .             (problem poorly-placed-swap-file)
)))
)

(defrule check-for-multiple-cte-swaps
  "IF more than one CTE-SWAP file is found on a disk,
   THEN report the finding to the user."
  (declare (salience ?*diagnosis-salience*))
  (schema ?cte-frag           (file-category DBK)           ;Find a CTE SWAP file
          (stored-on ?disk)           )
  (exists (schema ?cte-frag-2          ;Look for another one on the same disk.         (file-
          category DBK)          (stored-on ?disk)          )         (not (test (art-equal
          ?cte-frag ?cte-frag-2)))         (not (problem ?cte-frag-2 multiple-cte-swaps))          )
  =>
  (diagnosis
    (art-string-append "NOTE: Multiple CTE-SWAP files on disk " ?disk                   " ..
      Consider moving " (real-name ?cte-frag)                        " to another disk.")
    (assert (schema ?cte-frag           (problem multiple-cte-swaps)                   )))
)

(defrule dps-file-on-ql-pack
  "IF a DPS file and a Quick-Look file reside on the same disk pack,
   THEN consider moving the DPS file to another disk."
  (declare (salience ?*diagnosis-salience*))
  (schema ?dps-frag           (file-category DPS)              ;Find a DPS file
          (stored-on ?disk)           )
  (schema ?ql-frag          (file-category Q-L)            ;and a quick-look file on the same
          disk.          (stored-on ?disk)           )
  (not (problem ?dps-frag dps-on-ql-pack))  ;(Even if multiple Q-L's, only report once.)
  =>
  (diagnosis
    (art-string-append "NOTE: DPS file " (real-name ?dps-frag)
               " and Quick-Look file " (real-name ?ql-frag)
               " are both on disk " ?disk ".")
    (assert (schema ?dps-frag (problem dps-on-ql-pack))))
)

(defrule check-files-against-preps
  "IF a QUICK-LOOK or PER-SAVE file is stored on an 8470/80 disk not prepped at 112,
   THEN consider moving it to an appropriately-prepped disk."
  (declare (salience ?*diagnosis-salience*))
  (schema ?frag         (file-category Q-L | PER_SAVE)        (stored-on ?disk)          )
  (schema ?disk         (disk-model D8470 | D8480)          (disk-prep ?bad-prep & 112)
          )
  =>
  (diagnosis
```

```
      (art-string-append "NOTE: File " (real-name ?frag)
              " on disk " ?disk
              " (prep = " ?bad-prep
              ") should be stored on a 112-prepped disk.")
    (assert (schema ?frag              (problem incompatible-disk-prep)))
  )
)

(defrule non-FACS-hot-disk
  "IF a disk is hot, but has little (or no) TIP file activity,
   THEN the hot disk was caused by non-FACS usage."
  (declare (salience ?*diagnosis-salience*))
  (fast-parameter MIN-HOT-FILE-UTIL ?min-file-util)
  (schema ?disk         (problem hot-disk)          )
  (not (and (stores ?disk ?frag)           (avg-util ?frag ?file-util &:(> ?file-util ?min-file-util))
          ))
  =>
  (diagnosis (art-string-append "NOTE: Hot disk " ?disk                              " is caused
 by non-FACS production system usage")           (assert (schema ?disk
  (problem no-hot-files)                )) )
)

(defrule activity-on-forbidden-pack
  "IF a pack that is designated 'forbidden' shows TIP file activity,
   THEN report it."
  (declare (salience ?*diagnosis-salience*))
  (user-parameter FORBIDDEN_PACK ?disk)
  (exists (schema ?frag              (stored-on ?disk)              (avg-util 0)
         ))
  =>
  (diagnosis (art-string-append "NOTE: TIP file activity detected on disk " ?disk
              " (a 'forbidden pack')")           (assert (schema ?disk
                (problem active-forbidden-pack)                     ))
 )
)

(defrule relocated-no-cache-file
  "IF a non-cache file was moved to a cache string,
   THEN warn that the file must bypass the cache."
  (declare (salience *?repair-salience*))
  (schema system-info         (post-move-vp ?winner-vp)          )
  (viewpoint ?winner-vp          (new-location ?frag ?)          (spec ?frag no-cache-file)
          (stored-on ?frag ?disk)         (string-has-disks ?string-cu ?disk)          (cache
?string-cu yes)       )
  =>
  (repair (art-string-append "Insure that the TIP file " (real-name ?frag)                    "
(tip# = " (get-schema-value ?frag 'tip-number)                         ") bypasses any cache"))
  )

;;;-*-mode:art;package:au;base:10.-*- ;SCCS ID string: @(#) slot-rules.art   version 1.20

(defrelation find-a-move-candidate-in-this-vp () ) ; This fact kicks-off a file move in a vp.

(defrule kickoff-file-moves
  (declare (salience ?*repair-salience*))
  =>
  (assert (find-a-move-candidate-in-this-vp)         (schema system-info            (repair-
mode move-prep-violators))         )
)
```

```
(defrule limit-number-of-moves
  "IF the number of file moves equals the user-set limit,
   THEN prevent any new hypothetical file moves."
  (declare (salience (- ?*repair-salience* 3))); Before find-move-candidate rules,
                              ; but after completion of a move "level"
  (user-parameter MAXIMUM-MOVES ?max)
  (schema system-info       (number-of-file-moves ?done & :(?done >= ?max))           )
  =>
  (root
    (modify    (schema    system-info            (repair-mode   max-moves-completed)
           ))
  )
)

(defrule find-prep-move-candidate
  "IF this is a new vp, and an un-moved prep violator exists,
   THEN designate that file as the next file-move candidate."
  (declare (salience (- ?*repair-salience* 5)))
  ?x <- (find-a-move-candidate-in-this-vp)  ;Set ?current to the new vp
  (schema system-info       (repair-mode move-prep-violators))
  (schema ?frag         (problem incompatible-disk-prep)       (not (problem no-candidate-slot))       (not (new-location ?))        (not (determination do-not-move | move-disallowed))       )
  =>
  (retract ?x)
  (assert (schema ?frag          (problem next-move-candidate)))
)

(defrule find-hot-string-move-candidate
  "IF this is a new vp, and an un-moved hot file exists,
   THEN designate this file as the next file-move candidate."
  (declare (salience (- ?*repair-salience* 5)))
  ?x <- (find-a-move-candidate-in-this-vp)  ;Set ?current to the new vp
  (schema system-info       (repair-mode move-hot-string-files))
  (schema ?frag         (problem primary-hot-file)       (not (problem no-candidate-slot))
       (not (new-location ?))       (not (determination do-not-move | move-disallowed))
  )
  =>
  (retract ?x)
  (assert (schema ?frag           (problem next-move-candidate)))
)

(defrule find-hot-disk-move-candidate
  "IF this is a new vp, and an un-moved hot file exists,
   THEN designate this file as the next file-move candidate."
  (declare (salience (- ?*repair-salience* 5)))
  ?x <- (find-a-move-candidate-in-this-vp)  ;Set ?current to the new vp
  (schema system-info       (repair-mode move-hot-disk-files))
  (schema ?frag       (problem hot-file)       (not (problem no-candidate-slot))
  (not (new-location ?))       (not (determination do-not-move | move-disallowed))            )
  =>
  (retract ?x)
  (assert (schema ?frag           (problem next-move-candidate)))
)

(defrule wrap-up-hot-file-relocations
  "IF no more hot files can be moved,
   THEN prune the search tree before allowing other files to be moved."
  (declare (salience (- ?*repair-salience* 10)))
  (schema system-info       (repair-mode move-hot-disk-files))
```

```
(viewpoint ?vp1                  (schema system-info              (number-of-file-moves ?best)
;Pick a winner.                     )                (find-a-move-candidate-in-this-vp)         )
  (viewpoint ?vp2                (schema system-info              (number-of-file-moves
?worse&:(?worse <= ?best)) ;prune the losers                   .)

?x <- (find-a-move-candidate-in-this-vp)          )
  (test (not (vp-equal? ?vp1 ?vp2)))
  =>
  (at ?vp2
     (retract ?x)
     )
  )

(defrule change-to-hot-file-mvmnt-mode
  "IF all prep-size offenders have been moved,
   THEN enable movement of (string-level) hot files."
  (declare (salience (- ?*repair-salience* 15)))
  (schema system-info         (repair-mode move-prep-violators))
  =>
  (modify-schema-value 'system-info 'repair-mode 'move-hot-string-files)
  )

(defrule change-hot-file-movement-mode
  "IF all primary-hot-files have been moved,
   THEN enable movement of (disk-level) hot-files."
  (declare (salience (- ?*repair-salience* 15)))
  (schema system-info         (repair-mode move-hot-string-files))
  =>
  (modify-schema-value 'system-info 'repair-mode 'move-hot-disk-files)
  )

(defrule change-file-movement-mode
  "IF the process of relocating hot-files is complete,
   THEN change to the mode that allows relocation of other files."
  (declare (salience (- ?*repair-salience* 15))); Only fire after hot-file moves are complete
  (schema system-info         (repair-mode move-hot-disk-files))
  =>
  (modify (schema system-info         (repair-mode move-non-hot-files)))
  )

(defrule find-non-hot-move-candidate
  "IF this is a new vp, and an un-moved problem file exists,
   THEN designate that file as the next file-move candidate."
  (declare (salience (- ?*repair-salience* 15)))
  ?x <- (find-a-move-candidate-in-this-vp)
  (schema system-info        (repair-mode move-non-hot-files))
  (schema ?frag         (problem duplexed-incorrectly |                too-many-rfs-files |
             member-of-split-group          )          (not (problem no-candidate-
slot))       (not (determination do-not-move | move-disallowed))          )
  =>
  (retract ?x)
  (assert (schema ?frag         (problem next-move-candidate)))
  )

(defrule find-valid-destination-string
  "IF a file is to be moved,
   THEN identify the destination controllers that are not over-utilized."
  (declare (salience (+ ?*repair-salience* 10)))
  (schema ?string-cu       (object-type string-cu)         (not (problem hot-string-cu))
```

```
)
   (schema ?frag             (problem next-move-candidate)           )
=>
   (assert (schema ?string-cu           (has-space-for ?frag)                ))
)

(defrule find-a-spare-slot
  "Find disks that are capable of storing the file-move candidate"
  (declare (salience (+ ?*repair-salience* 10)))
   (schema ?frag          (fra (?fstart ?fend))         (problem next-move-candidate)          )
   (schema ?curr-disk          (stores ?frag)           (fix-or-rem ?fix-or-rem-value)          )
   (has-space-for ?new-cu ?frag)
   (schema ?new-disk                  (on-string ?new-cu)             (fix-or-rem ?fix-or-rem-value)
;Either   both   fixed   or   both   removable.               (not   (problem   hot-disk   |
               substandard-performance  |                     substandard-xfer-rate))
         ; Find an empty slot -- use best-fit algorithm         (free-space (?start ?end ?best-size
 & :(?best-size > (?fend - ?fstart))))        (not          (free-space ( ?start ? ?worse-size &
:(and (?worse-size > (?fend - ?fstart))                                                 (?worse-
size < ?best-size)))))         )
  (test (not (art-equal ?curr-disk ?new-disk)))
=>
  (bind ?file-size (+ 1 (- ?fend ?fstart)))
  (assert (schema ?new-disk            (has-space-for ?frag)              )
 (schema ?frag          (found-space ((?start =(- (+ ?start ?file-size) 1) ?file-size) on
?new-disk))         ))
  (fast-print 'status-window t "Found an empty slot for " (get-schema-value ?frag 'file-name)
       " (" ?frag ") on " ?new-disk " : " ?current)
)

(defrule discard-slot-bad-prep
  "IF the destination disk is not prepped suitably for the file move candidate,
   THEN discard the candidate destination."
  (declare (salience *maximum-salience*)) ;Check a candidate slot's validity immediately.
   (schema ?frag        (problem next-move-candidate)
        (file-category ?file-type)          (stored-on ?curr-disk)           (rbw ?rbw-value)
;(pick up value of read-before-write slot)
     ?x <- (found-space (? on ?new-disk))            )
   (schema ?curr-disk          (disk-model D8470 | D8480)  ;(This rule only applies to 8470/80
disks)         (disk-prep ?curr-prep) ;Prep factor of current disk.           )
   (schema ?new-disk          (disk-model D8470 | D8480)         (disk-prep ?new-prep)  ;Prep
factor of proposed destination disk.         (not (cache yes))         )
   (test (or (and (or (art-equal ?file-type 'Q-L)    ;Quick-Look and Per-Save files
 (art-equal ?file-type 'PER_SAVE))           (= 112 ?curr-prep)                ; on 112 disks
              (/= 112 ?new-prep))           ; should go to 112 disks.         (and (= 448
?curr-prep)        ; Files on 448 disks should go to 448 disks ...            (or (and
(art-equal ?rbw-value 'no)   ; only if there is no r-b-w.                         (/= 448 ?new-
prep))             (and (art-equal ?rbw-value 'yes) ;If there is a read-before-write,
             (= 448 ?new-prep)))       ; then they should go to 112 disks.
      ))      )
=>
  (retract ?x)
  (fast-print 'status-window t "Discarded " (get-schema-value ?frag 'file-name)          "'s
candidate destination on " ?new-disk           " (unsuitable disk prep)" )
)

(defrule discard-slot-duplex-violation
  "IF the destination disk is on the same string as the file move candidate's duplexed leg,
   THEN discard the candidate destination."
  (declare (salience *maximum-salience*)) ;Check a candidate slot's validity immediately.
```

```
(user-parameter DPLX_ON_SAME_STRING false)   ;If duplexing on same string is not allowed ...
(schema ?frag           (spec duplex)            (problem next-move-candidate).        (tip-
number ?tip)       (location-of ?filename)         (stored-on ?curr-disk)
   ?x <- (found-space (? on ?new-disk))         )
(schema ?copy-frag                ;Find the frag's copy          (spec duplex)            (tip-
number ?tip)      ; (same TIP number,          (location-of ?filename)    ; different
filename)          (stored-on ?copy-disk)        )
   (schema ?string-cu        (string-has-disks ?new-disk) ;Detect both legs on the same string.
           (string-has-disks ?copy-disk)         )
=>
(retract ?x)
(fast-print 'status-window t "Discarded " ?filename "'s candidate destination on " ?new-disk
           " (duplex violation)")
)

(defrule discard-slot-on-forbidden-pack
   "IF a disk has been designated by the user as a forbidden pack,
   THEN discard any candidate file destinations on that disk."
   (declare (salience *maximum-salience*))
   (user-parameter FORBIDDEN_PACK ?forbidden-disk)
   ?x <- (found-space ?frag (? on ?forbidden-disk))
   =>
   (retract ?x)
   (fast-print 'status-window t "Discarded " (real-name ?frag)          "'s candidate destination on
" ?forbidden-disk          " (forbidden disk)")
)

(defrule found-no-slots
   "IF the file-move candidate found no suitable slots,
   THEN mark the file as unmoveable."
   (declare (salience (- ?*repair-salience* 2)))
   (schema ?frag
      ?x <- (problem next-move-candidate)         (not (found-space ?))         )
   =>
   (retract ?x)
   (assert (schema ?frag               (problem no-candidate-slot))  ;Mark fragment as
unmoveable        (find-a-move-candidate-in-this-vp))  ;Kick-off next file-move attempt
   (fast-print 'status-window t "No suitable destinations were found for "         (real-name
?frag) " (" ?frag ") in " ?current)
)

(defrule hypo-move-by-capacity
   "IF the file-move candidate has found a candidate location,
   THEN hypothesize moving the file to that location."
   (declare (salience ?*repair-salience*))
   (schema ?frag         (found-space ((?start ?end ?size) on ?disk))      (not (member-of-
group ?))  ;grouped file moves are handled seperately      )
=>
(hypothesize
   (assert (schema ?frag          (new-location (?disk ?start ?end ?size))    ;Assert the
assumption for the new vp.          ))
   (assert (find-a-move-candidate-in-this-vp))       ;Assert a fact into the new vp.
   (fast-print 'status-window t "Moving " (real-name ?frag) " to " ?disk " (new vp: " ?current ")" )
   (modify-schema-value 'system-info 'number-of-file-moves             (1+ (get-
schema-value 'system-info 'number-of-file-moves)))
)
)

(defrule adjust-free-space
   "IF a file has just been moved,
```

THEN update the free-space information on the new disk."
(declare (salience *maximum-salience*))
(new-location ?frag (?new-disk ?start ?frag-end ?frag-size))
?x <- (free-space ?new-disk (?start ?space-end ?space-size))
=>
(retract ?x)
(assert (free-space ?new-disk (=(+ ?start ?frag-size) ?space-end =(- ?space-size ?frag-size))))
)

(defrule adjust-util-special-case
"IF a no-cache file has just been moved to a cached string,
THEN adjust utils of new disk and string."
(declare (salience *maximum-salience*))
(schema ?frag         (spec no-cache-file)        (new-location (?new-disk ? ? ?))        )
(schema ?new-disk     (cache yes)        )
=>
(bind ?frag-rho (get-schema-value ?frag 'avg-util))
(bind ?old-disk (get-schema-value ?frag 'stored-on))
(bind ?old-string-cu (get-schema-value ?old-disk 'on-string))
(bind ?new-string-cu (get-schema-value ?new-disk 'on-string))
;
(if (/= ?frag-rho 0)            ;if file has actual perf data ...
   then
     (let ((delta-cu 0)      (delta-disk 0)        (same-string (art-equal ?old-string-cu ?new-string-cu))    )
       (if    (art-equal    'yes    (get-schema-value    ?old-disk    'cache))
          then                         ;problem file was on cached string         (if (not same-string)        then (setq delta-cu (* 0.1                          (get-schema-value ?frag 'i-o-rate)
                                                  (/ (get-schema-value ?frag 'i-o-size)
                                                     (get-schema-value ?new-disk 'xfer-no-hit))
                        )))          (setq delta-disk (+ delta-cu (* .1 (+ (get-schema-value ?new-disk 'seek-time)
                                                                                       (get-schema-value ?new-disk 'latency)
                                                                                                                   ))))
          else                     ;problem file was on a conventional (non-cached) string
            (if (not same-string)        then (setq delta-cu (* 0.1
(get-schema-value ?frag 'xfer)                                  (get-schema-value ?frag 'i-o-rate))))
            (setq delta-disk ?frag-rho)            )
       (if (not (= delta-cu 0))        then (modify-schema-value ?new-string-cu 'avg-util (+ (get-schema-value   ?new-string-cu   'avg-util)
delta-cu)))
       (if (not (= delta-disk 0))      then (modify-schema-value ?new-disk 'avg-util (+ (get-schema-value   ?new-disk   'avg-util)                                                                                         delta-disk)))
     ))
;
(slotd ?frag 'problem)              ;Delete *all* of the frag's problem slots
(slotd ?frag 'found-space)          ;Delete *all* of the frag's found-space slots
(modify-schema-value ?frag 'stored-on ?new-disk)
)

(defrule adjust-util-default-case
"IF a normal file was moved, or any file was moved to non-cached disk,
THEN adjust utils of new disk and string."
(declare (salience *maximum-salience*))
(new-location ?frag (?new-disk ? ? ?))
(found-space ?frag (? on ?new-disk))  ;This pattern is removed on the RHS;
                          ; it prevents both disjuncts from firing.
(or (not (spec ?frag no-cache-file))
    (not (cache ?new-disk yes)))
=>

```
(bind ?frag-rho (get-schema-value ?frag 'avg-util))
(bind ?old-disk (get-schema-value ?frag 'stored-on))
(bind ?old-string-cu (get-schema-value ?old-disk 'on-string))
(bind ?new-string-cu (get-schema-value ?new-disk 'on-string))
;
(if (/= ?frag-rho 0)                    ;if file has actual perf data ...
   then
     (let ((delta-cu 0)    (delta-disk 0)    (same-string (art-equal ?old-string-cu ?new-string-cu))  )
        (if (not same-string)    then (setq delta-cu (* 0.1                    (get-schema-value ?frag 'xfer)                (get-schema-value ?frag 'i-o-rate))))
        (setq   delta-disk    (* 0.1                      (get-schema-value ?frag 'i-o-rate)
                        (+ (get-schema-value ?frag 'xfer)                         (- (get-schema-value ?new-disk 'svc-time)                    (get-schema-value ?new-disk 'xfer)))))
        (if (not (= delta-cu 0))       then (modify-schema-value ?new-string-cu 'avg-util (+ (get-schema-value   ?new-string-cu   'avg-util)   delta-cu)))
        (if (not (= delta-disk 0))        then (modify-schema-value ?new-disk 'avg-util (+ (get-schema-value   ?new-disk   'avg-util)                                delta-disk)))
     ))
(slotd ?frag 'problem)            ;Delete *all* of the frag's problem slots
(slotd ?frag 'found-space)        ;Delete *all* of the frag's found-space slots
(modify-schema-value ?frag 'stored-on ?new-disk)
)
```

;;; -*- mode:art;package:au;base:10.-*- ;SCCS ID string: @(#) runstream.art   version 1.9

;;;;;File move runstreams ; This rule set finds all the fragment moves recommended as the best moves, ; picks up all the necessary information about those fragments and asserts ; facts for moving the hvtip libraries and tip files. If a file is duplexed, ; a dup-runline is asserted for special handling

```
(defrelation runline (?filename ?category ?start ?end ?disk ?loc)) (defrelation duplex-runline
(?filename ?category ?start ?end ?disk ?loc))
(defrule find-moves
   (declare (salience (+ ?*runstream-salience* 10)))
   (schema system-info (post-move-vp ?best-move-vp))
   (viewpoint ?best-move-vp
      (schema ?frag
        (new-location (?newdisk ?diskloc ? ?))
        (fra (?start ?end))))

=>

(if (get-schema-value ?frag 'spec)
    then (assert (duplex-runline =(get-schema-value ?frag 'file-name)
                  =(get-schema-value ?frag 'file-category)
                  ?start ?end ?newdisk ?diskloc))
    else (assert (runline =(get-schema-value ?frag 'file-name)
                  =(get-schema-value ?frag 'file-category)
                  ?start ?end ?newdisk ?diskloc)))
)
```

; This rule checks for presence of runline facts for tip files( that is ; all files except hvtip libraries which have file-category 'SP') and ; if no output file is opened already, it opens the tip file move runstream ; file, writes the header messages, and also puts the header messages into ; the runstream menu for display later.

```
(defrule tip-runstream-header
   (declare (salience ?*runstream-salience*))
   (runline|duplex-runline ?  SP ? ? ? ? )

(not (schema system-info (tip-runstream ?)))
   ?menu <- (menu runstream ?header (?current-text) ?choices )
   =>
     (retract ?menu)
     (bind ?tiprunstream (art-string-append "" (gentemp "move-tip")))
     #L (with-open-file (file ?tiprunstream
            :direction :output :if-exists :new-version :if-does-not-exist
            :create)
        (printout file t "@MSG TIP SCHEDULING MUST BE OFF." t
                 "@MSG,W IF IT IS ON, ABORT THIS JOB" t
                 "@PRIV ON" t
                 "@MSAR,IV" ))
     (assert (menu runstream
                = (art-string-append "MSAR RUNSTREAM GENERATED BY FAST IN FILE "
                           ?tiprunstream)
                (" "
                "@MSG TIP SCHEDULING MUST BE OFF."
                "@MSG,W IF IT IS ON, ABORT THIS JOB"
                "@PRIV ON"
                "@MSAR,IV")
                ?choices))
     (assert (schema system-info (tip-runstream ?tiprunstream)))
)

; Note the use of function first-part in writing out the file names... ; filenames must be parsed and
    only the first part up to the "^" written out.
(defrule tip-runstream-movelines
   "IF the tip file move runstream has been opened and there are moves
       to be made (runline relations with category not SP),
    THEN write a move line to the file for that move
       and put the move line in the runstream menu"
   (declare (salience ?*runstream-salience*))
   (schema system-info (tip-runstream ?tiprunstream))
   ?x <- (runline ?file-name   SP ?start ?end ?newdisk ?diskloc)
   ?menu <- (menu runstream ?header ($?current-text) ?choices )

=>
    (retract ?x ?menu)
    #L(with-open-file (file ?tiprunstream :direction :output :if-exists :append)
        (printout file t "MOVE " (first-part ?file-name "^") " " ?start "-" ?end
              " TO " ?newdisk " " ?diskloc))
    (assert (menu runstream ?header
                ($?current-text = (art-string-append "MOVE " (first-part ?file-name "^")
                           " " ?start "-" ?end " TO " ?newdisk " " ?diskloc))
                ?choices))
)
```

; Note, if you can determine which leg of the duplexed file is being moved here, ; indicate it in the moveline, otherwise just use the stripped file name. ; Add a warning message just to be on the safe side.

```
(defrule tip-runstream-duplex-movelines
   "IF the tip file move runstream has been opened and there are duplex moves
       to be made ,
```

```
     THEN write a warning message and move line to the file for that move
        and put the lines in the runstream menu"
   (declare (salience ?*runstream-salience*))
   (schema system-info (tip-runstream ?tiprunstream))
   ?x <- (duplex-runline ?file-name SP ?start ?end ?newdisk ?diskloc)
   ?menu <- (menu runstream ?header ($?current-text) ?choices )

=>
   (retract ?x ?menu)
   (if (has-substring ?file-name "LEG-01" "LEG-1")
    then (bind ?print-line (art-string-append "MOVE " (first-part ?file-name "^^^") ",1 "
                                ?start "-" ?end " TO " ?newdisk " " ?diskloc))
    else (if (has-substring ?file-name "LEG-02" "LEG-2")
         then (bind ?print-line (art-string-append "MOVE " (first-part ?file-name "^^^") ",2 "
                                ?start "-" ?end " TO " ?newdisk " " ?diskloc))
         else (bind ?print-line (art-string-append "MOVE " (first-part ?file-name "^^^") " " 
                                ?start "-" ?end " TO " ?newdisk " " ?diskloc))))
   (bind ?warning "@MSG,W CHECK THAT NEXT LINE INDICATES CORRECT FILENAME
(TIP-FILENAME,LEG)" )

#L(with-open-file (file ?tiprunstream :direction :output :if-exists :append)
        (printout file t ?warning t ?print-line))
   (assert (menu runstream ?header
                  ($?current-text ?warning ?print-line)
                  ?choices))
)

(defrule tip-runstream-closer
  "IF there are no more runlines for tip files
   THEN write the closing lines and remove the tip-runstream fact from
        system info. Put the closing lines into the runstream menu and
        give message to user about where the move file is"
  (declare (salience ?*runstream-salience*))
  (not (runline|duplex-runline ? SP ? ? ? ?))
  ?x <- (schema system-info (tip-runstream ?tiprunstream))
  ?menu <- (menu runstream ?header ($?current-text) ?choices )
=>
  (retract ?x ?menu)
  #L(with-open-file (file ?tiprunstream :direction :output :if-exists :append)
       (printout file t "EXIT" t
                 "@BRKPT LOGFIL" t
                 "@SYM,U LOGFIL." t
                 "@MSG   A RECAP OF THE FILE MOVE PROCESS" t
                 "@MSG   HAS BEEN PRINTED ON THE SYSTEM'S" t
                 "@MSG   DEFAULT PRINTER" t
                 "@MSG   IF MOVES WERE SUCCESSFUL, TURN" t
                 "@MSG   ON TIP SCHEDULING, BEFORE RESUMING" t
                 "@MSG,W PRODUCTION PROCESSING" t))
  (assert (menu runstream ?header
                 ($?current-text
                  "EXIT"
                  "@BRKPT LOGFIL"
                  "@SYM,U LOGFIL."
                  "@MSG   A RECAP OF THE FILE MOVE PROCESS"
                  "@MSG   HAS BEEN PRINTED ON THE SYSTEM'S"
                  "@MSG   DEFAULT PRINTER"
                  "@MSG   IF MOVES WERE SUCCESSFUL, TURN"
                  "@MSG   ON TIP SCHEDULING, BEFORE RESUMING"
                  "@MSG,W PRODUCTION PROCESSING")
                 ?choices))
```

```
    (fast-print 'status-window t "MSAR move runstream for TIP files is "
            ?tiprunstream))
```

; This rule checks for presence of runline facts for hvtip libraries (that is ; all files which have file-
category 'SP') and opens a file, writes header ; messages, the move line, closing messages and a
message to the user about ; where the runstream is located.

```
(defrule lib-runstream-create
  "IF there are runlines for SP libraries
   THEN open a file, write the lines and retract the runline fact"

(declare (salience ?*runstream-salience*))
  ?x <- (runline ?filename SP ?start ?end ?newdisk ?diskloc )
  ?menu <- (menu lib-runstream ?header ($?current-text) ?choices )
  =>

(bind ?runstream-name (format nil " a" (gentemp "move-lib")))
  (retract ?x ?menu)
  #L (with-open-file (file ?runstream-name
                :direction :output :if-exists :new-version
                :if-does-not-exist :create)
    (printout file t "@MSG   TIP SCHEDULING MUST BE OFF." t
            "@MSG,W IF IT IS ON, ABORT THIS JOB!!" t
            "@MSG   THIS RUNSTREAM MOVES AN HVTIP LIBRARY" t
            "@MSG   THE LIBRARY MUST FIRST BE OFLINED VIA TPUR" t
            "@MSG,W IF THIS HAS NOT BEEN DONE ABORT THIS JOB!!" t
            "@PRIV  ON" t
            "@MSAR,IU" t
            "MOVE " ?filename " " ?start "-" ?end " TO "
            ?newdisk " " ?diskloc t
            "@BRKPT LOGFIL" t
            "@SYM,U LOGFIL." t
            "@MSG   A RECAP OF THE LIBRARY MOVE HAS" t
            "@MSG   BEEN PRINTED ON THE SYSTEM'S" t
            "@MSG,W DEFAULT PRINTER. REVIEW THE RESULTS" t
            "@MSG   TO RESUME PRODUCTION PROCESSING" t
            "@MSG   1. USE TPUR TO BRING LIBRARY ONLINE" t
            "@MSG   2. USE VALINT TO WRITE VALTAB TO MASS STORAGE" t
            "@MSG   3. TURN ON TIP SCHEDULING" t
            "@MSG   FAILURE TO EXECUTE THE ABOVE STEPS" t
            "@MSG,W WILL RESULT IN TIP SCHEDULING ERRORS" t))
  (assert (menu runstream "The following HVTIP Library Runstreams were generated:"
            ($?current-text
            " "
            "HVTIP LIBRARY RUNSTREAM FOR " ?filename " IN " ?runstream-name
            "@MSG   TIP SCHEDULING MUST BE OFF."
            "@MSG,W IF IT IS ON, ABORT THIS JOB!!"
            "@MSG   THIS RUNSTREAM MOVES AN HVTIP LIBRARY"
            "@MSG   THE LIBRARY MUST FIRST BE OFLINED VIA TPUR"
            "@MSG,W IF THIS HAS NOT BEEN DONE ABORT THIS JOB!!"
            "@PRIV  ON"
            "@MSAR,IU"
            "MOVE " ?filename " " ?start "-" ?end " TO "
            ?newdisk " " ?diskloc
            "@BRKPT LOGFIL"
            "@SYM,U LOGFIL."
            "@MSG   A RECAP OF THE LIBRARY MOVE HAS"
            "@MSG   BEEN PRINTED ON THE SYSTEM'S"
            "@MSG,W DEFAULT PRINTER. REVIEW THE RESULTS"
            "@MSG   TO RESUME PRODUCTION PROCESSING"
```

```
"@MSG  1. USE TPUR TO BRING LIBRARY ONLINE"
"@MSG  2. USE VALINT TO WRITE VALTAB TO MASS STORAGE"
"@MSG  3. TURN ON TIP SCHEDULING".
"@MSG   FAILURE TO EXECUTE THE ABOVE STEPS"
"@MSG,W WILL RESULT IN TIP SCHEDULING ERRORS")
?choices))
)
```

APPENDIX H
Source Code
I/O Subsystem

```
*****************************************************************
Copyright (C) 1991 Bell Communications Research, Inc.
All rights reserved.
*****************************************************************
```

This group of files contains I/O subsystem code. This set of schema definitions and rules describe the knowledge base uses to analyze the I/O subsystem, and the rules by which this analysis is accomplished. After these rules fire, the expert system (ES), referred to as FAST in the following code, knows what problems exist in the I/O subsystem.

io-schemas.art - skeleton knowledge base, templates for the data about
    the system being analyzed (disks, files, controllers,etc.)

file-spec-rules.art - sets up default specifications for any files, disks,
    etc. about which we have incomplete data group-rules.art - gathers files that should be stored together in a group hot-file-rules.art - finds problems with files (files that need to be moved)

hot-rules.art - finds problems with disks, controllers damage-rules.art - finds problems with duplexed files ;;;-*-mode:art;package:au;base:10.-*- ;SCCS ID string: @(#) io-schemas.art   version 1.17

```
;      ---------------------------------------------------------------          ;
---------------------------------------------------------------- ;   A-priori Schema Information for
FAST ;   Instances of these various objects will be created based on input data ;
----------------------------------------------------------------                 ;
----------------------------------------------------------------

(defschema system-data-profile
  (company unknown)
  (machine unknown)
  (date unknown))

;   ---------------------------------------------------------------   ;   Define relations among ctlrs,
disks and files ; ---------------------------------------------------------------

(defschema inherits-thresholds-from
  "The configuration schemas inherit utilization thresholds from user-defined values"
  (instance-of inh-relation)
  (slot-how-many single-value)
  (slot-output (configuration ?schema inherits utilization thresholds from ?value))
  (slot-input-output (configuration ?schema inherits utilization thresholds from ?value))
)

(defschema controls
  "A control unit controls a disk"
  (instance-of relation) ; don't inherit "up" the schema hierarchy
```

(slot-how-many multiple-values)
   (inverse controlled-by)
   (slot-output (controller ?schema controls disk ?value))   ;Need statement (syntax output (...)) ? as for defrelation?
   (slot-input-output (controller ?schema controls disk ?value)))   ;Need statement (syntax output (...)) ? as for defrelation?

(defschema controlled-by
  "A disk is controlled by a control unit"
  (instance-of relation)
  (inverse-of controls)
  (slot-how-many multiple-values)
  (slot-output (disk ?schema is controlled-by control unit ?value))
  (slot-input-output (disk ?schema is controlled-by control unit ?value)))

(defschema string-has-disks
  "A (logical) string-controller controls a disk"
  (instance-of relation) ; don't inherit "up" the schema hierarchy
  (slot-how-many multiple-values)
  (inverse on-string)
  (slot-output (the logical string ?schema controls disk ?value))
  (slot-input-output (the logical string ?schema controls disk ?value)))

(defschema on-string
  "A disk is a member of a string controlled by a (logical) string-controller"
  (instance-of relation)
  (inverse-of string-has-disks)
  (slot-how-many single-value)
  (slot-output (disk ?schema is controlled by logical string ?value))
  (slot-input-output (disk ?schema is controlled by logical string ?value)))

(defschema has-components
  "A (logical) string-controller's components are (physical) control units."
  (instance-of relation)
  (inverse component-of)
  (slot-how-many multiple-values)
  (slot-output (string controller ?schema controls the control unit ?value))
  (slot-input-output (string controller ?schema controls the control unit ?value)))

(defschema component-of
  "A control unit is a component of the logical entity called a string-controller"
  (instance-of relation)
  (inverse-of has-component)
  (slot-how-many single-value)
  (slot-output (control unit ?schema is controlled by string controller ?value))
  (slot-input-output (control unit ?schema is controlled by string controller ?value)))

(defschema configuration-of
  "A certain configuration of a kind of disk"
  (instance-of inh-relation)
  (inverse configured-as)
  (slot-how-many multiple-values)
  (slot-output (disk ?schema is a configuration of a ?value disk))
  (slot-input-output (disk ?schema is a configuration of a ?value disk)))
(defschema configured-as
  "Disks can be configured in different ways--eg, prep, cache presence can differ"
  (instance-of relation) ; don't inherit "up" the schema hierarchy
  (slot-how-many multiple-values)
  (slot-output (disk ?schema is configured as a ?value disk))

```
    (slot-input-output (disk ?schema is configured as a ?value disk)))

(defschema location-of
   "Location info describes the location of a part or whole file"
   (instance-of inh-relation)
   (inverse has-location)
   (slot-how-many single-value)
   (slot-output (?schema is the location of file ?value))
   (slot-input-output (?schema is the location of file ?value)))

(defschema has-location
   "Files have specific location(s), denoted by disk name and file relative address"
   (instance-of relation)
   (slot-how-many multiple-values)
   (slot-output (the location of file ?schema is ?value))
   (slot-input-output (the location of file ?schema is ?value)))

(defschema stores
   "Disks store (pieces of) files"
   (instance-of relation)
   (slot-how-many multiple-values)
   (inverse stored-on)
   (slot-output (disk ?schema stores the file fragment ?value))
   (slot-input-output (disk ?schema stores the file fragment ?value)))

(defschema stored-on
   "A file is stored on a certain disk(s)"
   (instance-of relation)
   (slot-how-many single-value)
   (slot-output (file fragment ?schema is stored on disk ?value))
   (slot-input-output (file fragment ?schema is stored on disk ?value)))

(defschema recommended-stores
   "FAST recommends that a disk should store this (these) file(s)."
   (instance-of relation)
   (slot-how-many multiple-values)
   (inverse recommended-stored-on)
   (slot-output (?schema is the disk recommended by FAST for the location of file fragment ?value))
   (slot-input-output (?schema is the disk recommended by FAST for the location of file fragment
?value)))

(defschema recommended-stored-on
   "FAST recommends that the file should be moved to this disk."
   (instance-of relation)
   (slot-how-many single-value)
   (slot-output (the disk recommended by FAST for the location of file fragment ?schema is ?value))
   (slot-input-output (the disk recommended by FAST for the location of file fragment ?schema is
?value)))
(defschema cu-model
   "Disks can be controlled by more than one type of control unit"
   (instance-of slot)
   (slot-input-output (the model name of control unit ?schema is ?value))
   (slot-how-many multiple-values))

(defschema free-space
   "Set of unused chunks of space on a disk"
   (instance-of slot)
   (slot-how-many multiple-values)
   (slot-input-output (disk ?schema has a chunk of free space with start-location#, end-location#,
and size of ?value)))
```

```
(defschema fra
    "File relative address on a certain disk--each one is a pair, with start and end fra"
    (instance-of slot)
    (slot-input-output (the file relative address of file fragment ?schema is ?value))
    (slot-how-many single-value))

(defschema disks-on-string
    "Controllers have more than one disk on the string they control"
    (instance-of slot)
    (slot-input-output (controller ?schema control disk ?value))
    (slot-how-many multiple-values))

(defschema has-space-for
    "A disk can have space for more than one file"
    (instance-of slot)
    (slot-input-output (disk ?schema has space for file ?value))
    (slot-how-many multiple-values))

(defschema found-space
    "A file can find many candidate slots for the file move"
    (instance-of slot)            ; ex: (found-space ((?start ?end ?size) on ?disk))
    (slot-input-output (there is space for file ?schema at ?value))
    (slot-how-many multiple-values))

(defschema problem
    "An object can have more than one problem"
    (instance-of slot)
    (slot-input-output (?schema has been diagnosed by FAST to have the problem ?value))
    (slot-how-many multiple-values))

; ---------------------------------------------------------------------- ; Slot definitions for output syntax
only     --     default     behavior     is     appropriate     ;     otherwise     ;
---------------------------------------------------------------------- (defschema cu-name
    ""
    (instance-of slot)
    (slot-input-output (the control unit ?schema has the name ?value)))

(defschema object-type
    ""
    (instance-of slot)
    (slot-input-output (i/o subsystem object ?schema is a ?value)))

(defschema manufacturer
    ""
    (instance-of slot)
    (slot-input-output (the manufacturer of disk ?schema is ?value)))

(defschema logical-channel
    ""
    (instance-of slot)
    (slot-input-output (the logical channel of ?schema is ?value)))

(defschema max-util
    ""
    (instance-of slot)
    (slot-input-output (the maximum allowable utilization of ?schema is ?value)))

(defschema avg-util
    ""
    (instance-of slot)
    (slot-input-output (the average utilization of ?schema is ?value)))
```

```
(defschema svc-time
  ""
  (instance-of slot)
  (slot-input-output (the average service time for ?schema is ?value)))

(defschema ret
  ""
  (instance-of slot)
  (slot-input-output (the average request existence time of ?schema is ?value)))

(defschema xfer
  ""
  (instance-of slot)
  (slot-input-output (the average transfer time for ?schema is ?value)))

(defschema dev-chq
  ""
  (instance-of slot)
  (slot-input-output (the time spent waiting for access to the disk for ?schema is ?value)))

(defschema fld
  ""
  (instance-of slot)
  (slot-input-output (the file lock delay for file fragment ?schema is ?value)))

(defschema rbw
  ""
  (instance-of slot)
  (slot-input-output (the amount of read-before-write accesses for file ?schema is ?value)))

(defschema percent-read
  ""
  (instance-of slot)
  (slot-input-output (accesses to file fragment ?schema were read only ?value percent of the time)))

(defschema i-o-size
  ""
  (instance-of slot)
  (slot-input-output (the I/O size of file fragment ?schema is ?value)))

(defschema i-o-rate
  ""
  (instance-of slot)
  (slot-input-output (the I/O rate of file fragment ?schema is requests per second is ?value)))

(defschema spec
  ""
  (instance-of slot)
  (slot-how-many multiple-values)
  (slot-input-output (it is specified that file ?schema should be set up as ?value))
) (defschema tip-number
  ""
  (instance-of slot)
  (slot-input-output (the tip number of file fragment ?schema is ?value)))

(defschema file-name
  ""
  (instance-of slot)
  (slot-input-output (the file fragment ?schema has the name ?value)))
```

```
(defschema file-category
  ""
  (instance-of slot)
  (slot-input-output (the file category classification of file ?schema is ?value)))

(defschema xfer-all-hit
  ""
  (instance-of slot)
  (slot-input-output (the transfer rate for disk ?schema when configured on a cache controller is ?value)))

(defschema xfer-no-hit
  ""
  (instance-of slot)
  (slot-input-output (the transfer rate for disk ?schema when there are no hits is ?value)))

(defschema latency
  ""
  (instance-of slot)
  (slot-input-output (the latency measurement of disk ?schema is ?value)))

(defschema seek-time
  ""
  (instance-of slot)
  (slot-input-output (the seek time in milliseconds of disk ?schema is ?value)))

(defschema sk+lt+cu-dly
  ""
  (instance-of slot)
  (slot-input-output (the seek time + latency + control unit delay of disk ?schema is ?value)))

(defschema max-disk-util
  ""
  (instance-of slot)
  (slot-input-output (the maximum allowable utilization for disk ?schema is ?value)))

(defschema disk-prep
  ""
  (instance-of slot)
  (slot-input-output (disk ?schema has a preparation factor of ?value)))

(defschema disk-name
  ""
  (instance-of slot)
  (slot-input-output (the disk ?schema has the name ?value)))

(defschema disk-model
  ""
  (instance-of slot)
  (slot-input-output (the model type of disk ?schema is ?value)))

(defschema max-cu-util
  ""
  (instance-of slot)
  (slot-input-output (the maximum utilization allowed for control unit ?schema is ?value)))

(defschema cache
  ""
  (instance-of slot)
```

(slot-input-output (the answer to the question of whether control unit ?schema has cache is ?value)))

(defschema back-factor
""
(instance-of slot)
(slot-input-output (the back-factor for disk ?schema is ?value msec)))

; ------------------------------------------------------------ ; Define schemas connected by
relations above and standard ;           inheritance relations is-a and instance-of ; First,
relationships and EXPECTED performance stats for disk/controller combos ;
------------------------------------------------------------

(defschema string-cu
  "A string-controller is a logical entity usually composed of dual control units."
  (avg-util)      ;The sum of the component cu's avg-utils.
  (max-util)      ;The config's max-cu-util times the number of component cu's.
  (logical-channel)
  (string-has-disks disk)
  (has-components cu)
)

(defschema control-unit
  "Basic controller information"
(controls disk)
(component-of string-cu)
(disks-on-string)     ; Sequence of all disknames on this string (single value)
(manufacturer unisys)
(cu-name)
(cu-model)
(cache NO)
(avg-util)
(logical-channel)
)         (defschema cu5056
"Model 5056 controller"
(is-a control-unit)
(cu-model cu5056))

(defschema cu5057
  "Model 5057 controller"
(is-a control-unit)
(cu-model cu5057))

(defschema disk
  "Basic disk info."
  (controlled-by control-unit)
  (on-string string-cu)
  (disk-model)
  (disk-name)
  (disk-prep 112)
  (avg-util)
  (sk+lt+cu-dly)
  (seek-time) ; in milliseconds
  (dev-ch-q)
  (latency)
  (xfer-no-hit)
  (xfer-all-hit))

(defschema 8470-80-disk
  "Model 8470/80 disk"

```
  (is-a disk)
  (controlled-by cu5056 cu5057))

(defschema 8470-80-on-5056
  "Model 8470/80 disk controlled by a 5056 control unit"
  (cu-model cu5056)
  (seek-time 23)
  (latency 8.3)
  (controlled-by cu5056))

(defschema 8470-80-on-5056-1
  "A certain configuration of an 8470/80 disk controlled by a 5056 control unit"
  (configuration-of 8470-80-disk)
  (instance-of   8470-80-on-5056)   ;   (inherits-thresholds-from   8470-80-on-5056-1-thresholds)   ;
  (controlled-by cu5056)
  (disk-prep 112)
  (back-factor 2.99)
  (xfer-no-hit 263)
  (xfer-all-hit not-applicable))

(defschema 8470-80-on-5056-2
  "A second configuration of an 8470/80 disk controlled by a 5056 control unit"
  (configuration-of 8470-80-disk)
  (instance-of   8470-80-on-5056)   ;   (inherits-thresholds-from   8470-80-on-5056-2-thresholds)   ;
  (controlled-by cu5056)
  (disk-prep 448)
  (back-factor 2.99)
  (xfer-no-hit 372)
  (xfer-all-hit not-applicable))

(defschema 8470-80-on-5056-3
  "A third configuration of an 8470/80 disk controlled by a 5056 control unit"
  (configuration-of 8470-80-disk)
  (instance-of   8470-80-on-5056)   ;   (inherits-thresholds-from   8470-80-on-5056-3-thresholds)   ;
  (controlled-by cu5056)
  (disk-prep 1792)
  (back-factor 7.8)
  (xfer-no-hit 429)
  (xfer-all-hit not-applicable))

(defschema 8470-80-on-5057
  "A certain configuration of an 8470/80 disk controlled by a 5057 control unit"
  (configuration-of 8470-80-disk )
  (cu-model cu5057) ; (inherits-thresholds-from 8470-80-on-5057-thresholds)
  (cache YES)
  (disk-prep 1792)
  (back-factor 0)
  (seek-time 23)
  (latency 8.3)
  (controlled-by cu5057)
  (xfer-no-hit 429)
  (xfer-all-hit 495))

(defschema 8481-disk
  "An 8481 is a kind of disk"
  (is-a disk)
  (controlled-by cu5057))

(defschema 8481-on-5057
  "An 8481 disk controlled by a 5057 control unit"
```

```
  (cu-model cu5057)
  (xfer-no-hit 319)
  (controlled-by cu5057))

(defschema 8481-on-5057-1
  "A certain configuration of an 8481 disk controlled by a 5057 control unit"
  (configuration-of 8481-disk)
  (instance-of 8481-on-5057) ; (controlled-by cu5057) ; (inherits-thresholds-from 8481-on-5057-1-thresholds)
  (seek-time 18)
  (latency 13.9)
  (disk-prep 112)
  (back-factor 2.99)
  (xfer-all-hit not-applicable))

(defschema 8481-on-5057-2
  "A second configuration of an 8481 disk controlled by a 5057 control unit"
  (configuration-of 8481-disk)
  (instance-of 8481-on-5057) ; (controlled-by cu5057) ; (inherits-thresholds-from 8481-on-5057-2-thresholds)
  (cache YES)
  (seek-time 18)
  (latency 13.9)
  (disk-prep 112)
  (back-factor 0)
  (xfer-all-hit 495))

(defschema 9494-disk
  "Model 9494 disk"
  (is-a disk)
  (controlled-by cu5057))

(defschema 9494-on-5057
  "A 9494 disk controlled by a 5057 control unit"
  (cu-model cu5057)
  (configuration-of 9494-disk)
  (cache YES)
  (disk-prep 112)
  (back-factor 0)
  (seek-time 17)
  (latency 8.3)
  (xfer-no-hit 484)
  (xfer-all-hit 484))

(defschema ssd-disk
  "An ssd is a kind of disk"
  (is-a disk)
  (controlled-by cu5057))

(defschema ssd-on-5057
  "An ssd disk controlled by a 5057 control unit"
  (cu-model cu5057) ; (controlled-by cu5057)
  (configuration-of ssd-disk ) ; (inherits-thresholds-from ssd-on-5057-thresholds)
  (cache YES)
  (disk-prep DONT-CARE)
  (back-factor 0)
  (max-disk-util not-applicable)
  (max-cu-util 50)
  (seek-time 0)
```

```
(latency 0)
(xfer-no-hit not-applicable)
(xfer-all-hit 495))

;       ------------------------------------------------------------        ;       ;
------------------------------------------------------------

(defschema file
  "Main information for a given tip file"
  (file-category) ;type of file...eg, reference, system, etc.
  (file-name)     ; Human readable name (hopefully)
  (tip-number)    ; Use to correlate with schema which has main file information
  (spec)          ; Use to define set-up specifications such as duplex or store-thru
  (has-location fragment)
) ; this stuff now goes in the location schemas for file fragments, subordinate to the file schema,
and ; connected by location-of relations (defschema fragment
  "Info for file fragments:"
  (stored-on disk)
  (location-of file)
  (avg-util)      ; Average utilization of the file
  (i-o-rate)      ; Lambda - I/O rate in requests per second
  (i-o-size)      ; I/O size
  (percent-read)  ; Percent of accesses to file which were read only ????Tony
  (rbw)           ; Read before write access - yes or no => perf impact
  (fld)
  (dev-chq)
  (sk+lt+cu-dly)
  (xfer)
  (ret)
  (svc-time)
)

;;;-*-mode:art;package:au;base:10.-*- ;SCCS ID string: @(#) file-spec-rules.art   version 1.14

(defrule start-file-perf-defaults
  (declare (salience (- ?*initialization-salience* 149)))
  =>
  (fast-print 'status-window t         "Assigning default performance data to files having no actual performance measurements")
)

(defrule assign-default-file-perf
  "IF a file fragment has no performance data,
   THEN fill in zeros for all performance measurements."
  (declare (salience (- ?*initialization-salience* 150)))
  (location-of ?frag& fragment ?)   ;Find a file fragment
  (not (avg-util ?frag ?))        ; with no performance data. ; (schema ?frag ;       (location-of ?filename) ;         (file-name ?filename) ;       (not (avg-util ?)) ;         )
  => ; ;Because ?frag is an instance-of fragment, we don't need SLOTCs. ; (put-schema-value ?frag 'avg-util   0) ; (put-schema-value ?frag 'i-o-rate   0) ; (put-schema-value ?frag 'i-o-size 0) ; (put-schema-value ?frag 'percent-read 0) ; (put-schema-value ?frag 'rbw    'no) ; (put-schema-value ?frag 'fld   0) ; (put-schema-value ?frag 'dev-chq   0) ; (put-schema-value ?frag 'sk+lt+cu-dly 0) ; (put-schema-value ?frag 'xfer   0) ; (put-schema-value ?frag 'ret 0) ; (put-schema-value ?frag 'svc-time   0) ; )
  (assert (schema ?frag              (avg-util 0)            (i-o-rate 0)
    (i-o-size 0)            (percent-read 0)          (rbw NO)         (fld 0)
            (dev-chq   0)            (sk+lt+cu-dly  0)  .       (xfer  0)
```

```
                (ret 0)              (svc-time 0)           ))
)

(defrule end-file-perf-defaults
  (declare (salience (- ?*initialization-salience* 151)))
  =>
  (fast-print 'status-window t        "Finished assigning default file performance data.")
)

(defrule setup-duplex-spec
  "IF the SETUP file declares that a file should be duplexed,
   THEN find that file and note its duplex requirement internally."
  (declare (salience (- ?*initialization-salience* 90)))
  (user-parameter DUPLEX_FILE ?dup-filename& NULL)
  (schema ?filename          (instance-of file)    ;Find the file (not file fragment) with the duplex
requirement             )
  (test (has-substring ?filename ?dup-filename))
  =>
  (assert (schema ?filename            (spec duplex)))
  (fast-print 'status-window t         "Specified duplex requirement for file " ?filename ".")
)

(defrule setup-storethru-spec
  "IF the SETUP file declares that a file should be store-thru,
   THEN find that file and note its store-thru requirement internally."
  (declare (salience (- ?*initialization-salience* 91)))
  (user-parameter STORE_THRU_FILE ?s-t-filename& NULL)
  (schema ?filename          (instance-of file)    ;Find the file (not file fragment) with the store-
thru requirement           )
  (test (has-substring ?filename ?s-t-filename))
  =>
  (assert (schema ?filename            (spec store-thru)))
  (fast-print 'status-window t         "Specified store-thru requirement for file " ?filename ".")
)

(defrule setup-no-cache-spec
  "IF the SETUP file declares that a file should not be cached,
   THEN find that file and note its non-cache requirement internally."
  (declare (salience (- ?*initialization-salience* 95)))
  (user-parameter NO_CACHE_FILE ?value& NULL)
  (schema ?filename          (instance-of file)          (or (tip-number ?value)         (file-
category ?value)        )        )
  =>
  (assert (schema ?filename            (spec no-cache-file)))
  (fast-print 'status-window t         "Specified no-cache requirement for file " ?filename)
)

;;; -*- mode:art; package:au; base:10. -*- ;SCCS ID string: @(#) group-rules.art
version 1.3

(defschema group-members
  (instance-of relation)
  (inverse member-of-group)
  (slot-how-many multiple-values)
  (slot-input-output (the file group ?schema has a member called ?value))
)
```

```
(defschema member-of-group
  (instance-of relation)
  (slot-how-many single-value)
  (slot-input-output (the file fragment ?schema is a member of the group ?value))
 )

(defschema group-disks
  (instance-of relation)
  (slot-how-many multiple-values)
  (slot-input-output (the file group ?schema has at least one file on disk ?value))
 )

(defschema group-type
  (instance-of slot))

(defrule make-lfacs-db-group
  "Gather LFACS_DB files with a common NPANNX code into a group"
  (declare (salience (- ?*initialization-salience* 99)))
  (schema ?lfacs-db-frag        (lfacs-db ?npannx)         (not (member-of-group ?))
(stored-on ?disk)           )
  =>
  (append-group (symbol-append 'lfacs-db- ?npannx) ?lfacs-db-frag 'lfacs-db ?disk)
 )

(defrule make-soac-seg-group
  "Gather SOAC_DB files from the same segment into a group"
  (declare (salience (- ?*initialization-salience* 99)))
  (soac-segment ?seg-designation ?tip-num)
  (tip-number ?soac-frag ?tip-num)
  (not (member-of-group ?soac-frag ?))
  (stored-on  ?soac-frag ?disk)
  =>
  (append-group ?seg-designation ?soac-frag 'soac-segment ?disk)
 )

(defrule make-cte-group
  "Pair up the CTE SWP and TFS files"
  (declare (salience (- ?*initialization-salience* 99)))
  (schema  ?cte-frag           (location-of ?cte-filename&:(has-substring ?cte-filename 'CTESWP
'CTETFS))       (not (member-of-group ?))          (stored-on ?disk)         )
  =>
  (append-group (symbol-append 'CTE- (string-left-trim "CTEFSWP" (real-name ?cte-filename)))
           ?cte-frag 'cte-pair ?disk)
 )

(defrule detect-split-group
  "IF more than one disk is used to store a file group,
   THEN the group is split (and should be consolidated)"
  (declare (salience ?*diagnosis-salience*))
  (schema ?file-group      (group-disks ?disk1)       (group-disks ?disk2&~?disk1)
(not (problem split-group))        )
  =>
  (bind ?type (get-schema-value ?file-group 'group-type))
  (diagnosis   (art-string-append   "The   files   in   "  ?file-group   " (a   "  ?type
                ")      are      split      across      these         disks:    "
                (string-of-disk-names ?file-group))             (assert (schema ?file-
group                 (problem split-group)                         )))
  (for frag inslotvalues ?file-group 'group-members
      do (setq file-name (get-schema-value frag 'location-of)         disk   (get-schema-
value frag 'stored-on))
```

```
          (diagnosis (art-string-append "File " (real-name file-name) " is on disk " disk
                               ",     but    another    file    in    the    "  ?type
                               "    "    ?file-group    "    is    on    "
                               (if (art-equal disk ?disk1) then ?disk2 else ?disk1))
              (assert (schema =frag                                    (problem member-of-
split-group)
                       )))          )
)
```

```
;;; -*- mode:art; package:au; base:10. -*- ;SCCS ID string: @(#) hot-file-rules.art
version 1.7

(defrule detect-small-d-banks
  "IF no CTE swap file has an average I/O-size greater than 40K words,
   THEN report that the transaction d-banks should be expanded."
  (declare (salience (+ ?*diagnosis-salience* 10)))
  (not (hardware outage)) ;don't fire if hardware outage where we haven't read file data
    (not (schema ?cte-frag           (file-category DBK)           (file-name ?cte-
filename&:(has-substring ?cte-filename "CTE"))        (i-o-size ?size&:(?size > 40000))
          ))
  =>
  (diagnosis
    "The transaction D-banks are too small"
    (assert (schema system-info          (problem d-banks-too-small))))
  (repair (art-string-append "Expand the transaction D-banks (New size must be an integral multiple
of 1792 words)."))
  )

(defrule detect-bad-d-bank-size
   "IF none of the CTE-SWAP files have (IO-size mod 448) = 0,
    THEN report that the D-bank size should be corrected."
  (declare (salience (+ ?*diagnosis-salience* 9)))
  (not (hardware outage)) ;don't fire if hardware outage where we havn't read file data
  (viewpoint =(root-viewpoint)   ;If the disk's STORES slot is updated, don't re-evaluate this rule
          (not (and          (schema ?cte-frag               (file-category
DBK)              (file-name ?cte-filename&:(has-substring ?cte-filename "CTE"))
              (i-o-size ?size & 0 & :(= (mod ?size 448) 0))                    )
            (schema ?disk              (disk-model D8470 | D8480)
                (stores ?cte-frag)              )          ))
)
=>.
  (diagnosis
   "The sizing of your D-banks is causing RBWs to the CTE-SWAP files"
   (assert (schema system-info           (problem d-banks-sized-incorrectly))))
 )

(defrule check-redundant-repairs
   "IF the D-banks are incorrectly sized,
    but we already recommended a correction (because of small D-banks),
    THEN don't repeat the repair recommendation."
  (declare (salience (+ ?*diagnosis-salience* 9))) ;Wait for D-bank diagnosis rules to fire
    (schema system-info          (problem d-banks-sized-incorrectly)          (not (problem d-
banks-too-small))          )
  =>
  (repair "Resize the transaction D-banks to be an integral multiple of 1792 words.")
  )
```

```
(defrule hot-swp-move-alternatives
    "IF a CTE-SWAP file is hot, but the D-banks are the wrong size,
    THEN don't try to move that file."
    (declare (salience (+ ?*diagnosis-salience* 10)))
            ;Fire this rule immediately after diagnosing hot-file
    (schema system-info        (problem d-banks-too-small | d-banks-sized-incorrectly))
    (schema ?cte-frag          (problem hot-file | primary-hot-file)         (file-category DBK)
            (file-name     ?cte-filename&:(has-substring  ?cte-filename   "CTE"))        (not
(determination do-not-move))    )
    =>
    (assert (schema ?cte-frag              (determination do-not-move)))
    (repair (art-string-append "Instead of moving the hot file " (real-name ?cte-frag)
            ", first resize the transaction D-banks, then re-analyze performance."))
)

;(defrule hot-swp-with-old-cte-release ; "IF a CTE-SWAP file is hot, but an obsolete CTE release is
in use, ; THEN don't try to move that file." ; (declare (salience (+ ?*diagnosis-salience* 10))) ;
;Fire this rule immediately after diagnosing hot-file ; (schema system-info ;        (problem old-
cte-release)) ; (schema ?cte-frag ;        (problem hot-file) ;        (file-category DBK) ;
(file-name ?cte-filename&:(has-substring ?cte-filename "CTE")) ;        ) ; => ; (assert (schema
?cte-frag ;              (determination do-not-move))) ; (repair (format nil "Instead of moving
the hot file S, ;            correct the size of the transaction D-banks" ?cte-filename)) ; )

(defrule hot-lib-with-single-map
    "IF an SPLIB file is hot, but only one I-bank is configured for each D-bank,
    THEN don't try to move that file."
    (declare (salience (+ ?*diagnosis-salience* 10)))
            ;Fire this rule immediately after diagnosing hot-file
    (user-parameter MULTI-Is false)
    (schema ?lib-frag          (problem hot-file | primary-hot-file)         (file-category SP)
(not (determination do-not-move))        )
    =>
    (assert (schema ?lib-frag              (determination do-not-move)))
    (repair (art-string-append "Instead of moving the hot file " (real-name ?lib-frag)
            ", configure more than one I-bank for each D-bank."))
)

(defrule hot-lib-not-duplexed
    "IF an SPLIB file is hot, but it is not duplexed,
    THEN recommend duplexing it rather than moving it."
    (declare (salience (+ ?*diagnosis-salience* 10)))
            ;Fire this rule immediately after diagnosing hot-file
    (user-parameter MULTI-Is true)
    (user-parameter DUPLEX_LIBs true) ;See if they're willing to duplex hot libs.
    (schema ?lib-frag          (problem hot-file | primary-hot-file)         (file-category SP)
(not (determination do-not-move))         (file-name ?lib-filename)         (tip-number ?tip)
        )
    (not (schema ?           (tip-number ?tip)         (file-name ?lib-filename)
))
    =>
    (assert (schema ?lib-frag              (determination do-not-move)))
    (repair (art-string-append "Instead of moving the hot file " (real-name ?lib-frag)
            ", try duplexing it to reduce the traffic."))
)

;;;-*-mode:art;package:au;base:10.-*- ;SCCS ID string: @(#) hot-rules.art   version 1.24

(defrule substandard-disk-perf ; "Detect substandard disk performance"
    "IF a disk's delay is over a threshold, but that disk's controllers aren't hot,
```

THEN report that the disk has substandard performance."
(declare (salience (- ?*diagnosis-salience* 10))) ;(wait until all hot string-cu's found)
(fast-parameter cu-delay-percent ?cu-dly-percent)
  (schema ?disk          (seek-time ?seek)              ;(pick up spec seek-time and latency.)
         (latency ?lat)                           ;If disk has high delay...        (sk+lt+cu-dly
?avg-dly&:(?avg-dly > (* (+ 1 ?cu-dly-percent) (+ ?seek ?lat))))        (disk-model 9494)
         (on-string ?string-cu)        )
  (schema ?string-cu        (not (problem hot-string-cu))        ;but controllers aren't hot...
         ) =>
(diagnosis
  (art-string-append "Disk " ?disk " : Check cylinder placement for high-access files. If placement is OK, then disk is substandard")
  (assert (schema ?disk             (problem substandard-performance))))
)

(defrule substandard-disk-xfer-time
"IF a non-cached disk's actual transfer time (minus the Read-Before-Write contribution) is greater than the spec transfer time (plus a user-defined cushion),
   THEN report that the disk's transfer time is substandard."
  (declare (salience ?*diagnosis-salience*))
  (fast-parameter DISK-XFER-CUSHION ?cushion)    ; (percent)
  (fast-parameter RPS-LOOKAHEAD ?rps-lookahead)  ; (msec)
  (schema ?disk         (object-type disk)    ;Fire for each disk        (xfer-no-hit ?spec-xfer& 0)  ;Get spec xfer-rate    ; (Matching for ?spec-xfer here verifies that data is present in disk schema)        )
  (schema ?string-cu        (string-has-disks ?disk)        (cache no)        )
=>
  (bind ?lat    (get-schema-value ?disk 'latency)) ;Get spec latency (msec)
  (bind ?b-factor (get-schema-value ?disk 'back-factor)) ;Get spec back-factor (msec)
  (bind ?avg-xfer (get-schema-value ?disk 'xfer))   ;Get actual xfer time
;
  (for file inslotvalues ?disk 'stores
      do (bind ?lambda      (get-schema-value file 'i-o-rate))
         (bind ?write-percent (/ (- 100 (get-schema-value file 'percent-read)) 100))
         into lambda-sum  sum ?lambda
         into write-sum   sum (* ?lambda ?write-percent)
         into i-o-size-sum sum (* ?lambda (get-schema-value file 'i-o-size))
         into rbw-time-sum  sum (if (string-equal "yes" (get-schema-value file 'rbw))
                       then (* ?lambda ?write-percent)                  else 0)
      finally (if (> lambda-sum 0.0)        then (bind ?rbw-contrib (/ (* 2 ?lat rbw-time-sum) lambda-sum))
                                   (bind ?ok-xfer     (* (+ 1 ?cushion)
                                            (+ (/ (+ (/ i-o-size-sum ?spec-xfer)
                                                    (* ?b-factor write-sum))
                                                 lambda-sum)
?rps-lookahead)))        (fast-print t t "Disk " ?disk ": xfer=" ?avg-xfer
                                         ", RBW-contrib=   " ?rbw-contrib
                                         ", (spec * cushion)=" ?ok-xfer)
  (if (> (- ?avg-xfer ?rbw-contrib) ?ok-xfer)                               then (diagnosis
                           (art-string-append "Substandard transfer time on disk " ?disk)
                           (assert (schema ?disk
(problem        substandard-xfer-rate)                                                                      )))
                           )))
)

(defrule find-hot-strings-single-cu
"IF the average utilization of a string's controller is over a threshold value,
  THEN report the control unit as being 'hot'."
  (declare (salience (+ ?*diagnosis-salience* 100)))
  (schema ?string-cu    (has-components ?cu)        (not (has-components ?cu))
(max-util ?max-rho)        (avg-util ?avg-rho&:(?avg-rho >= ?max-rho)) ;Identify a hot string.

```
         (not (problem hot-string-cu))        )
=>
(assert (schema ?string-cu            (calc-util ?avg-rho)))
(diagnosis
  (art-string-append "The average utilization (" ?avg-rho ") of controller " ?cu
         " (string " (get-schema-value ?string-cu 'logical-channel)
         ") exceeds the user-specified threshold (" ?max-rho ")" )
  (assert (schema ?string-cu            (problem hot-string-cu))))
)

(defrule find-hot-strings-dual-cu
  "IF the average utilizations of a string's dual controllers are over a threshold value,
   THEN report the control units as being 'hot'."
  (declare (salience (+ ?*diagnosis-salience* 100)))
  (schema  ?string-cu        (has-components ?cu1)         (has-components ?cu2& ?cu1)
         (max-util ?max-rho)        (avg-util ?avg-rho&:(?avg-rho >= ?max-rho))  ;Identify a
hot string.         (not (problem hot-string-cu))        ) =>
  (assert (schema ?string-cu        (calc-util ?avg-rho)))
  (diagnosis
    (art-string-append "The average utilization (" (decimal-format (/ ?avg-rho 2) 2)
") of controllers " ?cu1 " and " ?cu2 " (string "
                (get-schema-value ?string-cu 'logical-channel)
                ") exceeds the user-specified threshold (" (decimal-format (/ ?max-rho 2) 2) ")" )
  (assert (schema ?string-cu            (problem hot-string-cu))))
)

(defrule find-hot-disks ; "Identify over-utilized disks"
  "IF a disk's utilization is over a threshold value,
   THEN report that disk as being 'hot'."
  (declare (salience (+ ?*diagnosis-salience* 100)))
  (user-parameter rho-disk-max ?max-rho)
  (schema ?disk        (object-type disk)        (avg-util ?avg-rho&:(?avg-rho > ?max-rho))
         ) =>
  (assert (schema ?disk         (calc-util ?avg-rho)))
  (diagnosis
    (art-string-append "Disk " ?disk " is hot, because its actual utilization ("
                ?avg-rho ") exceeds the user-specified threshold ("
                ?max-rho ")" )
    (assert (schema ?disk
              (problem hot-disk))))
)

(defrule find-high-volume-files
  "IF a string's controllers are hot,
   THEN for each disk on that string, identify the file with the highest transfer volume."
  (declare (salience (+ ?*diagnosis-salience* 50)))
  (schema ?string-cu        (problem hot-string-cu)        (string-has-disks ?disk)        )
  (schema ?high-vol-frag        (stored-on ?disk)        (xfer ?xfer)        (i-o-rate
?lambda)
         (not (problem hot-file | primary-hot-file | no-candidate-slot))        (not (info (high-
volume ?)))        )
  (not (schema ?higher-vol-frag        (stored-on ?disk)        (xfer ?xfer2)
(i-o-rate ?lambda2 & :((?xfer2 * ?lambda2) > (?xfer * ?lambda)) )        (not (problem
hot-file | primary-hot-file | no-candidate-slot))        ))
=>
  (assert (schema ?high-vol-frag            (info (high-volume =(* ?xfer ?lambda)))
         ))
)

(defrule find-hot-files
```

"IF a file seems to be responsible for the excessive utilization seen on its disk,
THEN report that file as being 'hot' and consider moving it."
(declare (salience ?*diagnosis-salience*))
(user-parameter RHO-DISK-MAX ?max-rho)
(fast-parameter MIN-HOT-FILE-UTIL ?min-hot-file-util)
    (schema ?disk           (problem hot-disk)           ; For each hot disk ...           (calc-util ?disk-rho&:(?disk-rho > ?max-rho))           )
    (schema ?file1          (stored-on ?disk)            ; ... find a file (on that disk)  (avg-util ?file1-rho&:(?file1-rho > ?min-hot-file-util))
        (not (problem hot-file | primary-hot-file | no-candidate-slot))              )
    (not (schema ?file1                       ; ... such that no other (unmarked) file          (stored-on ?disk) ; (on that disk) is "hotter".              (avg-util ?file2-rho&:(?file2-rho > ?file1-rho))
            (not (problem hot-file | primary-hot-file | no-candidate-slot))            )) =>
(diagnosis
    (setq   diag-string    (art-string-append    "File    "   (real-name   ?file1)
                            " is hot, because it seems to be responsible for the high utilization of disk "                 ?disk ))
    (setq assert-out (assert (schema ?file1                       (problem hot-file)))))
    (if (art-equal 'RFS (get-schema-value ?file1 'file-category))
    then (rfs-diagnosis diag-string assert-out))

)

(defrule find-primary-hot-files
"IF a file is hot and its transfer rate explains the hot string-controller,
THEN designate the file as a primary move candidate."
(declare (salience (+ ?*diagnosis-salience* 5)))
(fast-parameter min-hot-file-util ?min-hot-file-util)
    (schema ?string-cu      (problem hot-string-cu)      (max-util ?max-rho)      (calc-util ?avg-rho&:(?avg-rho > ?max-rho))          )
    (on-string ?disk1 ?string-cu)
    (stores   ?disk1 ?file1)
    (schema ?file1              ; Find a file on the hot string        (info (high-volume ?highest-on-string))        (not (problem primary-hot-file | hot-file))        (not (determination move-disallowed))         )
    (not (and (on-string ?disk2 ?string-cu)        (stores   ?disk2 ?file2)        (schema ?file2          ; ... such that no other file has higher transfer volume        (info (high-volume ?lower-vol & :(?lower-vol > ?highest-on-string) ))        (not (problem primary-hot-file | hot-file))        (not (determination move-disallowed))
                ) ))
=>
(diagnosis
    (setq diag-string (art-string-append "File " (real-name ?file1) " (on disk " ?disk1 ") is hot, "
                        "because it seems to be responsible for the high utilization of string "                 (get-schema-value ?string-cu 'logical-channel) ))
    (setq assert-out (assert (schema ?file1                            (problem primary-hot-file)))))
    (if (art-equal 'RFS (get-schema-value ?file1 'file-category))
    then (rfs-diagnosis diag-string assert-out))
)

(defrule adjust-calculated-utilizations
"IF a hot file has been chosen as a move candidate,
THEN adjust the calculated utilization of its disk (and controllers)."
(declare (salience (+ ?*diagnosis-salience* 10)))  ;execute before looping thru next iteration of hot-file ID
    (schema ?frag           (problem hot-file | primary-hot-file)        (not (determination move-disallowed))         )
=>
    (bind ?disk (get-schema-value ?frag 'stored-on))

```
    (bind ?string-cu (get-schema-value ?disk 'on-string))
    ;
    (if (setq disk-util (get-schema-value ?disk 'calc-util))   ;if the file's disk is hot, then adjust the
disk's calculated util
        then (modify-schema-value ?disk 'calc-util (- disk-util (get-schema-value ?frag 'avg-util))))
    ;
    (if (setq str-cu-util (get-schema-value ?string-cu 'calc-util))  ;if the file's CUs are hot, then adjust
their calculated util
        then (modify-schema-value ?string-cu 'calc-util                    (- str-cu-util (* 0.1
(get-schema-value ?frag 'xfer)                                      (get-schema-value
?frag 'i-o-rate)))))
)
(defrule disallow-file-move
  "IF the SETUP file names file types that shouldn't be moved,
   THEN don't allow FAST to move problem files of that type."
  (declare (salience *maximum-salience*))
  (user-parameter NO_MV_FILE_GRP ?file-type& NULL)
  (file-category ?frag ?file-type)       ;Find a file of the type that shouldn't be moved
  (not (determination ?frag do-not-move))
  (problem ?frag primary-hot-file |      ; ... having a problem normally solved by a file move
              hot-file |              duplexed-incorrectly |         member-of-split-group
|            too-many-rfs-files |              rfs-in-bad-company |              rfs-file-
with-high-ret)
  =>
  (assert (schema ?frag              (determination move-disallowed)))
  ; Only report disallowed moves (via "repair" or "rfs-repair") after all file moves are completed
)

(DEFRULE too-few-strings ; "If none of the disks under a hot string-cu are hot, then more strings
are needed ;  to share the load."
  "IF a string's controller(s) is (are) hot, but no disk on that string is hot,
   THEN report that the number of disks per string should be reduced."
  (declare (salience (- ?*diagnosis-salience* 10)))   ;(wait until all hot disks are found)
  (schema ?string-cu        (problem hot-string-cu)      )
  (not (schema ?          (on-string ?string-cu)         (problem hot-disk)           ))
  =>
  (diagnosis
    (art-string-append "No hot disks were found on the hot string "
              (get-schema-value ?string-cu 'logical-channel)               ", indicating that
there are too few strings:"
              " the I/O subsystem may be under-provisioned" )
   (assert (schema ?string-cu          (problem no-hot-disks))))
)

(defrule check-cache-bypass
  "IF a no-cache file residing on a cache disk has poor performance,
   THEN report that the file's bypass may not be set."
  (declare (salience ?*diagnosis-salience*))
  (schema ?frag         (spec no-cache-file)        (svc-time ?x-file)         (xfer ?xfer-file)
  )
  (schema ?disk         (stores ?frag)         (seek-time ?seek-spec)         (latency ?lat-spec)
  )
  (schema ?string-cu       (string-has-disks ?disk)         (cache yes)       )
  (test (< (- ?x-file ?xfer-file)         (+ ?seek-spec ?lat-spec)))
  =>
  (diagnosis (art-string-append "NOTE: File " (real-name ?frag)                       " is
on a cache string, but may not have its bypass set")             (assert (schema ?frag
                (problem bypass-not-set")                         ))         )
)
```

```
;;;-*-mode:art;package:au;base:10.-*- ;SCCS ID string: @(#) damage-rules.art
version 1.14

(defrule find-duplex-candidates

"IF a file belongs to a category that should be duplexed, but only one leg exists,
  THEN report that the file should be duplexed."
    (declare (salience ?*diagnosis-salience*))
    (schema ?file1         (spec duplex)          (has-location ?)          (not (file-category TRNG))
; don't worry about training files      (tip-number ?tip)         )
    (not (schema ?file1         (tip-number ?tip)            (has-location ?)                ))
=>
    (diagnosis
      (art-string-append "File " (real-name ?file1)
            " (TIP# = " ?tip ") should be duplexed." )
      (assert (schema ?file1           (problem not-duplexed)              )))
)

(defrule find-duplex-violations
   "IF the two legs of a duplexed file reside on the same string,
    THEN consider moving either one to a different string."
    (declare (salience ?*diagnosis-salience*))
    (schema ?fragment1          (spec duplex)          (tip-number ?tip)          (stored-on
?disk1)              ;Find the home of one leg.         (location-of ?file1)         (not
(problem duplexed-incorrectly))      )
    (schema ?fragment2          (spec duplex)          (tip-number ?tip)          (stored-on
?disk2)              ;Find the home of the other leg.        (location-of ?file2& ?file1)
       )
    (test (not (art-equal ?fragment1 ?fragment2)))

(split
    ((test (art-equal ?disk1 ?disk2))   ;Duplexing on same disk is never allowed.
    =>
      (diagnosis
        (art-string-append (get-schema-value ?fragment1 'file-category) " file "
              (real-name     ?file1)                    "      (TIP#    =      "     ?tip
              ") is not duplexed correctly with " ?file2                  ": both files
are stored on disk " ?disk1 ".")
        (assert (schema ?fragment1             (problem duplexed-incorrectly)
)))
   )

((user-parameter DPLX_ON_SAME_STRING false)  ;If duplexing on same string is not allowed
...
      (test (not (art-equal ?disk1 ?disk2)))
      (schema ?string-cu       (string-has-disks ?disk1)         ;See if the legs are located on
             (string-has-disks ?disk2)        ;   the  same  string.         (logical-channel
?string)        )
    =>
      (diagnosis
        (art-string-append (get-schema-value ?fragment1 'file-category) " file "
              (real-name     ?file1)                      "      (TIP#    =      "     ?tip
              ") is not duplexed correctly with " ?file2                   ": both files
are located on string "                  (get-schema-value ?string-cu 'logical-channel) "." )
        (assert (schema ?fragment1             (problem duplexed-incorrectly)
)))
   ))
 )
```

GLOSSARY

This section contains definitions for each of the mathematical symbols or other terms used in this patent application.

| | |
|---|---|
| $B_{CPU}$ | One of several possible choices for the amount of wait time at the CPU (seconds/transaction). |
| $B^*_{CPU}$ | The users selection for a particular amount of wait time at the CPU, $B_{CPU}$, he or she deems acceptable (seconds/transaction). |
| $B_{DMR}$ | The users selection for a particular amount of wait time within Unisys' Data Management Routines he or she deems acceptable (seconds/transaction). |
| $B_{OTHER}$ | The users selection for a particular amount of wait time, attributable to other sources not associated with explicit bounds, he or she deems acceptable (seconds/transaction). |
| $B_{REF}$ | The users selection for a particular amount of wait time resulting from the reference file system cache complex he or she deems acceptable (seconds/transaction). |
| $B_{TOT}$ | The arithmetic sum of all the user specified bounds. |
| $B_{I/O}$ | The users selection for a particular amount of wait time within the I-O complex he or she deems acceptable (seconds/transaction). |
| CACHE_CU | The logical channel number of the dual control units equipped with cache and with the cache enabled. An example is "14" or "16". All CU NAMEs in the first field of perf-cu.dat or conn.dat are legal names. There should be one occurrence of this keyword for each enabled cache string in the I/O complex. |
| $C_{hoke}$ | A user selected constant used to define the neighborhood outside of which the user's policy choice of $p_d$ would be compromised by enforcing a queue tree setting implied by the selected $B^*_{CPU}$ (dimensionless). |
| $C_{lose}$ | A user specified constant used to define the neighborhood in which no Q tree changes will be recommended (dimensionless). |
| CU NAME | A unique identifier for a disk control unit as it exists on a system (dimensionless). |
| CU TYPE | Unisys offers several types of disk control units. Each is identified by a numeric code (dimensionless). |
| D | A user input (seconds). The planned duration of the FACs transaction processing period, expressed in seconds. |
| DEV–CHNL Q | The wait time experienced by an I-O request due to busy IOPs (rare), or busy disk control units (more frequent), or a busy disk (most likely) (milliseconds/I-O) (dimensionless). |
| DISK MODEL | Unisys offers several types of disks. Each is identified by a numeric code (dimensionless). |
| DISK NAME | A unique identifier for a disk as it exists on a system (dimensionless). |

| | |
|---|---|
| DUPLEX_LIBs | A flag that tells ES whether or not a user is willing to duplex the FACS application libraries on the production host, as an alternative to library file moves. If set to "true", the user is willing to try duplexing; if "false", the user's policy is not to duplex libraries. In the latter case, ES will treat a hot library as it would treat any other hot file. |
| DPLX_ON_SAME_STRING | A flag that tells ES whether or not a site's policy permits placing both legs of a duplexed file on the same string. If set to "true", ES will not consider both legs on the same sting a duplexing violation; if "false", both legs on the same string will be deemed a duplexing violation, and ES will attempt to re-locate one of the legs. |
| DUPLEX_FILE | The EXEC name of a file that a site wishes to duplex. Only a portion of the file name is required. "LEG-01" or "LEG-02" need not be specified. One entry must exist for each file the user wishes to duplex. |
| DRA | An abbreviation for Device Relative Address. It is a location of some spot in a file relative to the start of the disk (tracks). |
| expansion-factor | The size of a growth step in the size of the ES executable image, in 64,000 byte blocks, that occurs during a ES analysis (blocks). |
| F | The set of all tip files that reside on a single pack (dimensionless). |
| FLD | An abbreviation for File Lock Delay. It is a component of the request existence time (see RET), and is the time used by the IOP to build the channel programs (milliseconds/I-O). |
| FRA | An abbreviation for File Relative Address. It is a location of some spot in a file relative to the start of the file (tracks). |
| $F_b$ | Also known as the backing factor. A transfer time delay inserted to prevent the CU's buffer from being transferred to disk before the IOP completes its write to the CU's buffer. Although prep factor dependent (for 8470/80, 112 and 448 preps...2.99 ms/write I-O and 7.80 ms/write I-O on 1792 preps), ES only uses 2.99 (milliseconds/write I-O). |
| $F_C$ | A calculated quantity. This is defined as the ratio of the base MIP rate to the effective MIP rate. Since MIP rates are not measurable, without resorting to an external hardware monitor, the ratio of the measured CPU service time to CPU quantum timer sups is used as a surrogate. |
| $F_{C_M}$ | A user input (dimensionless). The cache memory reference degradation factor. |
| FORBIDDEN_PACK | The name of a disk pack that is to be "spare". If present in the setup file, ES will not attempt to move problem files to this pack, regardless of the amount of excess space or utilization available. Also, if TIP file activity is detected on a FORBIDDEN_PACK, ES will appraise the user of this fact. |
| growth-rate | The rate at which the executable image is permitted to expand in units of 64,000 byte blocks (dimensionless). |

| | |
|---|---|
| INTERACTIVE | A flag that specifies the type of interaction with ES a user desires. If set to "true", an analysis session's results remain available to the user. All screens and graphics may be freely accessed. If "false", the session terminates immediately when the analysis is complete' with the key results written to an output file, fast.diagnoses, in the /results directory. If several overnight runs are requested, it is recommended that only the setup file of the last run have INTERACTIVE set to true. If an intermediate run's setup file has INTERACTIVE set to true, successive analyses will not begin until the user exits the intermediate session. |
| I-O SIZE | The number of words required to satisfy an I-O request (words). |
| j | An index used to identify an RFS cache (dimensionless). |
| K | A user input (dimensionless). The incremental change in the EXEC cost due to the transaction processing load. |
| k | An index used to identify a TIP file on a disk (dimensionless). |
| $L_j$ | The latency of a disk. It is equal to $.5 \left( \dfrac{1}{\text{rotational speed}} \right)$ of the disk (milliseconds/I-O). |
| LOGICAL CHANNEL NO. | A unique identifier for a set of control units, disks, or tape drives, that corresponds to some quantum of physical connectivity in the I-O subsystem. For example, a paired set of disk control units and their subtending disks is commonly referred to as a logical channel (dimensionless). |
| LOGICAL GROUP NAME | Also referred to as LOG. GRP NM. A shorthand method of identifying sets of files, e.g., "LFACS_DB" is the set of all LFACS data base tip files on a system (dimensionless). |
| LIVE-$RFS_j$ | A user input (dimensionless). The set of all reference file systems, supporting production transactions, served by the $j^{th}$ cache. |
| M | The number of CPUs |
| MAXIMUM-MOVES | A user input (dimensionless). The maximum number of files that ES will move during a single analysis session. |
| MIN_Q_RFS | A user input (dimensionless). A flag which tells ES which set of RFS queueing equations to use. The two sets of equations reflect the before and after FACS production algorithms used to manage the cache complex. "Before" corresponds to pre-FACS 17.5. |
| MULTI-Is | Informs ES whether or not multiple I-banks have been configured on the production host. "True" means multiple I-banks per D-bank have been configured; "false" means a single I-bank per D-bank exists. |
| n | An index used to identify a particular SOAC SEGMENT (dimensionless). |
| NO_CACHE_FILE | The TIP NO. or the LOGICAL GROUP NAME of the file(s) a user wishes to avoid caching. |
| NO_MOVE_FILE_GRP | The logical name of a group of files, that if present in the setup file, inhibits file moves for any member of the group. |

| | |
|---|---|
| ON LN STATUS | Disks can be declared to the EXEC as "UP", ready to service I-O requests, or "DOWN", unavailable (dimensionless). |
| $R_k$ | Defines the fraction of I-Os to the $k^{th}$ file on a disk that were reads as opposed to writes (dimensionless). |
| PREP FACTOR | The number of words per physical record on a disk. See the table entitled "Unisys Disk and Control Unit Performance Specification" for a list of legal prep factors by type of disk (words/record). |
| PREP TYPE | Unisys disks can either be prepped as "fixed" or "removable". The choice depends upon the eventual use of the disk. For example, disks that contain tip files are prepped as removable to avoid being subjected to roll outs (dimensionless). |
| $P_F$ | A user input (dimensionless). The power factor, which account for inter-processer contention. |
| $P_{hit_j}$ | The probability that the information required to satisfy an RFS request will be found in the $j^{th}$ cache; the probability of a cache hit (dimensionless). |
| $1 - P_{hit_j}$ | The probability that the information required to satisfy an RFS request will not be found in the $j^{th}$ cache; the probability of a cache miss (dimensionless). |
| RBW | An abbreviation for ead Before Writes. This phenomenon occurs when the $\frac{I-O\ SIZE}{PREP\ FACTOR}$ is not an integer. When RBW occur, on average, an extra disk revolution is required to complete the data transfer. As the name implies, this can only occur on I-O write requests (dimensionless). |
| RED_HOST_UX | The UNIX name of the system that performs the data reduction for ES. This name is part of the uucp address used by ES to transmit results back to the reduction host (dimensionless). |
| RED_LOG_DIR | The full path name of the the login directory, assigned to ES on the Reduction host. This path is part of the uucp address used by ES to transmit results back to the reduction host (dimensionless). |
| RET | An abbreviation for Request Existence Time. This interval begins when an I-O request is issued and ends when the requested information is returned, and hence, includes both the I-O service time and any queueing delays experienced in the I-O subsystem (milliseconds/I-O). |
| RFS NAME $\in j$ | The name of the $\iota^{th}$ reference file system served by the $j^{th}$ cache (dimensionless). |
| RFS $NM_\iota$ | The name of the $\iota^{th}$ reference file system served by the $j^{th}$ cache (dimensionless). |
| RFS TIP $NO_\iota$ | The TIP file number of the $\iota^{th}$ reference file system served by the $j^{th}$ cache (dimensionless). |
| RFS TIP NO. $\in j$ | The TIP file number of the $\iota^{th}$ reference file system served by the $j^{th}$ cache (dimensionless). |
| RPS | An abbreviation for Rotational Position Sensing. As used in a ES context, a "safety" delay inserted in the transfer time |

| | |
|---|---|
| | to insure that a complete path from the disk to the CU to the IOP is available when a data transfer is to occur. The duration is the time required for 2-3 sectors to rotate past a fixed point on a disk. ES uses a fixed value of .372 (milliseconds/I-O). |
| S | The number of CPU quantum timer sups actually used by a production workload, during a particular time period (seconds). |
| SEEK+LAT+CU DLY | A portion of the I-O service time, $x_{disk}$. This interval corresponds to the time required to position a disk's read-write heads over the data of interest. The sum of this quantity and the $XFER_{disk}$ is the I-O service time. This quantity is not measurable on 9494 disks, equipped with block multiplexer channels (milliseconds/I-O). |
| SEEK | A portion of the I-O service time, $x_{disk}$. This interval corresponds to the time required to position a disk's read-write heads over the track containing the data of interest. A "SPEC" value is typically available but SEEK, by itself is not directly measurable (milliseconds/I-O). |
| $S_M$ | The rated, or modeled, capacity of an 1100/90 series system expressed in CPU quantum timer sups, a Unisys standard unit of processing; also referred to as available sups (seconds). |
| SET $A_j$ | A user input (dimensionless). The set of all reference file systems, supporting production transactions, served by the $j^{th}$ cache. |
| SET C | The set of all reference file system caches that serve reference file systems devoted to production processing (dimensionless). |
| $SOAC\_SEG_{segment-name}$ | A SOAC SEGMENT consists of an OCS, TASAR and WIRE CENTER (WC) files. There may be multiple SOAC SEGMENTS live, on a particular system (dimensionless). |
| T | The actual transaction existence time (seconds/transaction). |
| TIP NO. | A numeric identifier for a tip file. Unfortunately, it is not unique. In the case of a duplexed file, each leg will have the same tip number (dimensionless). |
| $T_0$ | The period of time during which reference file system measurements are collected; used in another equation, and not needed explicitly by ES (seconds). |
| $T_M$ | The transaction existence time as estimated by a central server model and provided to ES (seconds/transaction). |
| $Threads_M$ | The average number of transactions active in the system, during a particular time interval, a central server model quantity (dimensionless). |
| Threads | The actual average number of transactions active in the system, in a particular time interval (dimensionless). |
| virtual-memory-size | The maximum permissible size of the executable ES image, expressed in 64,000 byte blocks. Under no circumstances is this parameter to be set larger than the UNIX swap partition, B, on the work station (blocks). |
| $W_{CPU}$ | The wait time in the CPU complex as estimated by a central server model; used as a surrogate for the actual, but |

| | |
|---|---|
| | unfortunately unmeasurable, CPU wait time (seconds/transaction). |
| $W_{DMR}$ | The actual wait time in the Unisys Data Management Routines (seconds/transaction). |
| $W_{OTHER}$ | The actual wait time stemming from unidentified sources (seconds/transaction). |
| $W_{REF}$ | The wait time experienced by transactions served by the RFS cache complex, as estimated by the Polachik-Khinchine mean value formula for an M/G/1 queue; used as a surrogate for the actual, but unfortunately unmeasurable, RFS wait time (seconds/transaction). |
| $W_{TOT}$ | The arithmetic sum of the wait times (not bounds) identified here (seconds/transaction). |
| $W_j$ | The wait time experienced by transactions served by the $j^{th}$ cache, as estimated by the Polachik-Khinchine mean value formula for an M/G/1 queue; used as a surrogate for the actual, but unfortunately unmeasurable, RFS wait time (seconds/transaction). |
| $W_{I/O}$ | The actual wait time in the I-O complex (seconds/transaction). |
| $X_{CPU}$ | The CPU service time; it differs (is greater) from a CPU quantum timer sup measurement because it includes both the memory reference time, that occurs in the event of a processor cache miss, the time spent executing application code and the time spent using operating system services (seconds/transaction). |
| $X_{miss_\iota}$ | The average existence time of the I-Os to the $\iota^{th}$ reference file system tip file (seconds/I-O). |
| $X_{I/O}$ | The average transaction's measured I-O service time; it consists of seek, control unit delays, latency and data transfer time (seconds/transaction). |
| $x_{disk}$ | The average measured service time for an I-O request to a disk; it consists of seek, control unit delays, latency and data transfer time, and is the average of all the I-Os to files on the disk (milliseconds/I-O). |
| $x_{file}$ | The average measured service time for an I-O request to a specific file on a disk; it consists of seek, control unit delays, latency and data transfer time (milliseconds/I-O). |
| $XFER_{cu}$ | The average effective disk transfer time for an I-O, measured at the control unit (milliseconds/I-O). The average is over all I-Os, from disks, through the control unit. The reciprocal, multiplied by the I-O size is approximately, the control unit view of the disk transfer rate (Kwords/second). |
| $XFER_{disk_{CALC}}$ | The average effective disk transfer time, corrected for RPS, buffer waits on writes, and RBW. Used to compare against $XFER_{disk_{SPEC}}$ to detect substandard disk performance (milliseconds/I-O). |
| $XFER_{disk_{SPEC}}$ | The average disk transfer time for a disk I-O calculated using the UNISYS advertised disk transfer rate, $\Lambda_{xfer_{SPEC}}$ (milliseconds/I-O). |

| | |
|---|---|
| $XFER_{disk}$ | The average effective disk transfer time for an I-O, measured at the disk (milliseconds/I-O). The average is over all I-Os to the disk. The reciprocal, multiplied by the I-O size is approximately, the disk view of the disk transfer rate (Kwords/second). |
| $XFER_{file}$ | The average effective disk transfer time for an I-O, measured at a specific file on a disk (milliseconds/I-O). The average is over all I-Os to the file. The reciprocal, multiplied by the I-O size is approximately, the disk transfer rate (Kwords/second). |
| $\dfrac{Z_j}{(T_0 \Lambda_j)}$ | The average number of RFS requests made by the average transaction (requests/transaction). |
| $Z_j$ | The number of accesses to the $j^{th}$ cache during an observation interval (requests). |
| $\alpha_\iota$ | The I-O request rate to the $\iota^{th}$ tip file (requests/second). |
| $\Delta \rho_{cu}$ | The control unit utilization increment that results from moving a file to a disk on the control unit's string (dimensionless). |
| $\Delta \rho_{disk}$ | The disk utilization increment that results from moving a file to a disk (dimensionless). |
| $\delta t$ | A data collection time interval (seconds or hours, depending upon the context). |
| $\iota$ | An index used to identify a reference file system, or its TIP file (dimensionless). |
| $\Lambda_j$ | The traffic intensity in the jth RFS cache (transactions/second). |
| $\Lambda_{xfer_{spec}}$ | The disk transfer rate as advertised by Unisys (Kwords/second). |
| $\lambda$ | The actual traffic intensity in the system (transactions/second). |
| $\lambda_{disk}$ | The traffic intensity at a particular disk (I-Os/second). |
| $\lambda_{file}$ | The traffic intensity at a particular file on a disk (I-Os/second). |
| $\lambda_j$ | The actual traffic intensity in the jth RFS cache (RFS requests/second). |
| $\lambda_M$ | The traffic intensity in the system, as estimated by a central server model (transactions/second). |
| $\lambda_{max}$ | The theoretical maximum traffic intensity in the system, as estimated by a central server model (transactions/second). |
| $\phi 1$ | The initial portion of ES's capabilities; deals exclusively with tuning the I-O subsystem. |
| $\rho_{CPU_M}$ | The CPU utilization, as estimated by a central server model (dimensionless). |
| $\rho_{CPU}$ | The actual CPU utilization (dimensionless). |
| $\rho_{cu}$ | The actual or measured utilization of a disk strings control unit (dimensionless). |
| $\rho_{cached-cu_{max}}, \rho_{non-cached-cu_{max}}$ | A user input (dimensionless). It defines the maximum cached (conventional) disk control |

| | |
|---|---|
| $\rho_{disk}$ | The actual or measured utilization of a disk (dimensionless). |
| $\rho_{cached-disk_{mx}}$  $\rho_{non-cached-disk_{mx}}$ | A user input (dimensionless).<br>It defines the maximum cached (conventional) disk utilization that can be observed without ES concluding that the disk is hot (dimensionless). |
| $\rho_d$ | A user input (dimensionless).<br>The site selected, average CPU utilization over the transaction processing period |
| $\rho_{file}$ | The actual or measured file's contribution to the utilization of a disk (dimensionless).<br>Note that this contribution is not the same for control units.<br>The CU contribution is given by $\lambda_{file} * XFER_{file}$. |
| $\rho_{ovhd}^{E}$ | A user input (dimensionless).<br>the average EXEC CPU utilization while the system is idle and UNIX is down |
| $\rho_{ovhd}^{r/t}$ | A user input (dimensionless).<br>the average real time CPU utilization while the system is idle and UNIX is down |
| $\rho_{xn}^{r/t}$ | A user input (dimensionless).<br>The average real time CPU utilization that results from processing a production FACS workload. It excludes $\rho_{ovhd}^{r/t}$. |

What is claimed is:

1. A method in a data processing system for improving the responsiveness of a dedicated, application-specific host computer being sized to insure a concurrent transaction backlog during peak hour, the host computer including disks, disk control units, and files on disks controlled by the disk control units, and having measurable central processing unit (CPU) and input/output (I/O) service times, the method comprising the steps of defining a set of operating principles relating to the operation of host system by capturing operational and descriptive information supplied by a host system expert who acts as a mentor, transforming said set of operating principles into an executable knowledge base and storing said knowledge base in a memory of an expert system support process having memory, measuring the CPU and I/O service times of the host computer under control of said support process storing the service times in said support process memory, processing the service times to convert the service times to system state data organized into a state space of processing rates and queuing times, and applying said executable knowledge base to said system state data to obtain host throughput-response time trade-off adjustment information so as to modify the transaction concurrency of the host computer as determined by said trade-off adjustment information.

2. The method as recited in claim 1 further comprising the steps of loading into said expert system support process the current I/O configuration arrangement of the host system, and sequencing through said set of operating principles embedded in said executable knowledge base with the I/O service times and said I/O configuration arrangement to obtain I/O adjustment information so as to re-allocate the current allocation of files to disks as determined by said I/O adjustment information.

3. The method as recited in claim 2 wherein said step of processing the service times includes the steps of processing the service times utilizing a self-calibrating central server model, solving the model, and producing said system state data.

4. The method as recited in claim 2 wherein said step of sequencing through said set of operation principles with the I/O service times includes the step of generating instructions to reconfigure the host computer so as to change the current allocation of files to disks.

5. A method in a data processing system for improving the responsiveness of a dedicated, application-specific host computer being sized to insure a concurrent transaction backlog during peak hour, the host computer including disks, disk control units, and files on the disks controlled by the disk control units, and having measurable central processing unit (CPU) and input/output (I/O) service times, the method comprising the steps of defining a set of operating principles relating to the operation of the host computer by capturing operation and descriptive information supplied by a system expert who acts as a mentor, transforming said set of operating principles into an executable knowledge base and storing said knowledge base in an expert system support process having memory, measuring the CPU and I/O service times of the host computer under control of said support computer and storing the service times in said support process, processing the service times to convert the service times to system state data organized into a state space of processing rates and queueing times, applying said executable knowledge base to said system state data to obtain host throughput-response time trade-off adjustment information so as to modify the transaction concurrency of the host computer as determined by said trade-off adjustment information, loading into said expert system support process the current I/O configuration arrangement of the host computer, and sequencing through said set of operational principles embedded within said executable knowledge base by said transforming step with the I/O service times and said I/O configuration arrangement to obtain I/O adjustment information so as to re-allocate the current allocation of files to disks as determined by said I/O adjustment information.

6. The method as recited in claim 5 wherein said step of processing the service times includes the steps of processing the service times utilizing a self-calibrating central server model, solving the model, and producing said system state data.

7. The method as recited in claim 5 wherein said step of sequencing through said set of operational principles with the I/O service times includes the step of generating instructions to change the host computer so as to re-allocate the current allocation of files to disks.

8. A data processing system for improving the responsiveness of a dedicated, application-specific host computer being sized to insure concurrent transaction backlog during peak hour, the host computer including disks, disk control units, and having measurable central processing unit (CPU) and input/output (I/O) service times, the processing system comprising an expert system support process having a memory, said support process being connected to the host computer, means for capturing operational and descriptive information in said expert system process supplied by a host system expert who acts as a mentor so as to define a set of operating principles relating to the operation of the host system, means for transforming said set of operating principles into an executable knowledge base and storing said knowledge base in said memory of said expert system support process, means for measuring the CPU and I/O service times of the host computer under control of said expert system support process and storing the service times in said expert system support process, means for processing the service times to convert the service times to system state data organized into a state space of processing rates and queueing times and means for applying said executable knowledge base to said system state data to obtain host throughput-response time trade-off adjustment information so as to modify the transaction concurrency of the host computer as determined by said trade-off adjustment information.

9. The data processing system as recited in claim 8 further comprising means for loading into said support process the current I/O configuration arrangement of the host system, and means for sequencing through said set of operational principles embedded in said executable knowledge base with the I/O service times and said I/O configuration arrangement to obtain I/O adjustment information so as to re-allocate the current allocation of files to disks as determined by said I/O information.

10. The data processing system as recited in claim 9 wherein said means for processing the service times includes means for processing the service times utilizing a self-calibrating central server model, solving the model, and producing said system state data.

11. The data processing system as recited in claim 9 wherein said means for sequencing through said set of operation principles with the I/O service times includes means for generating instructions to reconfigure the host computer so as to change the current allocation of files to disks.

12. A data processing system for improving the responsiveness of a dedicated, application-specific host computer being sized to insure a concurrent transaction backlog during peak hour, the host computer including disks, disk control units, and files on the disks controlled by the disk control units, and having measurable central processing unit (CPU) and input/output (I/O) service times, the processing comprising an expert system support process having a memory, said support process being connected to the host computer, means for capturing of operational and descriptive information supplied by a system expert who acts as a mentor so as to define a set of operating principles relating to the operation of the host system, means for transforming said set operating principles into an executable knowledge base and storing said knowledge base in said memory of said expert system support process, means for measuring the CPU and I/O service times of the host computer under the control of said expert system support process and storing the service times in said expert system support process, means for processing the service times to convert the service times to system state data organized into a state space of processing rates and queueing times, means for applying said executable knowledge base to said system state data to obtain host throughput-response time trade-off adjustment information so as to modify the transaction concurrency of the host computer as determined by said trade-off adjustment information, means for loading into said expert support process the current I/O configuration arrangement of the host computer, and means for sequencing through said set of operational principles embedded within said executable knowledge base with the I/O service times and said I/O configuration arrangement to obtain I/O modification information so as to re-allocate the current allocation of files to disks as determined by said modification information.

13. The data processing system as recited in claim 12 wherein said means for processing the service times includes means for processing the service times utilizing a self-calibrating central server model, solving the model, and producing said system state data.

14. The data processing system as recited in claim 12 wherein said means for sequencing through said set of operation principles with the I/O service times includes means for generating instructions to reconfigure the host computer so as to change the current allocation of files to disks.

* * * * *